US012722372B2

(12) United States Patent
Kashimura et al.

(10) Patent No.: US 12,722,372 B2
(45) Date of Patent: Sep. 1, 2026

(54) HEAD UNIT AND LIQUID EJECTION APPARATUS

(71) Applicant: SEIKO EPSON CORPORATION, Tokyo (JP)

(72) Inventors: Toru Kashimura, Shiojiri (JP); Yoichiro Kondo, Chino (JP)

(73) Assignee: SEIKO EPSON CORPORATION (JP)

( * ) Notice: Subject to any disclaimer, the term of this patent is extended or adjusted under 35 U.S.C. 154(b) by 119 days.

(21) Appl. No.: 18/949,121

(22) Filed: Nov. 15, 2024

(65) Prior Publication Data

US 2025/0162311 A1 May 22, 2025

(30) Foreign Application Priority Data

Nov. 16, 2023 (JP) ................................ 2023-195241

(51) Int. Cl.
*B41J 2/045* (2006.01)
*B41J 2/14* (2006.01)

(52) U.S. Cl.
CPC ........... *B41J 2/0455* (2013.01); *B41J 2/0451* (2013.01); *B41J 2/04541* (2013.01); *B41J 2/04581* (2013.01); *B41J 2/04596* (2013.01); *B41J 2/14233* (2013.01); *B41J 2002/14491* (2013.01)

(58) Field of Classification Search
CPC ...................................................... B41J 2/0451
See application file for complete search history.

(56) References Cited

U.S. PATENT DOCUMENTS

| | | | | |
|---|---|---|---|---|
| 2020/0207083 | A1* | 7/2020 | Ozawa | B41J 2/04588 |
| 2021/0331467 | A1* | 10/2021 | Murayama | B41J 29/38 |
| 2022/0097362 | A1 | 3/2022 | Fujisawa et al. | |
| 2025/0196495 | A1* | 6/2025 | Miyagishi | B41J 2/0455 |

FOREIGN PATENT DOCUMENTS

| | | |
|---|---|---|
| JP | 2022-057816 A | 4/2022 |

* cited by examiner

*Primary Examiner* — Julian D Huffman
(74) *Attorney, Agent, or Firm* — Harness, Dickey & Pierce, P.L.C.

(57) ABSTRACT

A head unit includes a first nozzle that communicates with a first pressure chamber and a second pressure chamber volumes of which change in accordance with a drive signal, and ejects a liquid, an inspection signal output circuit to which a first piezoelectric element for outputting a first residual vibration signal, and a second piezoelectric element for outputting a second residual vibration signal, and which outputs an inspection signal, a processor for determining a state of the first nozzle based on the inspection signal, and a first switching circuit for switching whether to output the first residual vibration signal and the second residual vibration signal to the inspection signal output circuit, wherein the first piezoelectric element and the second piezoelectric element are electrically coupled at a first node, and the first switching circuit switches a conduction state between the first node and the inspection signal output circuit.

16 Claims, 15 Drawing Sheets

| [SIH, SIM, SIL] | Sa | | Sb | | | Sc | | |
|---|---|---|---|---|---|---|---|---|
| | tp1 | tp2 | ts1 | ts2 | ts3 | ts1 | ts2 | ts3 |
| LD [1, 1, 0] | H | H | L | L | L | L | L | L |
| MD [1, 0, 0] | H | L | L | L | L | L | L | L |
| SD [0, 1, 0] | L | H | L | L | L | L | L | L |
| ND [0, 0, 0] | L | L | L | L | L | L | L | L |
| CD [1, 1, 1] | L | L | H | L | H | L | H | L |

HEAD UNIT AND LIQUID EJECTION APPARATUS

The present application is based on, and claims priority from JP Application Serial Number 2023-195241, filed Nov. 16, 2023, the disclosure of which is hereby incorporated by reference herein in its entirety.

BACKGROUND

1. Technical Field

The present disclosure relates to a head unit and a liquid ejection apparatus.

2. Related Art

As a liquid ejection apparatus that changes internal pressure of a cavity filled with a liquid by driving a drive element based on a drive signal to thereby eject the liquid due to the change in the internal pressure, there is known a liquid ejection apparatus that has a plurality of drive elements corresponding to one nozzle from which the liquid is ejected, and that ejects the liquid from the single nozzle by driving the plurality of drive elements, in response to market demands for ejecting the liquid high in viscosity and for increasing an amount of the liquid ejected by single drive of the drive elements.

For example, JP-A-2022-057816 discloses a liquid ejection apparatus that has two piezoelectric elements corresponding to one nozzle, and ejects a liquid from one nozzle N by driving the two piezoelectric elements.

JP-A-2022-057816 is an example of the related art.

However, in the liquid ejection apparatus described in JP-A-2022-057816, there is no description in terms of determining the ejection state of the liquid from the nozzle in a configuration provided with a plurality of pressure chambers the volumes of which are changed by driving a plurality of drive elements, and ejecting the liquid from a single nozzle, and there is room for improvement.

SUMMARY

One aspect of the head unit according to the present disclosure includes

- a drive circuit configured to output a drive signal,
- a first pressure chamber a volume of which varies in accordance with the drive signal,
- a second pressure chamber a volume of which varies in accordance with the drive signal,
- a first nozzle that communicates with the first pressure chamber and the second pressure chamber, and that is configured to eject a liquid,
- a first piezoelectric element configured to output a first residual vibration signal according to a first residual vibration generated in accordance with a volume change of the first pressure chamber,
- a second piezoelectric element configured to output a second residual vibration signal according to a second residual vibration generated in accordance with a volume change of the second pressure chamber,
- an inspection signal output circuit to which the first residual vibration signal and the second residual vibration signal are input, and which is configured to output an inspection signal,
- a processor configured to determine an ejection state of the liquid from the first nozzle based on the inspection signal, and
- a first switching circuit configured to switch whether to output the first residual vibration signal and the second residual vibration signal to the inspection signal output circuit, wherein
- the first piezoelectric element and the second piezoelectric element are electrically coupled at a first node, and
- the first switching circuit is configured to switch a conduction state between the first node and the inspection signal output circuit.

One aspect of the liquid ejection apparatus according to the present disclosure includes

- a drive circuit configured to output a drive signal,
- a first pressure chamber a volume of which varies in accordance with the drive signal,
- a second pressure chamber a volume of which varies in accordance with the drive signal,
- a first nozzle that communicates with the first pressure chamber and the second pressure chamber, and that is configured to eject a liquid,
- a first piezoelectric element configured to output a first residual vibration signal according to a first residual vibration generated in accordance with a volume change of the first pressure chamber,
- a second piezoelectric element configured to output a second residual vibration signal according to a second residual vibration generated in accordance with a volume change of the second pressure chamber,
- an inspection signal output circuit to which the first residual vibration signal and the second residual vibration signal are input, and which is configured to output an inspection signal,
- a processor configured to determine an ejection state of the liquid from the first nozzle based on the inspection signal,
- a first switching circuit configured to switch whether to output the first residual vibration signal and the second residual vibration signal to the inspection signal output circuit, and
- a conveyance mechanism configured to convey a medium on which the liquid ejected from the first nozzle lands, wherein
- the first piezoelectric element and the second piezoelectric element are electrically coupled at a first node, and
- the first switching circuit is configured to switch a conduction state between the first node and the inspection signal output circuit.

DESCRIPTION OF EMBODIMENTS

A preferred embodiment of the present disclosure will hereinafter be described using the drawings. The drawings to be used are for the sake of convenience of explanation. Note that the embodiment described below does not unreasonably limit the content of the present disclosure set forth in the appended claims. Further, all the configurations to be described below are not necessarily essential elements of the present disclosure.

1. Configuration of Liquid Ejection Apparatus

Figure 1:
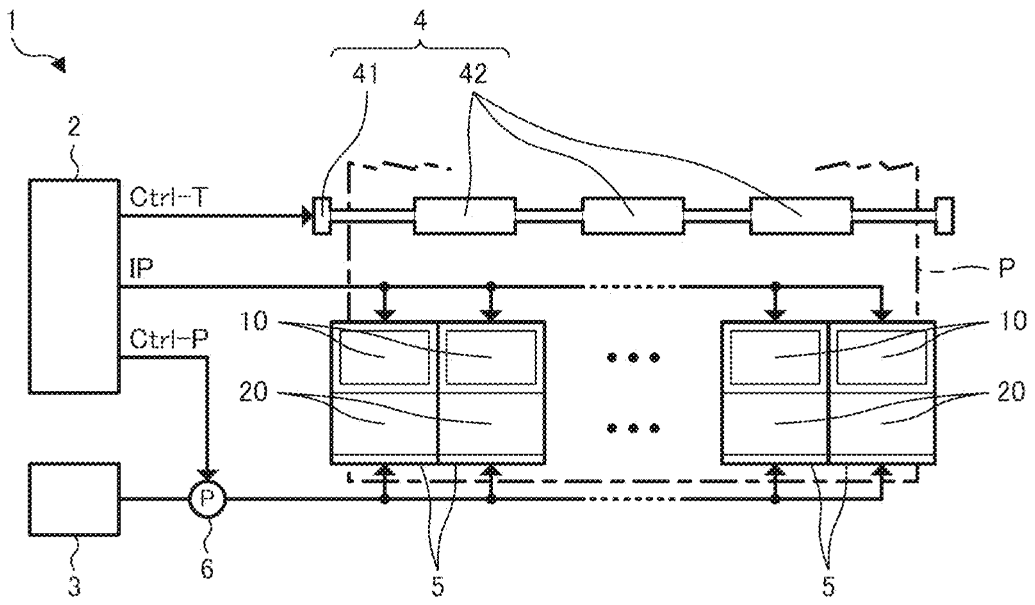
FIG. 1 is a diagram showing a schematic configuration of a liquid ejection apparatus.

FIG. 1 is a diagram showing a schematic configuration of a liquid ejection apparatus 1. As shown in FIG. 1, the liquid ejection apparatus 1 is a so-called line type inkjet printer that ejects ink as an example of a liquid at desired timings to a medium P conveyed by a conveyance unit 4 to thereby form a desired image on the medium P. Note that the liquid ejection apparatus 1 is not limited to the line type inkjet printer, but may be a serial type inkjet printer. Further, the liquid ejection apparatus 1 is not limited to the inkjet printers, and may be a color material ejection apparatus used for manufacture of a color filter for a liquid crystal display for the like, an electrode material ejection apparatus used for formation of electrodes for an organic EL display, an FED (field emission display), or the like, a bioorganic material ejection apparatus used for manufacture of a biochip, or the like, and may further be a three-dimensional modeling apparatus, a textile printing apparatus, or the like. Here, in the following description, the direction in which the medium P is conveyed is referred to as a conveyance direction, and the width direction of the medium P thus conveyed is referred to as a main scanning direction in some cases.

As shown in FIG. 1, the liquid ejection apparatus 1 includes a control unit 2, a liquid container 3, the conveyance unit 4, a plurality of ejection units 5, and a circulation unit 6.

The control unit 2 includes a processing circuit such as a central processing unit (CPU) or a field programmable gate array (FPGA), and a storage circuit such as a semiconductor memory device. The control unit 2 outputs a signal for controlling each element of the liquid ejection apparatus 1 based on image data supplied from an external device such as a host computer not shown provided outside the liquid ejection apparatus 1.

The liquid container 3 retains ink as an example of a liquid supplied to the ejection units 5. Specifically, the liquid container 3 retains a plurality of colors of ink to be ejected to the medium P such as black ink, cyan ink, magenta ink, yellow ink, red ink, and gray ink. As such a liquid container 3, an ink cartridge, an ink pack that is shaped like a bag, and is formed of a flexible film, an ink tank in which the ink can be replenished, or the like may be used.

The circulation unit 6 supplies the ink retained in the liquid container 3 to the ejection units 5 based on a control signal Ctrl-P output by the control unit 2. Further, the circulation unit 6 also collects the ink discharged from the ejection units 5 based on the control signal Ctrl-P output by the control unit 2. That is, the circulation unit 6 returns the ink in the liquid ejection apparatus 1. Such a circulation unit 6 can include, for example, a pump for generating a flow of the ink in the liquid ejection apparatus 1.

The conveyance unit 4 includes a conveyance motor 41 and conveyance rollers 42. A conveyance control signal Ctrl-T output by the control unit 2 is input to the conveyance unit 4. Then, the conveyance motor 41 operates based on the conveyance control signal Ctrl-T, and the conveyance rollers 42 rotate due to the operation of the conveyance motor 41. Due to the rotation of the conveyance rollers 42, the medium P is conveyed along the conveyance direction.

The plurality of ejection units 5 each have a drive module 10 and an ejection module 20. To each of the plurality of ejection units 5, an image information signal IP that corresponds to the ejection unit 5, and is output by the control unit 2 is input, and the ink retained in the liquid container 3 is supplied. Then, the drive module 10 controls an operation of the ejection module 20 based on the image information signal IP. Thus, the ejection module 20 ejects the ink supplied from the liquid container 3 at a predetermined timing in accordance with the control of the drive module 10.

In the liquid ejection apparatus 1 according to the present embodiment, the ejection modules 20 respectively provided to the plurality of ejection units 5 are located side by side along the main scanning direction so as to be equal to or longer than the width of the medium P. Then, each of the plurality of ejection units 5 ejects the ink at a timing synchronized with the conveyance of the medium P. Thus, the ink ejected from each of the plurality of ejection units 5 lands at desired positions on the medium P, and a desired image is formed on the medium P.

Figure 2:
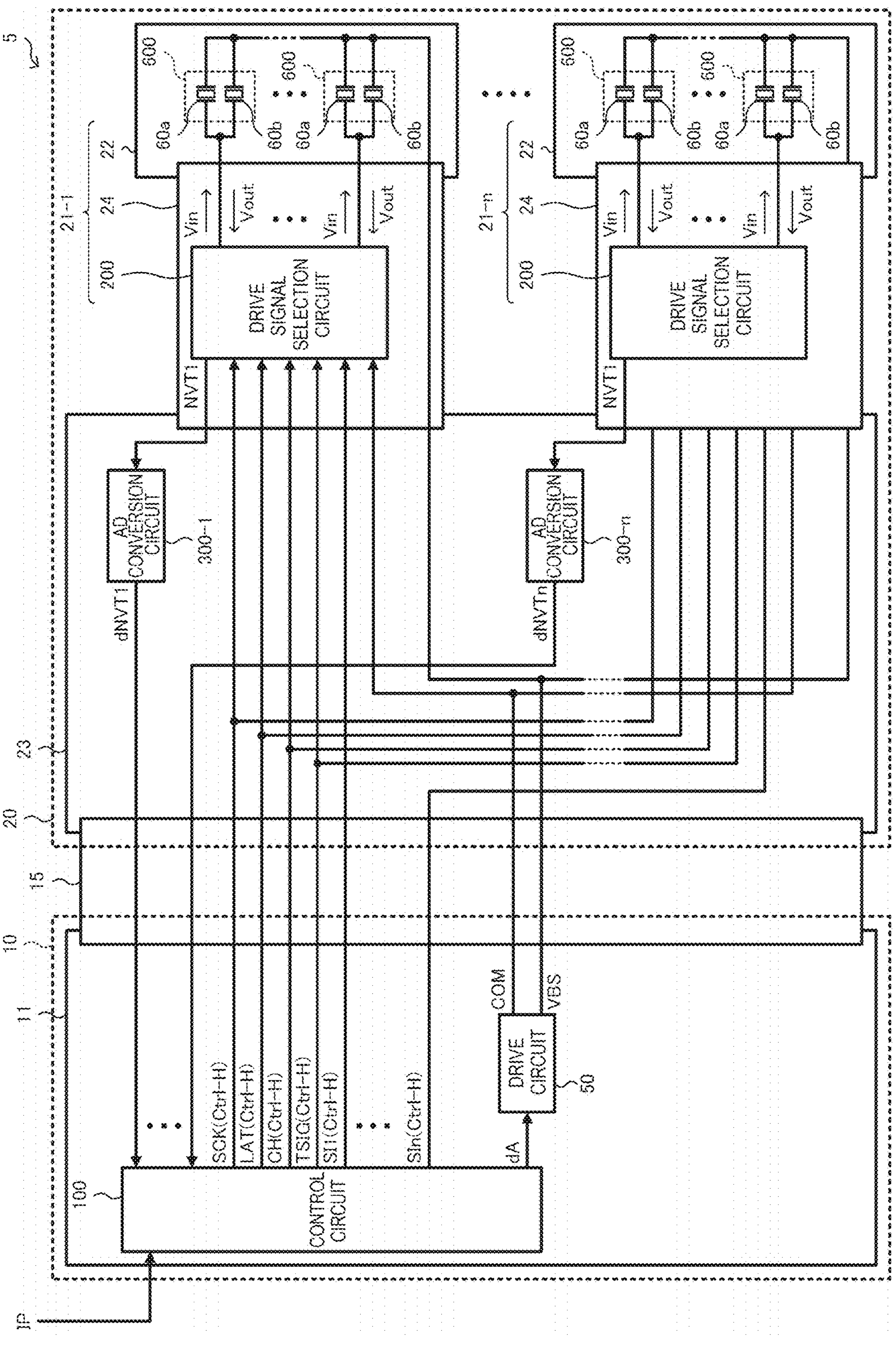
FIG. 2 is a diagram showing a schematic configuration of an ejection unit.

Then, a schematic configuration of the ejection unit 5 will be described. FIG. 2 is a diagram showing a schematic configuration of the ejection unit 5. As shown in FIG. 2, the ejection unit 5 has the drive module 10 and the ejection module 20. In the ejection unit 5, the drive module 10 and the ejection module 20 are electrically coupled to each other via a cable 15. Here, as the cable 15 for electrically coupling the drive module 10 and the ejection module 20, a flexible flat cable (FFC) or a flexible wiring board (FPC: Flexible Printed Circuit) can be used. Note that the drive module 10 and the ejection module 20 may be electrically coupled to each other with a board-to-board (BtoB) connector without using the cable 15, or may be electrically coupled to each other with both the cable 15 and the BtoB connector.

The drive module 10 has a control circuit board 11, a drive circuit 50, and a control circuit 100. The control circuit board 11 is a printed circuit board having a single wiring layer or a plurality of wiring layers, and a glass epoxy board, a glass polyimide board, or the like may be used as the control circuit board 11. Elements constituting the drive module 10 including the drive circuit 50 and the control circuit 100 are mounted on the control circuit board 11. Note that the control circuit board 11 on which the elements constituting the drive module 10 are mounted may be formed of a single printed circuit board or a plurality of printed circuit boards.

The control circuit 100 includes a processing circuit such as a CPU or an FPGA and a storage circuit such as a semiconductor memory device. The image information signal IP output by the control unit 2 is input to the control circuit 100. The control circuit 100 generates signals for controlling operations of the drive module 10 and the ejection module 20 based on the image information signal IP input to the control circuit 100, and then outputs the signals.

Specifically, the control circuit 100 generates a clock signal SCK, a latch signal LAT, a change signal CH, an inspection timing signal TSIG, and print data signals SI1 to SIn based on the image information signal IP input to the control circuit 100, and then outputs these signals to the ejection module 20.

Further, the control circuit 100 generates a base drive signal dA and outputs the base drive signal dA to the drive circuit 50. The drive circuit 50 generates a drive signal COM including a signal waveform defined by the base drive signal dA input thereto, and then outputs the drive signal COM to the ejection module 20. Specifically, the control circuit 100 generates the base drive signal dA as a digital signal and then outputs the base drive signal dA to the drive circuit 50. The drive circuit 50 converts the base drive signal dA as a digital signal input to the drive circuit 50 into an analog signal, and then performs class-D amplification on the analog signal thus converted to thereby generate the drive signal COM. Then, the drive circuit 50 outputs the drive signal COM thus generated to the ejection module 20. That is, the base drive signal dA output by the control circuit 100 defines the signal waveform of the drive signal COM output by the drive circuit 50.

Note that the base drive signal dA input to the drive circuit 50 is only required to be a signal capable of defining the signal waveform of the drive signal COM, and may be an analog signal. Further, the drive circuit 50 is only required to be able to generate the drive signal COM by amplifying the signal waveform defined by the base drive signal dA, and may generate the drive signal COM by performing class-A amplification, class-B amplification, or class-AB amplification instead of the class-D amplification.

Further, the drive circuit 50 generates a reference voltage signal VBS and then outputs the reference voltage signal VBS to the ejection module 20. The reference voltage signal VBS is a signal that is constant in voltage value, and that defines a reference potential for drive of piezoelectric elements 60*a*, 60*b* provided to an ejector 600 described later. The voltage value of such a reference voltage signal VBS may be, for example, a ground potential GND, or may be 5.5 V, 6 V, or the like. Note that in FIG. 2, the illustration is made assuming that the drive circuit 50 generates the reference voltage signal VBS, and outputs the reference voltage signal VBS to the ejection module 20, but it is possible for the reference voltage signal VBS to be generated by a constant voltage output circuit or the like not shown and separately configured from the drive circuit 50.

Further, a residual vibration signal dNVT is input to the control circuit 100 from the ejection module 20 described later. The control circuit 100 determines whether the ejector 600 corresponding to the residual vibration signal T is normal based on the residual vibration signal dNVT that is input to the control circuit 100. Note that the details of the residual vibration signal dNVT input to the control circuit 100 and the details of determination on whether the ejector 600 is normal based on the residual vibration signal dNVT will be described later.

The ejection module 20 has print heads 21-1 to 21-*n*, a head circuit board 23, and AD conversion circuits 300-1 to 300-*n*. Further, each of the print heads 21-1 to 21-*n* has a head chip 22, a flexible board 24, and a drive signal selection circuit 200. Further, each of the head chips 22 provided respectively to the print heads 21-1 to 21-*n* has a plurality of ejectors 600, and each of the plurality of ejectors 600 includes the piezoelectric elements 60*a*, 60*b*.

The clock signal SCK, the latch signal LAT, the change signal CH, the inspection timing signal TSIG, the print data signals SI1 to SIn, the drive signal COM, and the reference voltage signal VBS output by the drive module 10 are input to the ejection module 20.

The head circuit board 23 propagates the clock signal SCK, the latch signal LAT, the change signal CH, the inspection timing signal TSIG, the print data signals SI1 to SIn, the drive signal COM, and the reference voltage signal VBS, that are input to the head circuit board 23, to the corresponding print heads 21-1 to 21-*n*. Such a head circuit board 23 is a printed circuit board having a single wiring layer or a plurality of wiring layers, and as the head circuit board 23, a glass epoxy board or a glass polyimide board, for example, may be used.

Out of the clock signal SCK, the latch signal LAT, the change signal CH, the inspection timing signal TSIG, the print data signals SI1 to SIn, the drive signal COM, and the reference voltage signal VBS, the head circuit board 23 propagates the clock signal SCK, the latch signal LAT, the change signal CH, the inspection timing signal TSIG, the print data signal SI1, the drive signal COM, and the reference voltage signal VBS to the print head 21-1.

Out of the clock signal SCK, the latch signal LAT, the change signal CH, the inspection timing signal TSIG, the print data signal SI1, the drive signal COM, and the reference voltage signal VBS input to the print head 21-1, the clock signal SCK, the latch signal LAT, the change signal CH, the inspection timing signal TSIG, the print data signal SI1, and the drive signal COM are input to the drive signal selection circuit 200 of the print head 21-1. The drive signal selection circuit 200 of the print head 21-1 selects or deselects a signal waveform that the drive signal COM includes based on the clock signal SCK, the latch signal LAT, the change signal CH, the inspection timing signal TSIG, and the print data signal SI1 input to the drive signal selection circuit 200 to thereby generate drive voltage signals Vin corresponding respectively to the plurality of ejectors 600 provided to the head chip 22 of the print head 21-1, and then supplies the drive voltage signal Vin to one ends of the piezoelectric elements 60*a*, 60*b* that the ejector 600 corresponding thereto includes.

On this occasion, the reference voltage signal VBS is supplied to the other ends of the piezoelectric elements 60*a*, 60*b* provided to each of the plurality of ejectors 600 provided to the head chip 22 of the print head 21-1. Further, the piezoelectric elements 60*a*, 60*b* provided to the plurality of ejectors 600 are driven in accordance with the potential difference between the voltage value of the drive voltage signal Vin supplied to one ends and the voltage value of the reference voltage signal VBS supplied to the other ends. The ink is ejected from the ejector 600 corresponding thereto due to the drive of these piezoelectric elements 60*a*, 60*b*.

Further, a residual vibration signal Vout corresponding to the residual vibration generated after the piezoelectric elements 60*a*, 60*b* provided to the plurality of ejectors 600 provided to the head chip 22 of the print head 21-1 are driven is input to the drive signal selection circuit 200 of the print head 21-1. The drive signal selection circuit 200 generates a residual vibration signal NVT1 corresponding to the residual vibration signal Vout input to the drive signal selection circuit 200, and then outputs the residual vibration signal NVT1 from the print head 21-1.

Such a drive signal selection circuit 200 provided to the print head 21-1 is configured as an integrated circuit device, and is COF (Chip On Film)-mounted on the flexible board 24 provided to the print head 21-1.

Similarly, out of the clock signal SCK, the latch signal LAT, the change signal CH, the inspection timing signal TSIG, the print data signals SI1 to SIn, the drive signal COM, and the reference voltage signal VBS, the head circuit board 23 propagates the clock signal SCK, the latch signal LAT, the change signal CH, the inspection timing signal TSIG, a print data signal SIi (i is any one of 1 to n), the drive signal COM, and the reference voltage signal VBS to a print head 21-*i*.

Out of the clock signal SCK, the latch signal LAT, the change signal CH, the inspection timing signal TSIG, the print data signal SIi, the drive signal COM, and the reference voltage signal VBS input to the print head 21-*i*, the clock signal SCK, the latch signal LAT, the change signal CH, the inspection timing signal TSIG, the print data signal SIi, and the drive signal COM are input to the drive signal selection circuit 200 of the print head 21-*i*. The drive signal selection circuit 200 of the print head 21-*i* selects or deselects a signal waveform that the drive signal COM includes based on the clock signal SCK, the latch signal LAT, the change signal CH, the inspection timing signal TSIG, and the print data signal SIi input to the drive signal selection circuit 200 to thereby generate the drive voltage signals Vin corresponding respectively to the plurality of ejectors 600 provided to the head chip 22 of the print head 21-*i*, and then supplies the drive voltage signal Vin commonly to one ends of the piezoelectric elements 60*a*, 60*b* that the ejector 600 corresponding thereto includes.

On this occasion, the reference voltage signal VBS is supplied to the other ends of the piezoelectric elements 60*a*, 60*b* provided to each of the plurality of ejectors 600 provided to the head chip 22 of the print head 21-*i*. Further, the piezoelectric elements 60*a*, 60*b* provided to the plurality of ejectors 600 are driven in accordance with the potential difference between the voltage value of the drive voltage signal Vin supplied to one ends and the voltage value of the reference voltage signal VBS supplied to the other ends. The ink is ejected from the ejector 600 corresponding thereto due to the drive of these piezoelectric elements 60*a*, 60*b*.

Further, the residual vibration signal Vout corresponding to the residual vibration generated after the piezoelectric elements 60*a*, 60*b* provided to the plurality of ejectors 600 provided to the head chip 22 of the print head 21-*i* are driven is input to the drive signal selection circuit 200 of the print head 21-1. The drive signal selection circuit 200 generates a residual vibration signal NVTi corresponding to the residual vibration signal Vout input to the drive signal selection circuit 200, and then outputs the residual vibration signal NVTi from the print head 21-*i*.

Such a drive signal selection circuit 200 provided to the print head 21-*i* is configured as an integrated circuit device, and is COF-mounted on the flexible board 24 provided to the print head 21-1.

Here, when the drive signal selection circuit 200 provided to each of the print heads 21-1 to 21-*i* is COF-mounted on the flexible board 24 corresponding to the print head is not a limitation, and the drive signal selection circuit 200 may be provided to the head circuit board 23, but is preferably COF-mounted on the flexible board 24 corresponding to the print head as shown in the present embodiment. Thus, the propagation path of the drive voltage signal Vin output by the drive signal selection circuit 200 and the propagation path of the residual vibration signal Vout input to the drive signal selection circuit 200 can be shortened, and the possibility that noise is superimposed on the drive voltage signal Vin and the residual vibration signal Vout is reduced, and the possibility that distortion occurs in the signal waveform of the drive voltage signal Vin and the residual vibration signal Vout due to the influence of the impedance of the propagation path is reduced. As a result, the accuracy of the signal waveform of the drive voltage signal Vin supplied to the piezoelectric elements 60*a*, 60*b* provided to the ejector 600 corresponding to the drive voltage signal Vin is improved, the driving accuracy of the piezoelectric elements 60*a*, 60*b* is improved, and the determination accuracy on whether the ejector 600 is normal in accordance with the residual vibration signal Vout in the control circuit 100 is improved.

The AD conversion circuits 300-1 to 300-*n* are provided to the head circuit board 23 so as to correspond to the print heads 21-1 to 21-*n*. Specifically, the AD conversion circuit 300-1 is provided so as to correspond to the print head 21-1, and the residual vibration signal NVT1 output by the drive signal selection circuit 200 of the print head 21-1 is input to the AD conversion circuit 300-1. Then, the AD conversion circuit 300-1 generates a residual vibration signal dNVT1 which is obtained by converting the residual vibration signal NVT1 input thereto into a digital signal, and then outputs the residual vibration signal dNVT1 to the control circuit 100. Similarly, an AD conversion circuit 300-*i* is provided so as to correspond to the print head 21-*i*, and the residual vibration signal NVTi output by the drive signal selection circuit 200 of the print head 21-*i* is input to the AD conversion circuit 300-1. Then, the AD conversion circuit 300-*i* generates a residual vibration signal dNVTi which is obtained by converting the residual vibration signal NVTi input thereto into a digital signal, and then outputs the residual vibration signal dNVTi to the control circuit 100. Such AD conversion circuits 300-1 to 300-*n* may be configured as a single integrated circuit device, or may be configured as a single integrated circuit device together with the drive signal selection circuit 200 provided to corresponding one of the print heads 21-1 to 21-*n*.

Here, the print heads 21-1 to 21-*n* are all substantially the same in configuration. Therefore, in the following description, when there is no need to distinguish the print heads 21-1 to 21-*n* from each other, the print heads 21-1 to 21-*n* may simply be referred to as print heads 21. The description will be presented assuming that on this occasion, the clock signal SCK, the latch signal LAT, the change signal CH, the inspection timing signal TSIG, a print data signal SI as the print data signals SI1 to SIn, the drive signal COM, and the reference voltage signal VBS are input to the print head 21, and a residual vibration signal NVT as the residual vibration signals NVT1 to NVTn is output. Further, the description will be presented assuming that the residual vibration signal NVT output by the print head 21 is converted into a digital signal in an AD conversion circuit 300 as the AD conversion circuits 300-1 to 300-*n*, to thereby be output as the residual vibration signal dNVT to the control circuit 100.

As described above, the liquid ejection apparatus 1 according to the present embodiment is provided with the ejection units 5 for ejecting the ink to the medium P, and the conveyance unit 4 for conveying the medium P on which the ink ejected from the print head 21 lands, and the ejection unit 5 is provided with the drive circuit 50 for outputting the drive signal COM, the print heads 21 for ejecting the ink based on the drive signal COM, the AD conversion circuits 300 for converting the residual vibration signals NVT corresponding to the residual vibration signals Vout into the residual vibration signals dNVT as the digital signals, and the control circuit 100 for determining whether the print heads 21 including the ejectors 600 as the inspection target are normal based on the residual vibration signals dNVT output by the ejection module 20.

Figure 3:
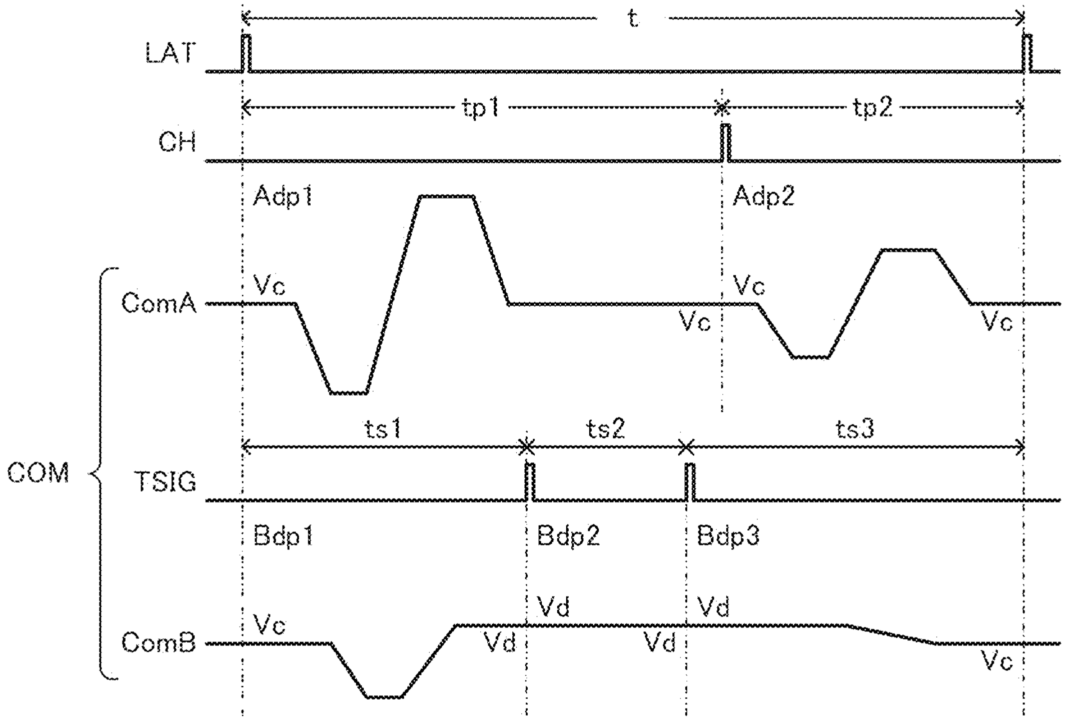
FIG. 3 is a diagram illustrating an example of a signal waveform of a drive signal COM.

2. Configuration and Operation of Drive Signal Selection Circuit 2.1 Signal Waveform of Drive Signal COM Then, the configuration and the operation of the drive signal selection circuit 200 that outputs the drive voltage signal Vin corresponding to each of the plurality of ejectors 600 by selecting or deselecting the signal waveform that the drive signal COM includes will be described. In describing the details of the drive signal selection circuit 200, an example of a signal waveform of the drive signal COM input to the drive signal selection circuit 200 will be described first. FIG. 3 is a diagram illustrating an example of the signal waveform of the drive signal COM. As shown in FIG. 3, the drive signal COM includes a drive signal ComA and a drive signal ComB.

The drive signal ComA includes drive waveforms Adp1, Adp2 as signal waveforms in a period t after the latch signal LAT rises until the latch signal LAT subsequently rises.

The drive waveform Adp1 is arranged in a period tp1 from the rise of the latch signal LAT to a rise of the change signal CH in the period t. The voltage value of the drive waveform Adp1 starts at a voltage Vc, then the voltage value changes so as to drive the piezoelectric elements 60*a*, 60*b*, and then the voltage value ends at the voltage Vc. When the drive waveform Adp1 is supplied to the piezoelectric elements 60*a*, 60*b*, a predetermined amount of ink is ejected from the ejector 600 corresponding to the piezoelectric elements 60*a*, 60*b*.

The drive waveform Adp2 is arranged in a period tp2 from the rise of the change signal CH to the rise of the latch signal LAT in the period t. The voltage value of the drive waveform Adp2 starts at the voltage Vc, then the voltage value changes so as to drive the piezoelectric elements 60*a*, 60*b*, and then the voltage value ends at the voltage Vc. When the drive waveform Adp2 is supplied to the piezoelectric elements 60*a*, 60*b*, a smaller amount of ink than the predetermined amount is ejected from the ejector 600 corresponding to the piezoelectric elements 60*a*, 60*b*.

Here, in the following description, in some cases, the predetermined amount of ink ejected from the ejector 600 corresponding to the piezoelectric elements 60*a*, 60*b* when the drive waveform Adp1 is supplied to the piezoelectric elements 60*a*, 60*b* may be referred to as a medium amount, and the smaller amount of ink than the predetermined amount ejected from the ejector 600 corresponding to when the drive waveform Adp2 is supplied to the piezoelectric elements 60*a*, 60*b* may be referred to as a small amount.

The drive signal ComB includes drive waveforms Bdp1, Bdp2, and Bdp3 as the signal waveforms in the period t.

The drive waveform Bdp1 is arranged in a period ts1 from the rise of the latch signal LAT to a rise of the inspection timing signal TSIG in the period t. The voltage value of the drive waveform Bdp1 starts at the voltage Vc, then the voltage value changes so as to drive the piezoelectric elements 60*a*, 60*b*, and then the voltage value ends at a voltage Vd. When the drive waveform Bdp1 is supplied to the piezoelectric elements 60*a*, 60*b*, the ink is not ejected from the ejector 600 corresponding to the piezoelectric elements 60*a*, 60*b*, and the piezoelectric elements 60*a*, 60*b* are driven so that a predetermined vibration is generated in the ejector 600 corresponding to the piezoelectric elements 60*a*, 60*b*.

The drive waveform Bdp2 is arranged in a period ts2 from the rise of the inspection timing signal TSIG defining the end of the period ts1 to a subsequent rise of the inspection timing signal TSIG in the period t. The voltage value of the drive waveform Bdp2 is constant at the voltage Vd. When the drive waveform Bdp2 is supplied to one ends of the piezoelectric elements 60*a*, 60*b*, the piezoelectric elements 60*a*, 60*b* are not driven, and accordingly the ink is not ejected from the ejector 600 corresponding to the piezoelectric elements 60*a*, 60*b*.

The drive waveform Bdp3 is arranged in a period ts3 from the rise of the inspection timing signal TSIG defining the end of the period ts2 to a subsequent rise of the latch signal LAT in the period t. The drive waveform Bdp3 starts with the voltage value at the voltage Vd, and is then terminated when the voltage value becomes the voltage Vc. When the drive waveform Bdp3 is supplied to the piezoelectric elements 60*a*, 60*b*, the piezoelectric elements 60*a*, 60*b* are not driven, and accordingly, the ink is not ejected from the ejector 600 corresponding to the piezoelectric elements 60*a*, 60*b*.

That is, the drive circuit 50 outputs the drive signal COM including the drive signal ComA including the drive waveforms Adp1, Adp2, and the drive signal ComB including the drive waveforms Bdp1, Bdp2, and Bdp3 to the drive signal selection circuit 200. Then, by selecting or deselecting the drive waveforms Adp1, Adp2, and the drive waveforms Bdp1, Bdp2, and Bdp3, the drive signal selection circuit 200 generates the drive voltage signal Vin including signal waveforms for expressing four gray levels of a large dot LD, a medium dot MD, a small dot SD, and non-recording ND on the medium P, and the drive voltage signal Vin including signal waveforms for executing a state inspection CD of inspecting the state of the ejector 600, and then outputs the drive voltage signals Vin thus generated to the ejector 600 corresponding thereto.

Note that the signal waveforms of the drive signal COM shown in FIG. 3 are illustrative only, and the drive circuit 50 may output the drive signal COM including signal waveforms of various shapes according to the type of the ink to be ejected, the type of the medium P on which the ink lands, and so on. Further, the drive circuit 50 may generate the drive signal COM including signal waveforms corresponding to each of the print heads 21-1 to **21-*n* and output the drive signal COM to the print heads 21-1 to 21-*n*** corresponding to the signal waveforms.

2.2 Configuration of Drive Signal Selection Circuit

Figure 4:
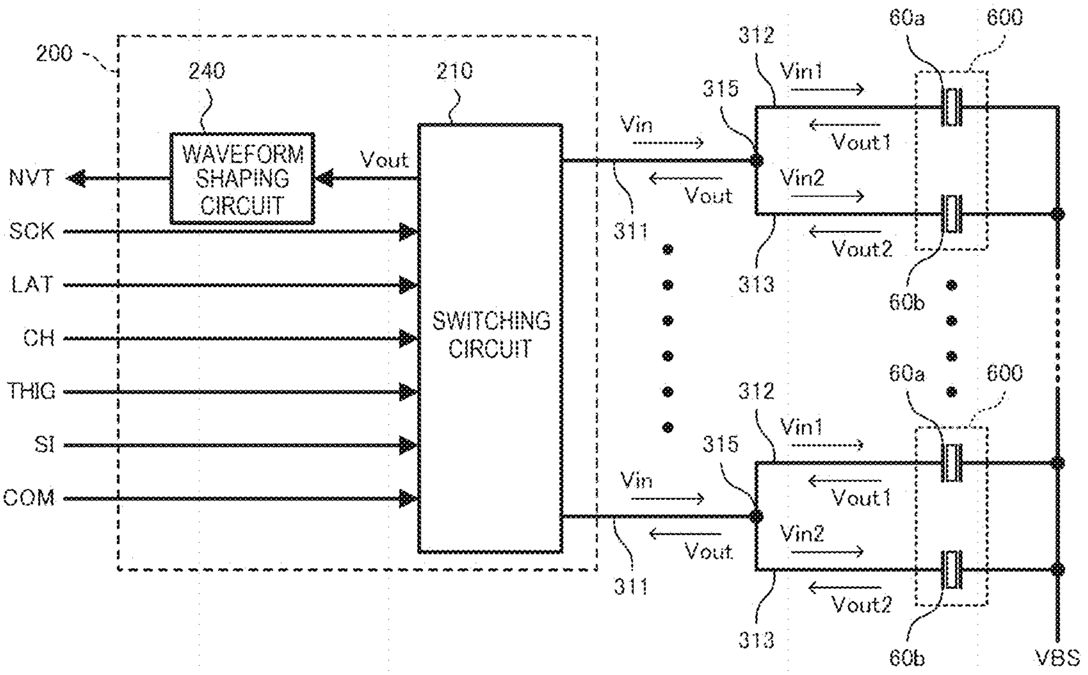
FIG. 4 is a diagram illustrating an example of a functional configuration of a drive signal selection circuit.

Then, a specific example of the configuration of the drive signal selection circuit 200 will be described. FIG. 4 is a diagram illustrating an example of a functional configuration of the drive signal selection circuit 200. As illustrated in FIG. 4, the drive signal selection circuit 200 includes a switching circuit 210 and a waveform shaping circuit 240.

The clock signal SCK, the latch signal LAT, the change signal CH, the inspection timing signal TSIG, the print data signal SI, and the drive signal COM are input to the switching circuit 210. The switching circuit 210 selects or deselects the drive waveforms Adp1, Adp2 provided to the drive signal ComA and the drive waveforms Bdp1, Bdp2, and Bdp3 provided to the drive signal ComB in the drive signal COM based on the clock signal SCK, the latch signal LAT, the inspection timing signal TSIG, the change signal CH, and the print data signal SI input to the switching circuit 210 to thereby generate the drive voltage signal Vin corresponding to each of the plurality of ejectors 600. Then, the drive voltage signals Vin generated by the switching circuit 210 are output from the drive signal selection circuit 200.

The drive voltage signal Vin output from the drive signal selection circuit 200 is supplied to the piezoelectric element **60*a* and the piezoelectric element 60*b* provided to the ejector 600 corresponding to the drive voltage signal Vin. Specifically, the drive voltage signal Vin output by the drive signal selection circuit 200 propagates through a wiring line 311. The wiring line 311 branches into a wiring line 312 and a wiring line 313 at a node 315. Then, by the wiring line 312 being electrically coupled to the piezoelectric element 60*a* provided to the ejector 600 corresponding thereto, and the wiring line 313 being electrically coupled to the piezoelectric element 60*a* provided to the ejector 600 corresponding thereto, the drive voltage signal Vin output from the drive signal selection circuit 200 is supplied to the piezoelectric element 60*a* and the piezoelectric element 60*b* provided to the ejector 600 corresponding to the drive voltage signal Vin. That is, the drive voltage signal Vin output by the drive signal selection circuit 200 propagates through the wiring line 311 and the wiring line 312 and is supplied to the piezoelectric element 60*a* provided to the ejector 600 corresponding thereto, and also propagates through the wiring line 311 and the wiring line 313 and is supplied to the piezoelectric element 60*b* provided to the ejector 600 corresponding thereto. In other words, the piezoelectric element 60*a* and the piezoelectric element 60*b* are electrically coupled to each other at the node 315**.

Here, in the following description, in some cases, the drive voltage signal Vin that is supplied to the piezoelectric element **60*a* and propagates through the wiring line 312 is referred to as a drive voltage signal Vin1, and the drive voltage signal Vin that is supplied to the piezoelectric element 60*b* and propagates through the wiring line 313 is referred to as a drive voltage signal Vin2**.

In addition, after the piezoelectric elements **60*a*, 60*b* are driven by the drive voltage signal Vin output by the drive signal selection circuit 200, the switching circuit 210 acquires the residual vibration signal Vout corresponding to the residual vibration generated in the ejector 600**.

Specifically, after the drive voltage signal Vin1 is supplied to the piezoelectric element **60*a* and the drive voltage signal Vin2 is supplied to the piezoelectric element 60*b*, the residual vibration is generated in the ejector 600. Then, the piezoelectric element 60*a* outputs counter-electromotive force generated in response to the residual vibration as a residual vibration signal Vout1, and the piezoelectric element 60*b* outputs counter-electromotive force generated in response to the residual vibration as a residual vibration signal Vout2**.

The residual vibration signal Vout1 output by the piezoelectric element **60*a* propagates through the wiring lines 312, 311 and is input to the drive signal selection circuit 200. Further, the residual vibration signal Vout2 output by the piezoelectric element 60*b* propagates through the wiring lines 313, 311 and is input to the drive signal selection circuit 200. That is, the residual vibration signal Vout in which the residual vibration signal Vout1 and the residual vibration signal Vout2 are synthesized with each other is input to the drive signal selection circuit 200. The switching circuit 210 acquires the residual vibration signal Vout input to the switching circuit 210, at a predetermined timing. Then, the switching circuit 210 outputs the residual vibration signal Vout thus acquired to the waveform shaping circuit 240**.

The waveform shaping circuit 240 shapes the signal waveform of the residual vibration signal Vout input to the waveform shaping circuit 240. Then, the waveform shaping circuit 240 outputs the signal obtained by shaping the waveform of the residual vibration signal Vout as the residual vibration signal NVT. The residual vibration signal NVT output by the waveform shaping circuit 240 is output from the drive signal selection circuit 200, and is then input to the AD conversion circuit 300.

2.2.1 Configuration of Switching Circuit

Figures 5, 6:
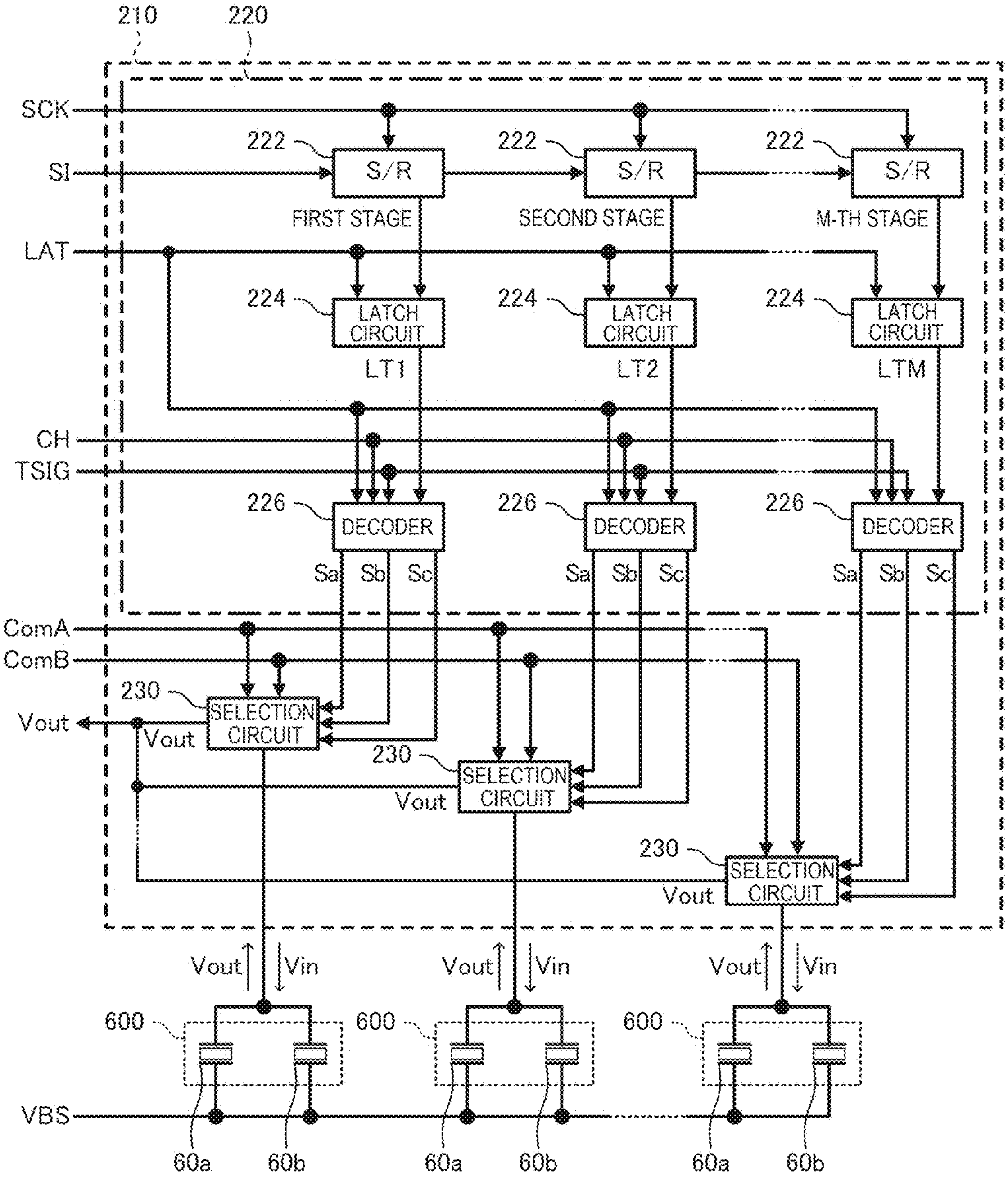
FIG. 5 is a diagram illustrating an example of a functional configuration of a switching circuit.
FIG. 6 is a diagram illustrating an example of decoding contents in a decoder 226.

A specific example of a configuration and an operation of the switching circuit 210 provided to the drive signal selection circuit 200 will be described. FIG. 5 is a diagram illustrating an example of a functional configuration of the switching circuit 210. As illustrated in FIG. 5, the switching circuit 210 includes a selection control circuit 220 and a plurality of selection circuits 230.

The clock signal SCK, the print data signal SI, the latch signal LAT, the change signal CH, and the inspection timing signal TSIG are input to the selection control circuit 220. Based on the clock signal SCK, the print data signal SI, the latch signal LAT, the change signal CH, and the inspection timing signal TSIG input thereto, the selection control circuit 220 generates selection signals Sa, Sb, and Sc having predetermined logic levels in each of the periods tp1, tp2 and the periods ts1, ts2, ts3, and then outputs the selection signals Sa, Sb, and Sc to the selection circuits 230 corresponding thereto.

The selection control circuit 220 includes a set of a shift register 222, a latch circuit 224, and a decoder 226 provided so as to correspond respectively to the plurality of ejectors 600 provided to the print head 21. Here, the description will be presented assuming that the print head 21 has the M ejectors 600. That is, the selection control circuit 220 includes M sets of the shift register 222, the latch circuit 224, and the decoder 226. In other words, the selection control circuit 220 includes the M shift registers 222, the M latch circuits 224, and the M decoders 226.

The print data signal SI serially includes 3-bit print data SId[SIH, SIM, SIL] for selecting which one of the large dot LD, the medium dot MD, the small dot SD, the non-recording ND, and the state inspection CD described above, the ejector 600 is to be driven to correspond to, so as to correspond to each of the M ejectors 600. That is, the print data signal SI is a serial signal of 3M bits or more in total.

The print data signal SI is input to the selection control circuit 220 in synchronization with the clock signal SCK. The M shift registers 222 provided to the selection control circuit 220 hold the 3-bit print data SId[SIH, SIM, SIL] provided to the print data signal SI input thereto so as to correspond to the ejectors 600.

Particularly, the M shift registers 222 are serially coupled so as to correspond respectively to the M ejectors 600. The print data signal SI serially input to the selection control circuit 220 is sequentially transferred to the subsequent stages of the M shift registers 222 serially coupled to one another in synchronization with the clock signal SCK. Then, when the supply of the clock signal SCK to the selection control circuit 220 is stopped, the 3-bit print data SId[SIH, SIM, SIL] corresponding to the M ejectors 600 are held in the M shift registers 222. Note that in the following description, in order to distinguish the M shift registers 222 serially coupled from each other, the M shift registers 222 may be referred to as a first stage, a second stage, . . . , and an M-th stage in this order from the upstream side to the downstream side in a direction in which the print data signal SI is supplied.

Each of the M latch circuits 224 latches the 3-bit print data SId[SIH, SIM, SIL] held in the shift register 222 corresponding thereto simultaneously at the rising edge of the latch signal LAT.

Then, the print data SId[SIH, SIM, SIL] latched by the M latch circuits 224 are input to the decoders 226 corresponding thereto. Each of the M decoders 226 decodes the print data SId[SIH, SIM, SIL] input thereto to generate the selection signals Sa, Sb, and Sc having the logic levels corresponding to the large dot LD, the medium dot MD, the small dot SD, the non-recording ND, and the state inspection CD, and then outputs the selection signals Sa, Sb, and Sc to the selection circuit 230 corresponding thereto.

FIG. 6 is a diagram illustrating an example of decoding contents in the decoder 226. As shown in FIG. 6, when the print data SId[SIH, SIM, SIL]=[1, 1, 0] corresponding to the large dot LD is input, the decoder 226 sets the logic level of the selection signal Sa to H, H levels in the periods tp1, tp2, sets the logic level of the selection signal Sb to L, L, and L levels in the periods ts1, ts2, and ts3, and sets the logic level of the selection signal Sc to L, L, and L levels in the periods ts1, ts2, and ts3.

Further, when the print data SId[SIH, SIM, SIL]=[1, 0, 0] corresponding to the medium dot MD is input, the decoder 226 sets the logic level of the selection signal Sa to H, L levels in the periods tp1, tp2, sets the logic level of the selection signal Sb to L, L, and L levels in the periods ts1, ts2, and ts3, and sets the logic level of the selection signal Sc to L, L, and L levels in the periods ts1, ts2, and ts3.

Further, when the print data SId[SIH, SIM, SIL]=[0, 1, 0] corresponding to the small dot SD is input, the decoder 226 sets the logic level of the selection signal Sa to L, H levels in the periods tp1, tp2, sets the logic level of the selection signal Sb to L, L, and L levels in the periods ts1, ts2, and ts3, and sets the logic level of the selection signal Sc to L, L, and L levels in the periods ts1, ts2, and ts3.

When the print data SId[SIH, SIM, SIL]=[0, 0, 0] corresponding to the non-recording ND is input, the decoder 226 sets the logic level of the selection signal Sa to L, L levels in the periods tp1, tp2, sets the logic level of the selection signal Sb to L, L, and L levels in the periods ts1, ts2, and ts3, and sets the logic level of the selection signal Sc to L, L, and L levels in the periods ts1, ts2, and ts3.

Further, when the print data SId[SIH, SIM, SIL]=[1, 1, 1] corresponding to the state inspection SD is input, the decoder 226 sets the logic level of the selection signal Sa to L, L levels in the periods tp1, tp2, sets the logic level of the selection signal Sb to H, L, and H levels in the periods ts1, ts2, and ts3, and sets the logic level of the selection signal Sc to L, H, and L levels in the periods ts1, ts2, and ts3.

As described above, based on the print data SId[SIH, SIM, SIL], the selection control circuit 220 generates the selection signals Sa, Sb, and Sc of the logic levels corresponding to each of the M ejectors 600. Then, the selection control circuit 220 outputs the selection signals Sa, Sb, and Sc thus generated to the corresponding selection circuits 230.

The selection circuit 230 is provided so as to correspond to each of the M ejectors 600. That is, the switching circuit 210 includes the M selection circuits 230.

Figure 7:
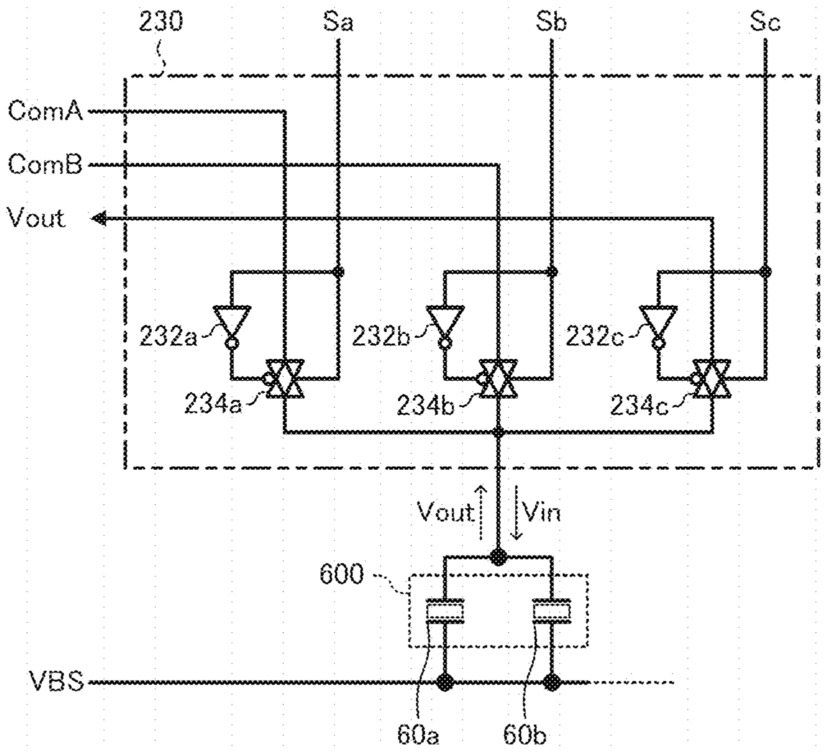
FIG. 7 is a diagram illustrating a configuration of a selection circuit 230 corresponding to one ejector.

Then, the drive signal COM is input to each of the M selection circuits 230, and whether the drive voltage signal Vin corresponding to the drive signal COM is output to the ejector 600 corresponding to the drive voltage signal Vin is switched. FIG. 7 is a diagram showing a configuration of the selection circuit 230 corresponding to one ejector 600. As shown in FIG. 7, the selection circuit 230 has NOT circuits 232*a*, 232*b*, and 232*c* and transfer gates 234*a*, 234*b*, and 234*c*.

The selection signal Sa is supplied to a positive control terminal of the transfer gate 234*a*, and is inverted in logic level by the NOT circuit 232*a*, and is then also supplied to a negative control terminal of the transfer gate 234*a*. The selection signal Sb is supplied to a positive control terminal of the transfer gate 234*b*, and is inverted in logic level by the NOT circuit 232*b*, and is then also supplied to a negative control terminal of the transfer gate 234*b*. The selection signal Sc is supplied to a positive control terminal of the transfer gate 234*c*, and is inverted in logic level by the NOT circuit 232*c*, and is then also supplied to a negative control terminal of the transfer gate 234*c*.

Further, the drive signal ComA is supplied to an input terminal of the transfer gate 234*a*, and the drive signal ComB is supplied to an input terminal of the transfer gate 234*b*. Further, output terminals of the transfer gates 234*a*, 234*b* are coupled to each other. The output terminals of the transfer gates 234*a*, 234*b* coupled to each other are electrically coupled to the ejector 600 corresponding thereto via the wiring line 311 corresponding thereto. Further, an input terminal of the transfer gate 234*c* is electrically coupled to the output terminals of the transfer gates 234*a*, 234*b* coupled to each other and one end of the ejector 600. As shown in FIG. 5, output terminals of the transfer gates 234*c* of the M selection circuits 230 provided to the switching circuit 210 are commonly coupled to each other. That is, the output terminals of the transfer gates 234*c* of the M selection circuits 230 provided to the switching circuit 210 are electrically coupled to each other at the coupling point.

In the selection circuit 230 configured as described hereinabove, when the logic level of the selection signal Sa is at the H level, the transfer gate 234*a* becomes conductive between the input terminal and the output terminal, and when the logic level of the selection signal Sa is at the L level, the transfer gate 234*a* becomes non-conductive between the input terminal and the output terminal. Similarly, when the logic level of the selection signal Sb is at the H level, the transfer gate 234*b* becomes conductive between the input terminal and the output terminal, and when the logic level of the selection signal Sb is at the L level, the transfer gate 234*b* becomes non-conductive between the input terminal and the output terminal. Similarly, when the logic level of the selection signal Sc is at the H level, the transfer gate 234*c* becomes conductive between the input terminal and the output terminal, and when the logic level of the selection signal Sc is at the L level, the transfer gate 234*c* becomes non-conductive between the input terminal and the output terminal. Here, in the following description, the conductive state between the input terminal and the output terminal may be referred to as "ON", and the non-conductive state between the input terminal and the output terminal may be referred to as "OFF", in some cases.

Then, when the transfer gate 234*a* is turned on, the drive signal ComA is output from the switching circuit 210 as the drive voltage signal Vin, and when the transfer gate 234*b* is turned on, the drive signal ComB is output from the switching circuit 210 as the drive voltage signal Vin. The drive voltage signal Vin output from the switching circuit 210 is supplied to the ejector 600 corresponding thereto. Further, by the transfer gate 234*c* being turned on, the switching circuit 210 acquires the residual vibration signal Vout corresponding to the residual vibration generated in the ejector 600 corresponding thereto. Then, the switching circuit 210 outputs the residual vibration signal Vout thus acquired to the waveform shaping circuit 240. That is, the waveform shaping circuit 240 is electrically coupled to the coupling point to which the output terminals of the transfer gates 234*c* of the M selection circuits 230 are coupled in common, and the waveform shaping circuit 240 outputs the residual vibration signal NVT corresponding to the signal at that coupling point.

That is, the switching circuit 210 has the selection control circuit 220 that outputs the selection signal Sa for controlling switching of the conduction state of the transfer gate 234*a*, the selection signal Sb for controlling switching of the conduction state of the transfer gate 234*b*, and the selection signal Sc for controlling switching of the conduction state of the transfer gate 234*c*. Further, the selection circuit 230 has the single transfer gate 234*a* that switches whether to supply the drive signal ComA as the drive signal COM commonly to the piezoelectric element 60*a* and the piezoelectric element 60*b* as the drive voltage signal Vin in accordance with the selection signal Sa, the single transfer gate 234*b* that switches whether to supply the drive signal ComB as the drive signal COM commonly to the piezoelectric element 60*a* and the piezoelectric element 60*b* as the drive voltage signal Vin in accordance with the selection signal Sb, and the single transfer gate 234*c* that switches whether to output the residual vibration signal Vout, that is a composite wave of the residual vibration signal Vout1 and the residual vibration signal Vout2, to the waveform shaping circuit 240 in accordance with the selection signal Sc. That is, the transfer gate 234*a* has one end to which the drive signal ComA is input and the other end electrically coupled to the node 315 to switch whether to supply the drive signal ComA commonly to the piezoelectric element 60*a* and the piezoelectric element 60*b* in accordance with the selection signal Sa input to the control terminal, the transfer gate 234*b* has one end to which the drive signal ComB is input and the other end electrically coupled to the node 315 to switch whether to supply the drive signal ComB commonly to the piezoelectric element 60*a* and the piezoelectric element 60*b* in accordance with the selection signal Sb input to the control terminal, and the transfer gate 234*c* has one end electrically coupled to the node 315 and the other end electrically coupled to the waveform shaping circuit 240 to switch the conduction state between the node 315 and the waveform shaping circuit 240 in accordance with the selection signal Sc input to the control terminal to thereby switch whether to output the residual vibration signal Vout to the waveform shaping circuit 240.

Figure 8:
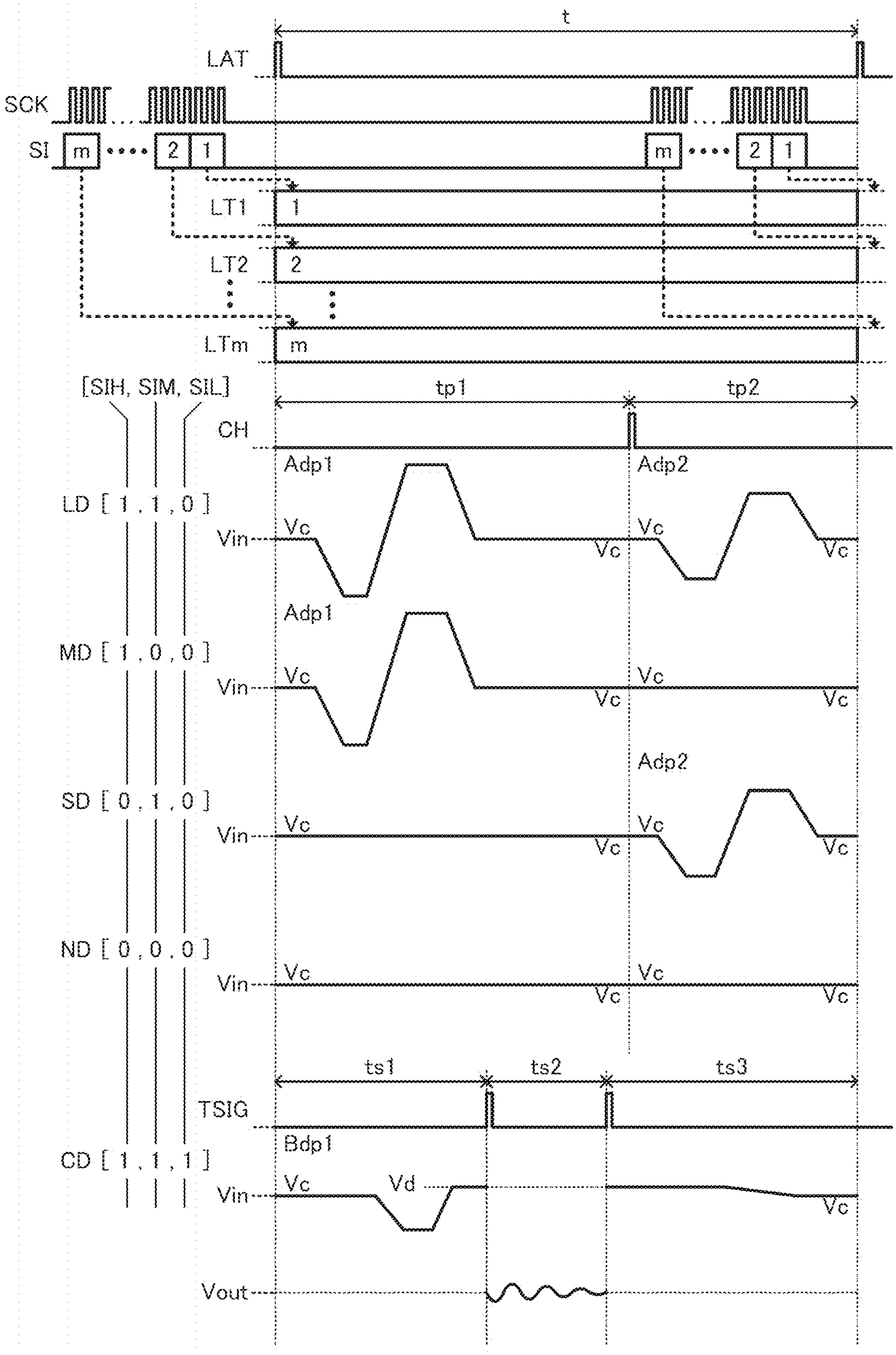
FIG. 8 is a diagram showing an example of an operation of the switching circuit.

The details of the operation of the switching circuit 210 configured as described above will be described. FIG. 8 is a diagram illustrating an example of the operation of the switching circuit 210. The print data signal SI is serially supplied to the switching circuit 210 in synchronization with the clock signal SCK. The print data signal SI input to the switching circuit 210 is sequentially transferred to the shift registers 222 in the subsequent stages in synchronization with the clock signal SCK. Then, when the supply of the clock signal SCK to the switching circuit 210 is stopped, the 3-bit print data SId[SIH, SIM, SIL] corresponding to the M ejectors 600 is held in the M shift registers 222.

Thereafter, when the latch signal LAT rises, each of the latch circuits 224 simultaneously latches the print data SId[SIH, SIM, SIL] held in the shift register 222. Here, LT1, LT2, . . . , LTM shown in FIG. 8 represent the print data SId[SIH, SIM, SIL] which is held by the shift registers 222 in the first stage, the second stage, . . . , and the M-th stage and then latched by the corresponding latch circuits 224.

The decoder 226 decodes the print data SId[SIH, SIM, SIL] thus latched with the contents shown in FIG. 8. Then, the decoder 226 outputs the selection signals Sa, Sb, Sc at the logic levels shown in FIG. 8 in the period t.

Specifically, in the case of the print data SId[SIH, SIM, SIL]=[1, 1, 0], the decoder 226 sets the logic level of the selection signal Sa to H, H levels in the periods tp1, tp2, sets the logic level of the selection signal Sb to L, L, and L levels in the periods ts1, ts2, and ts3, and sets the logic level of the selection signal Sc to L, L, and L levels in the periods ts1, ts2, and ts3. Accordingly, the selection circuit 230 selects the drive waveform Adp1 of the drive signal ComA in the period tp1, and selects the drive waveform Adp2 of the drive signal ComA in the period tp2. As a result, the switching circuit 210 outputs the drive voltage signal Vin corresponding to the large dot LD shown in FIG. 10. When the drive voltage signal Vin corresponding to the large dot LD is supplied to the ejector 600, the medium amount of ink is ejected in the period tp1, and the small amount of ink is ejected in the period tp2 from the ejector 600. As a result, in the period t, the medium amount of ink and the small amount of ink land on the medium P and are combined with each other. Thus, the large dot LD is formed on the medium P.

Further, in the case of the print data SId[SIH, SIM, SIL]=[1, 0, 0], the decoder 226 sets the logic level of the selection signal Sa to H, L levels in the periods tp1, tp2, sets the logic level of the selection signal Sb to L, L, and L levels in the periods ts1, ts2, and ts3, and sets the logic level of the selection signal Sc to L, L, and L levels in the periods ts1, ts2, and ts3. Accordingly, the selection circuit 230 selects the drive waveform Adp1 of the drive signal ComA in the period tp1, and does not select any signal waveforms of the drive signals ComA, ComB in the period tp2. As a result, the switching circuit 210 outputs the drive voltage signal Vin corresponding to the medium dot MD shown in FIG. 8. When the drive voltage signal Vin corresponding to the medium dot MD is supplied to the ejector 600, the medium amount of ink is ejected from the ejector 600 in the period tp1, and no ink is ejected in the period tp2. As a result, the medium amount of ink lands on the medium P in the period t. Accordingly, the medium dot MD is formed on the medium P.

Further, in the case of the print data SId[SIH, SIM, SIL]=[0, 1, 0], the decoder 226 sets the logic level of the selection signal Sa to L, H levels in the periods tp1, tp2, sets the logic level of the selection signal Sb to L, L, and L levels in the periods ts1, ts2, and ts3, and sets the logic level of the selection signal Sc to L, L, and L levels in the periods ts1, ts2, and ts3. Accordingly, the selection circuit 230 does not select any signal waveform of the drive signals ComA, ComB in the period tp1, and selects the drive waveform Adp2 of the drive signal ComA in the period tp2. As a result, the switching circuit 210 outputs the drive voltage signal Vin corresponding to the small dot SD shown in FIG. 8. When the drive voltage signal Vin corresponding to the small dot SD is supplied to the ejector 600, no ink is ejected in the period tp1, and the small amount of ink is ejected in the period tp2 from the ejector 600. As a result, the small amount of ink lands on the medium P in the period t. Accordingly, the small dot SD is formed on the medium P.

In the case of the print data SId[SIH, SIM, SIL]=[0, 0, 0], the decoder 226 sets the logic level of the selection signal Sa to L, L levels in the periods tp1, tp2, sets the logic level of the selection signal Sb to L, L, and L levels in the periods ts1, ts2, and ts3, and sets the logic level of the selection signal Sc to L, L, and L levels in the periods ts1, ts2, and ts3. Accordingly, the selection circuit 230 does not select any signal waveform of the drive signals ComA, ComB in the period tp1, and does not select any waveform of the drive signals ComA, ComB in the period tp2. As a result, the switching circuit 210 outputs the drive voltage signal Vin corresponding to the non-recording ND illustrated in FIG. 8. When the drive voltage signal Vin corresponding to the non-recording ND is supplied to the ejector 600, the ink is not ejected in the period tp1, and the ink is not ejected in the period tp2 from the ejector 600. As a result, the ink does not land on the medium P in the period t. Therefore, no dot is formed on the medium P.

Further, in the case of the print data SId[SIH, SIM, SIL]=[1, 1, 1], the decoder 226 sets the logic level of the selection signal Sa to L, L levels in the periods tp1, tp2, sets the logic level of the selection signal Sb to H, L, and H levels in the periods ts1, ts2, and ts3, and sets the logic level of the selection signal Sc to L, H, and L levels in the periods ts1, ts2, and ts3. Accordingly, the selection circuit 230 selects the drive waveform Bdp1 of the drive signal ComB in the period ts1, then acquires the residual vibration signal Vout corresponding to the residual vibration generated in the ejector 600 after the piezoelectric elements 60*a*, 60*b* are driven by the drive waveform Bdp1 in the period ts2, outputs the residual vibration signal Vout thus acquired from the switching circuit 210, and selects the drive waveform Bdp3 of the drive signal ComB in the period ts3. As a result, the switching circuit 210 outputs the drive voltage signal Vin corresponding to the state inspection CD shown in FIG. 8 in the periods ts1, ts3, acquires the residual vibration signal Vout corresponding to the vibration generated in the ejector 600 after the drive waveform Bdp1 is supplied to the ejector 600 and then outputs the residual vibration signal Vout to the waveform shaping circuit 240 in the period ts2. On this occasion, the ink is not ejected from the ejector 600 in the period t. As a result, the ink does not land on the medium P in the period t. Therefore, no dot is formed on the medium P.

As described above, the switching circuit 210 generates the drive voltage signal Vin by selecting or deselecting the drive waveforms Adp1, Adp2 provided to the drive signal ComA and the drive waveforms Bdp1, Bdp2, and Bdp3 provided to the drive signal ComB in the drive signal COM output by the drive circuit 50 based on the clock signal SCK, the print data signal SI, the latch signal LAT, the change signal CH, and the inspection timing signal TSIG. Then, the switching circuit 210 supplies the drive voltage signal Vin thus generated to the ejector 600 corresponding thereto, acquires the residual vibration signal Vout generated after the drive voltage signal Vin is supplied to the ejector 600, and outputs the residual vibration signal Vout to the waveform shaping circuit 240.

2.2.2 Configuration of Waveform Shaping Circuit

Figure 9:
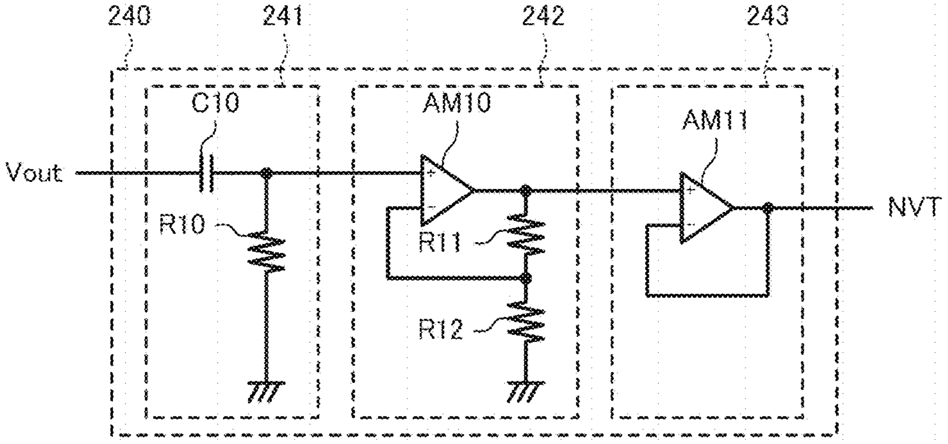
FIG. 9 is a diagram illustrating an example of a configuration of a waveform shaping circuit.

Then, a specific example of a configuration and an operation of the waveform shaping circuit 240 provided to the drive signal selection circuit 200 will be described. FIG. 9 is a diagram illustrating an example of the configuration of the waveform shaping circuit 240. As illustrated in FIG. 9, the waveform shaping circuit 240 includes a filter circuit 241, an amplifier circuit 242, and an impedance conversion circuit 243.

The filter circuit 241 includes a capacitor C10 and a resistor R10. The residual vibration signal Vout is supplied to one end of the capacitor C10. The other end of the capacitor C10 is electrically coupled to one end of the resistor R10. The ground potential is supplied to the other end of the resistor R10. As described above, the filter circuit 241 forms a high-pass filter. Then, the filter circuit 241 extracts a high frequency component superimposed on the residual vibration signal Vout by reducing a low frequency component to be superimposed on the residual vibration signal Vout.

That is, the waveform shaping circuit 240 includes the filter circuit 241 for extracting the AC component contained in the residual vibration signal Vout. Note that the filter circuit 241 may form a so-called band-pass filter having a low-pass filter in addition to a high-pass filter, and may extract a signal of a predetermined frequency component to be superimposed on the residual vibration signal Vout.

The amplifier circuit 242 includes an operational amplifier AM10 and resistors R11, R12. A signal output by the filter circuit 241 is input to a positive input terminal of the operational amplifier AM10. A negative input terminal of the operational amplifier AM10 is electrically coupled to one end of the resistor R11 and one end of the resistor R12. The other end of the resistor R11 is electrically coupled to an output terminal of the operational amplifier AM10. The ground potential is supplied to the other end of the resistor R12. The amplifier circuit 242 configured as described above amplifies a signal that is output by the filter circuit 241 and input to the positive input terminal of the operational amplifier AM10 with a gain defined by the resistance values of the resistors R11, R12. That is, the amplifier circuit 242 configures a non-inverting amplifier circuit that amplifies the amplitude of a signal obtained by extracting the AC component of the residual vibration signal Vout with a gain defined by the resistance values of the resistors R11, R12. In other words, the waveform shaping circuit 240 includes the amplifier circuit 242 that amplifies the signal of the AC component extracted by the filter circuit 241. Note that the amplifier circuit 242 is only required to be able to amplify the amplitude of the signal obtained by extracting the AC component of the residual vibration signal Vout with a predetermined gain, and is not limited to the non-inverting amplifier circuit.

The impedance conversion circuit 243 includes an operational amplifier AM11. A signal output by the amplifier circuit 242 is input to the positive input terminal of the operational amplifier AM11. In addition, the negative input terminal of the operational amplifier AM11 is electrically coupled to an output terminal of the operational amplifier AM11. The impedance conversion circuit 243 configured as described above constitutes a so-called voltage follower circuit that outputs a signal having the same signal waveform as the signal waveform of the signal input to the positive input terminal of the operational amplifier AM11 from the output terminal of the operational amplifier AM11.

Then, the waveform shaping circuit 240 outputs, as the residual vibration signal NVT, a signal that is output from the output terminal of the operational amplifier AM10 provided to the amplifier circuit 242, and is output from the output terminal of the operational amplifier AM11 provided to the impedance conversion circuit 243.

The piezoelectric elements 60*a*, 60*b* provided to the ejector 600 as an inspection target are driven by supplying the drive voltage signal Vin corresponding to the state inspection CD, and then, a high-frequency damped vibration is generated in the ejector 600 as the inspection target. Then, the piezoelectric elements 60*a*, 60*b* output the residual vibration signals Vout1, Vout2 corresponding to the damped vibration generated in the ejector 600 as the inspection target. That is, the switching circuit 210 acquires a signal of the composite wave of the residual vibration signals Vout1, Vout2, that is obtained by combining signal waveforms of the high-frequency damped vibrations as the residual vibration signal Vout corresponding to the ejector 600 as the inspection target. Such a residual vibration signal Vout is small in voltage amplitude, and is therefore easily affected by noise.

In contrast, in the waveform shaping circuit 240 of the present embodiment, by removing noise in the low-frequency component and the DC component from the residual vibration signal Vout in the filter circuit 241 to extract the high-frequency component that the residual vibration signal Vout includes, the signal corresponding to the high frequency damped vibration generated in the ejector 600 as the inspection target, and then, by amplifying the signal output by the filter circuit 241 in the amplifier circuit 242, the resistance to noise is improved. Further, the impedance conversion circuit 243 converts the impedance of the signal output by the amplifier circuit 242 to thereby enhance the stability of the residual vibration signal NVT output by the waveform shaping circuit 240. That is, the waveform shaping circuit 240 of the present embodiment outputs the signal that corresponds to the residual vibration signal Vout, that is obtained by shaping the signal waveform of the residual vibration signal Vout input thereto, that is reduced in influence of noise and so on, in which the resistance to noise is improved, and that is high in stability, as the residual vibration signal NVT.

As described above, the residual vibration signal Vout, which is the residual vibration signal Vout1 and the residual vibration signal Vout2, and is a composite wave of the residual vibration signal Vout1 and the residual vibration signal Vout2, is input to the waveform shaping circuit 240, and the waveform shaping circuit 240 outputs the residual vibration signal NVT.

3. Structure of Print Head

Figure 10:
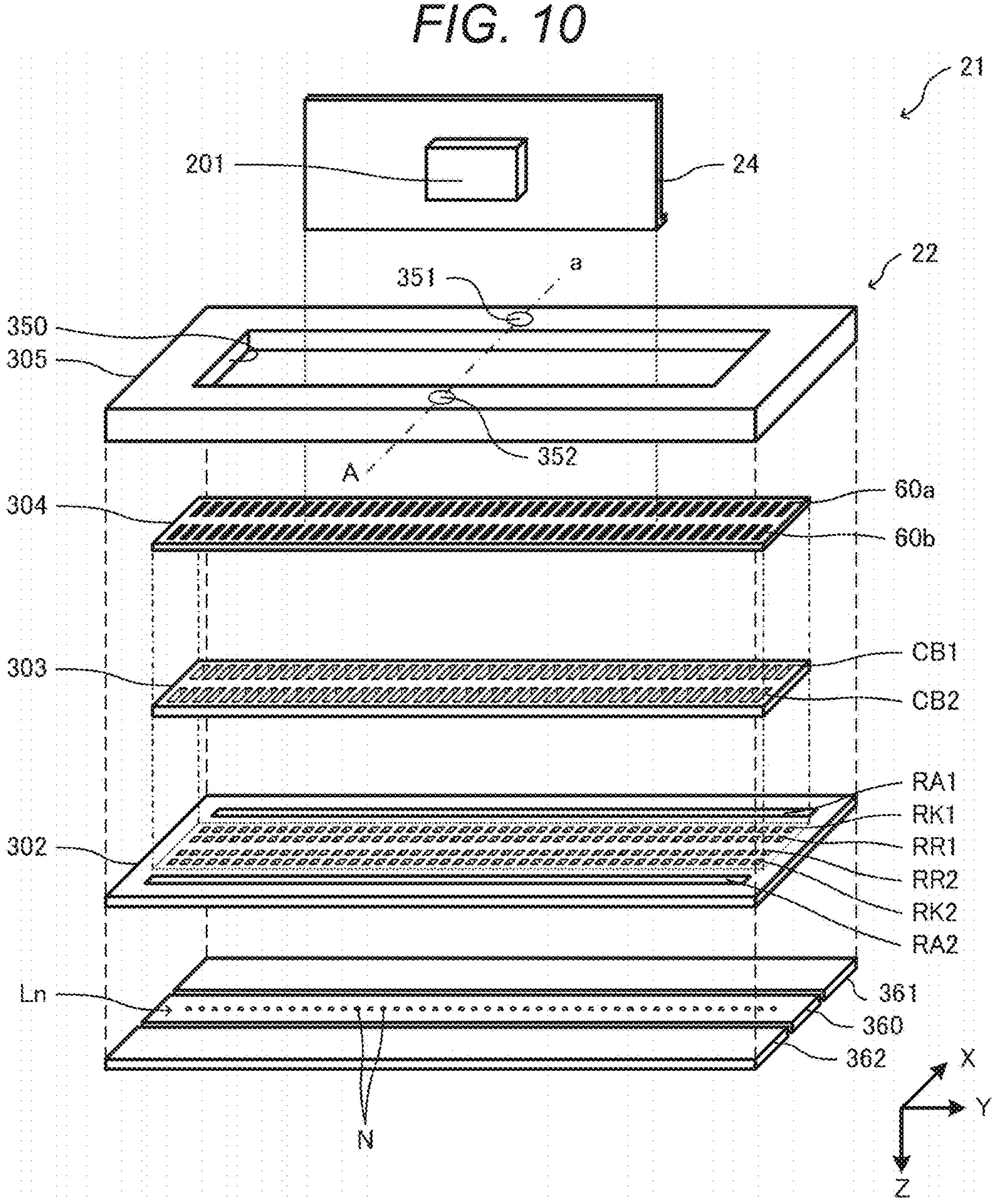
FIG. 10 is an exploded perspective view of a print head.
Figure 11:
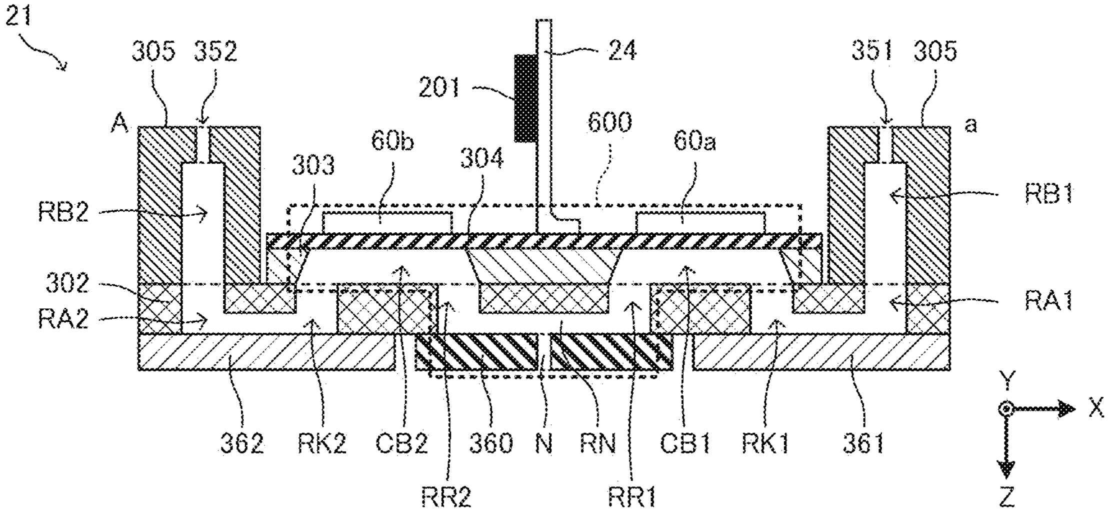
FIG. 11 is a cross-sectional view along the line A-a in FIG. 10.

Then, a structure of the print head 21 will be described. FIG. 10 is an exploded perspective view of the print head 21, and FIG. 11 is a cross-sectional view along the line A-a in FIG. 10. Here, in the following description, the explanation will be presented using an X axis, a Y axis, and a Z axis orthogonal to each other. Further, in the following description, in some cases, the origin side of the arrow along the X axis in the drawing is referred to as −X side, the tip side is referred to as +X side, the origin side of the arrow along the Y axis in the drawing is referred to as −Y side, the tip side is referred to as +Y side, and the origin side of the arrow along the Z axis in the drawing is referred to as −Z side, and the tip side is referred to as +Z side. Further, in the following description, the explanation will be presented assuming that the print head 21 includes M ejectors 600 as the plurality of ejectors 600.

As shown in FIGS. 10 and 11, the print head 21 includes the head chip 22 and the flexible board 24. Further, the head chip 22 also includes a nozzle substrate 360, compliance sheets 361, 362, a communication plate 302, a pressure chamber substrate 303, a vibration plate 304, and a retention chamber formation substrate 305.

The nozzle substrate 360 is a plate-like member that is elongated along Y axis and extends in substantially parallel to and along the X-Y plane formed of the X axis and the Y axis. The nozzle substrate 360 is provided with M nozzles N. The nozzles N are through holes provided to the nozzle substrate 360. Since these M nozzles N are arranged in parallel to each other along the Y axis in the nozzle substrate 360, a nozzle column Ln is provided to the nozzle substrate 360. Here, the expression "substantially parallel" is not limited to when two things are completely parallel to each other, but includes when the two things are assumed to be parallel to each other when taking errors or the like into consideration.

The communication plate 302 is located at the −Z side of the nozzle substrate 360. The communication plate 302 is a plate-like member that is elongated along the Y axis and extends in substantially parallel to the X-Y plane. The communication plate 302 is provided with a supply flow path RA1, a discharge flow path RA2, M coupling flow paths RK1, M coupling flow paths RK2, M communication flow paths RR1, M communication flow paths RR2, and M nozzle flow paths RN as a part of flow paths through which the ink flows.

The supply flow path RA1 is located at the +X side in the communication plate 302 and extends along the Y direction. The discharge flow path RA2 is located at the −X side in the communication plate 302 and extends along the Y direction. On this occasion, the supply flow path RA1 and the discharge flow path RA2 are formed so as to substantially be line symmetrical taking the Z axis passing through the nozzle N as the axis of symmetry. The M coupling flow paths RK1 are located at the −X side of the supply flow path RA1 and are arranged in parallel along the Y direction. The M communication flow paths RR1 are located at the −X side of the M coupling flow paths RK1 arranged in parallel along the Y direction, and are arranged in parallel along the Y direction. The M coupling flow paths RK2 are located at the +X side of the discharge flow path RA2, and at the −X side of the M communication flow paths RR1 arranged in parallel along the Y direction, and are arranged in parallel along the Y direction. The M communication flow paths RR2 are located at the +X side of the M coupling flow paths RK2 arranged in parallel along the Y direction, and at the −X side of the M communication flow paths RR1 arranged in parallel along the Y direction, and are arranged in parallel along the Y direction. On this occasion, the coupling flow path RK1 and the coupling flow path RK2 are formed so as to substantially be line symmetrical taking the Z axis passing through the nozzle N as the axis of symmetry, and the communication flow path RR1 and the communication flow path RR2 are formed so as to substantially be line symmetrical taking the Z axis passing through the nozzle N as the axis of symmetry. The nozzle flow path RN communicates the communication flow path RR1 and the communication flow path RR2 corresponding to the common nozzle N with each other. Further, the nozzle substrate 360 is fixed to the communication plate 302 so that the nozzles N are located at substantially the central positions in the X direction of the nozzle flow paths RN when the communication plate 302 is viewed from the Z direction.

The pressure chamber substrate 303 is located at the −Z side of the communication plate 302 and is fixed to the communication plate 302. The pressure chamber substrate 303 is a plate-like member that is elongated in the Y-axis direction and extends in substantially parallel to the X-Y plane. This pressure chamber substrate 303 is provided with M pressure chambers CB1 and M pressure chambers CB2 as a part of the flow paths through which the ink flows. On this occasion, the pressure chamber CB1 and the pressure chamber CB2 are formed so as to substantially be line symmetrical taking the Z axis passing through the nozzle N as the axis of symmetry.

The M pressure chambers CB1 correspond one-to-one to the M nozzles N, and are arranged in parallel along the Y axis. Further, each of the M pressure chambers CB1 is communicated with the coupling flow path RK1 and the communication flow path RR1 corresponding to the nozzle N in common. Specifically, in the pressure chamber CB1, an end portion at the +X side is communicated with the coupling flow path RK1, and an end portion at the −X side is communicated with the communication flow path RR1 when viewed along the Z axis. That is, the pressure chamber CB1 communicates the coupling flow path RK1 and the communication flow path RR1 corresponding to the nozzle N in common with each other.

Similarly, the M pressure chambers CB2 correspond one-to-one to the M nozzles N and are located at the −X side of the M pressure chambers CB1 arranged in parallel along the Y axis, and are arranged in parallel along the Y axis. Further, each of the M pressure chambers CB2 is communicated with the coupling flow path RK2 and the communication flow path RR2 corresponding to the nozzle N in common. Specifically, in the pressure chamber CB2, an end portion at the −X side is communicated with the coupling flow path RK2, and an end portion at the +X side is communicated with the communication flow path RR2 when viewed along the Z axis. That is, the pressure chamber CB2 communicates the coupling flow path RK2 and the communication flow path RR2 corresponding to the nozzle N in common with each other.

The vibration plate 304 is located at the −Z side of the pressure chamber substrate 303 and is fixed to the pressure chamber substrate 303 so as to close up the pressure chambers CB1, CB2. The vibration plate 304 is a plate-like member that is elongated in the Y direction, extends substantially in parallel to the X-Y plane, and can elastically vibrate. Further, the M piezoelectric elements 60*a* and the M piezoelectric elements 60*b* are arranged in parallel at the −Z side of the vibration plate 304. The M piezoelectric elements 60*a* are arranged in parallel along the Y axis at the −Z side of the vibration plate 304. Further, the M piezoelectric elements 60*b* are arranged in parallel along the Y axis at the −Z side of the vibration plate 304 and at the −X side of the M piezoelectric elements 60*a* arranged in parallel along the Y axis. That is, a column of the M piezoelectric elements 60*a* and a column of the M piezoelectric elements 60*b* are arranged in parallel at the −Z side of the vibration plate 304.

The retention chamber formation substrate 305 is located at the −Z side of the communication plate 302. The retention chamber formation substrate 305 is a member elongated in the Y direction and includes an aperture 350. Further, the retention chamber formation substrate 305 is fixed to the communication plate 302 so that the pressure chamber substrate 303, the vibration plate 304, and a wiring substrate 308 are located inside the aperture 350. Further, the retention chamber formation substrate 305 includes a supply flow path RB1, a discharge flow path RB2, a supply port 351, and a discharge port 352. The supply flow path RB1 is communicated with the supply flow path RA1. The discharge flow path RB2 is communicated with the discharge flow path RA2. The supply port 351 is communicated with the supply flow path RB1. The discharge port 352 is communicated with the discharge flow path RB2. Further, due to the operation of the circulation unit 6, the ink retained in the liquid container 3 is supplied to the supply port 351. As a result, the ink is supplied to the head chip 22. Further, the ink supplied to the head chip 22 flows through the inside of the head chip 22 and is collected through the discharge port 352 by the operation of the circulation unit 6. That is, the ink supplied to the head chip 22 is returned due to the operation of the circulation unit 6.

The flexible board 24 is electrically coupled to the vibration plate 304 at the −X side of the column of the M piezoelectric elements 60*a* on the −Z side surface of the vibration plate 304, and at the +X side of the column of the M piezoelectric elements 60*b*. That is, the flexible board 24 is electrically coupled to the vibration plate 304 between the column of the M piezoelectric elements 60*a* and the column of the M piezoelectric elements 60*b* provided to the vibration plate 304. On this occasion, it is preferable for the flexible board 24 to electrically be coupled to the vibration plate 304 so that the distance between the flexible board 24 and the column of the M piezoelectric elements 60*a* and the distance between the flexible board 24 and the column of the M piezoelectric elements 60*b* are substantially equal to each other.

An integrated circuit 201 is COF-mounted on the flexible board 24. The drive signal selection circuit 200 described above is implemented in the integrated circuit 201. That is, the M selection circuits 230 including the transfer gates 234*a*, 234*b*, and 234*c* provided to the drive signal selection circuit 200 are provided to the integrated circuit 201. Further, the integrated circuit 201 includes a pair of long sides located to be opposed to each other and a pair of short sides that are located to be opposed to each other and are shorter than the long sides, and is COF-mounted on the flexible board 24 so that the long sides extend along the Y axis. As described above, the drive signal selection circuit 200 outputs the drive voltage signals Vin to the M ejectors 600. Accordingly, the integrated circuit 201 has M terminals for outputting the drive voltage signals Vin respectively to the M ejectors 600. Further, by performing the COF mounting on the flexible board 24 so that the long sides of the integrated circuit 201 extend along the Y axis, it becomes possible to arrange the M terminals in a line along the long sides of the integrated circuit 201. As a result, the possibility that the wiring pattern propagated by the drive voltage signals Vin is routed cumbersomely in the flexible board 24 is reduced, the possibility that a difference in the wiring length between the wiring patterns propagated by the drive voltage signals Vin to the respective M ejectors 600 occurs is reduced, and the waveform accuracy of the drive voltage signals Vin supplied to the M ejectors 600 is improved.

Further, in this case, it is preferable that the length of the long sides of the integrated circuit 201 is shorter than a length in a direction along the Y axis of the nozzle column Ln in which the M nozzles N are arranged in parallel in a column in the nozzle substrate 360. The size of the print head 21 is defined by larger one of the size of the head chip 22 and the size of the flexible board 24. The size of the head chip 22 may be defined by the length of the nozzle column Ln in some cases, and the length of the nozzle column Ln is defined by the usage of the liquid ejection apparatus 1, such as the type of the ink ejected from the liquid ejection apparatus 1 or the image formation speed on the medium P. That is, the size of the head chip 22 may be defined by specifications of the liquid ejection apparatus 1 in some cases. Therefore, in order to reduce the size of the print head 21 to the extent that the specifications of the liquid ejection apparatus 1 are satisfied, it is necessary to reduce the size of the flexible board 24 and to reduce the size of the integrated circuit 201 to be COF-mounted on the flexible board 24.

In the liquid ejection apparatus 1 according to the present embodiment, by making the length of the long sides of the integrated circuit 201 shorter than the length in the direction along the Y axis of the nozzle column Ln in which the M nozzles N are arranged in a column on the nozzle substrate 360, it is possible to appropriately achieve the reduction in size of the print head 21 within the range in which the specifications of the liquid ejection apparatus 1 are satisfied.

The flexible board 24 configured as described above propagates the clock signal SCK, the latch signal LAT, the change signal CH, the inspection timing signal TSIG, the print data signals SI, the drive signal COM, and the reference voltage signal VBS to be input to the print head 21. Out of the clock signal SCK, the latch signal LAT, the change signal CH, the inspection timing signal TSIG, the print data signals SI, the drive signal COM, and the reference voltage signal VBS propagated by the flexible board 24, the clock signal SCK, the latch signal LAT, the change signal CH, the inspection timing signal TSIG, the print data signals SI, and the drive signal COM are input to the plurality of terminals arranged in parallel on, for example, the long side at the −Z side of the integrated circuit 201.

The integrated circuit 201 selects or deselects the signal waveform of the drive signal COM based on the clock signal SCK, the latch signal LAT, the change signal CH, the inspection timing signal TSIG, and the print data signal SI input to the integrated circuit 201 to thereby generate the drive voltage signals Vin corresponding respectively to the plurality of ejectors 600. Further, the integrated circuit 201 outputs the drive voltage signals Vin thus generated from the M terminals arranged in parallel on the long side at the +Z side of the integrated circuit 201 so as to correspond respectively to the plurality of ejectors 600. The drive voltage signal Vin output from the integrated circuit 201 propagates through the flexible board 24, and is then commonly supplied to the piezoelectric element 60*a* and the piezoelectric element 60*b* provided to the ejector 600 corresponding to the drive voltage signal Vin. That is, the wiring lines 311, 312, and 313 described above are formed on the flexible board 24 and the vibration plate 304.

Then, the drive voltage signal Vin1 as the drive voltage signal Vin propagated through the wiring lines 311, 312 formed on the flexible board 24 and the vibration plate 304 is supplied to the piezoelectric element 60*a* provided to the ejector 600 corresponding to the drive voltage signal Vin, and the drive voltage signal Vin2 as the drive voltage signal Vin propagated through the wiring lines 311, 313 formed on the flexible board 24 and the vibration plate 304 is supplied to the piezoelectric element 60*b* provided to the ejector 600 corresponding to the drive voltage signal Vin. As a result, each of the M piezoelectric elements 60*a*, 60*b* is driven to be displaced along the Z axis. Then, the vibration plate 304 provided with the piezoelectric elements 60*a*, 60*b* is displaced along the Z axis by driving the piezoelectric elements 60*a*, 60*b*, and the volumes of the pressure chambers CB1, CB2 are changed by the displacement of the vibration plate 304. Then, the internal pressure of the pressure chambers CB1, CB2 changes in accordance with the volume change of the pressure chambers CB1, CB2.

Here, the wiring line 311 propagating the drive voltage signal Vin is preferably formed on the flexible board 24 provided with the integrated circuit 201 in which the drive signal selection circuit 200 is implemented, and the wiring line 312 propagating the drive voltage signal Vin1 and the wiring line 313 propagating the drive voltage signal Vin2 are preferably formed on the vibration plate 304 provided with the piezoelectric elements 60*a*, 60*b*. That is, it is preferable that the coupling point at which the flexible board 24 and the vibration plate 304 are electrically coupled to each other corresponds to the node 315 described above.

As a result, there is no need to individually provide a wiring pattern for propagating the drive voltage signal Vin1 to the piezoelectric element 60*a* and a wiring pattern for propagating the drive voltage signal Vin2 to the piezoelectric element 60*b* to the flexible board 24, and it becomes possible to reduce the number of the wiring lines formed on the flexible board 24. That is, the reduction in size of the flexible board 24 can be realized.

Further, by forming the wiring line 312 that is formed on the flexible board 24 provided with the integrated circuit 201 in which the drive signal selection circuit 200 is implemented, and is propagated by the drive voltage signal Vin1, and the wiring line 313 that is formed on the flexible board 24 provided with the integrated circuit 201 in which the drive signal selection circuit 200 is implemented, and is propagated by the drive voltage signal Vin2, on the vibration plate 304 provided with the piezoelectric elements 60*a*, 60*b*, the node 315 can be formed in the vicinity of the piezoelectric elements 60*a*, 60*b* and on the vibration plate 304. That is, the electrical distance between the piezoelectric element 60*a* and the node 315 can be made shorter than the electrical distance between the node 315 and the transfer gates 234*a*, 234*b*, and 234*c* corresponding thereto.

As a result, the wiring length of the wiring line 312 and the wiring length of the wiring line 313 become shorter than the wiring length of the wiring line 311. Therefore, the influence of the impedance components of the wiring lines 312, 313 in the propagation paths of the drive voltage signals Vin1, Vin2 is reduced. In other words, the influence of an impedance difference between the impedance of the wiring line 312 propagated by the drive voltage signal Vin1 and the impedance of the wiring line 313 propagated by the drive voltage signal Vin2 is reduced. That is, the impedance of the wiring line 312 and the impedance of the wiring line 313, that are the impedance of the propagation path propagated by the drive voltage signal Vin1 and the residual vibration signal Vout1 and the impedance of the propagation path propagated by the drive voltage signal Vin2 and the residual vibration signal Vout2, can be made substantially equivalent. In other words, a resistance value between the transfer gate 234*a* provided to the drive signal selection circuit 200 implemented in the integrated circuit 201 and the piezoelectric element 60*a* can be made substantially equal to a resistance value between the transfer gate 234*a* provided to the drive signal selection circuit 200 implemented in the integrated circuit 201 and the piezoelectric element 60*b*, and a resistance value between the transfer gate 234*b* provided to the drive signal selection circuit 200 implemented in the integrated circuit 201 and the piezoelectric element 60*a* can be made substantially equal to a resistance value between the transfer gate 234*b* provided to the drive signal selection circuit 200 implemented in the integrated circuit 201 and the piezoelectric element 60*b*.

As a result, a possibility that a difference in signal waveform occurs between the drive voltage signal Vin1 corresponding to the drive voltage signal Vin and the drive voltage signal Vin2 corresponding to the drive voltage signal Vin decreases, and the signal waveform of the drive voltage signal Vin1 to be supplied to the piezoelectric element 60*a* and the signal waveform of the drive voltage signal Vin2 to be supplied to the piezoelectric element 60*b* can be made substantially equivalent. As a result, the drive amount of the piezoelectric element 60*a* driven in accordance with the drive voltage signal Vin1 and the drive amount of the piezoelectric element 60*b* driven in accordance with the drive voltage signal Vin2 can be made substantially equivalent.

Further, the compliance sheets 361, 362 are located at the +Z side of the communication plate 302. The compliance sheet 361 closes the supply flow path RA1 and the coupling flow paths RK1 provided to the communication plate 302. Such a compliance sheet 361 is formed including an elastic material. As a result, the pressure fluctuation generated in the supply flow path RA1 and the coupling flow paths RK1 in accordance with the variation of the internal pressure of the pressure chambers CB1, CB2 is absorbed. Further, the compliance sheet 362 closes the discharge flow path RA2 and the coupling flow paths RK2 provided to the communication plate 302. Such a compliance sheet 362 is formed including an elastic material. As a result, pressure fluctuation generated in the discharge flow path RA2 and the coupling flow paths RK2 in accordance with the variation of the internal pressure of the pressure chambers CB1, CB2 is absorbed.

Here, in the print head 21, the configuration that includes the piezoelectric elements 60*a*, 60*b*, the pressure chambers CB1, CB2, the communication flow paths RR1, RR2, and the nozzles N, and is provided to the head chip 22 corresponds to the ejector 600 described above.

As described above, the print head 21 of the present embodiment has the pressure chambers CB1 that change in volume in accordance with the drive voltage signals Vin according to the drive signals COM, the pressure chambers CB2 that change in volume in accordance with the drive voltage signals Vin according to the drive signals COM, the nozzles N that are communicated with the pressure chambers CB1 and the pressure chambers CB2 to eject the ink, the piezoelectric elements 60*a* for outputting the residual vibration signal Vout1 corresponding to the residual vibration generated in accordance with the volume change of the pressure chamber CB1, and the piezoelectric elements 60*b* for outputting the residual vibration signal Vout2 corresponding to the residual vibration generated in accordance with the volume change of the pressure chamber CB2. Further, the piezoelectric element 60*a* is displaced in accordance with the drive voltage signal Vin according to the drive signal COM, the volume of the pressure chamber CB1 changes in accordance with the displacement of the piezoelectric element 60*a*, the piezoelectric element 60*b* is displaced in accordance with the drive voltage signal Vin according to the drive signal COM, the volume of the pressure chamber CB2 changes in accordance with the displacement of the piezoelectric element 60*b*, and the ink is ejected from the nozzle N in accordance with the change in volume of the pressure chamber CB1 and the change in volume of the pressure chamber CB2.

Here, in the print head 21 of the present embodiment, the description will be presented assuming that the element that generates the residual vibration in the pressure chamber CB1 and the element that detects the residual vibration generated in the pressure chamber CB1 are both the piezoelectric element 60*a*, and the element that generates residual vibration in the pressure chamber CB2 and the element that detects the residual vibration generated in the pressure chamber CB2 are both the piezoelectric elements 60*b*. However, the element that generates the residual vibration in the pressure chamber CB1 and the element that detects the residual vibration generated in the pressure chamber CB1 may be different from each other, and the element that generates the residual vibration in the pressure chamber CB2 and the element that detects the residual vibration generated in the pressure chamber CB2 may be different from each other.

However, it is preferable that the piezoelectric element 60*a* generates the residual vibration in the pressure chamber CB1 and detects the residual vibration generated in the pressure chamber CB1, and the piezoelectric element 60*b* generates the residual vibration in the pressure chamber CB2 and detects the residual vibration generated in the pressure chamber CB2 as shown in the present embodiment. That is, it is preferable that the piezoelectric element 60*a* outputs the residual vibration signal Vout1 according to the residual vibration generated in accordance with the volume change of the pressure chamber CB1, and is driven in accordance with the drive voltage signal Vin according to the drive signal COM, and the volume of the pressure chamber CB1 is changed by driving the piezoelectric element 60*a*, and it is preferable that the piezoelectric element 60*b* outputs the residual vibration signal Vout2 according to the residual vibration generated in accordance with the volume change of the pressure chamber CB2, and is driven in accordance with the drive voltage signal Vin according to the drive signal COM, and the volume of the pressure chamber CB2 is changed by driving the piezoelectric element 60*b*. As a result, the number of the piezoelectric elements 60*a*, 60*b* provided to the print head 21 can be reduced, and it becomes possible to reduce the size of the print head 21.

Figure 12:
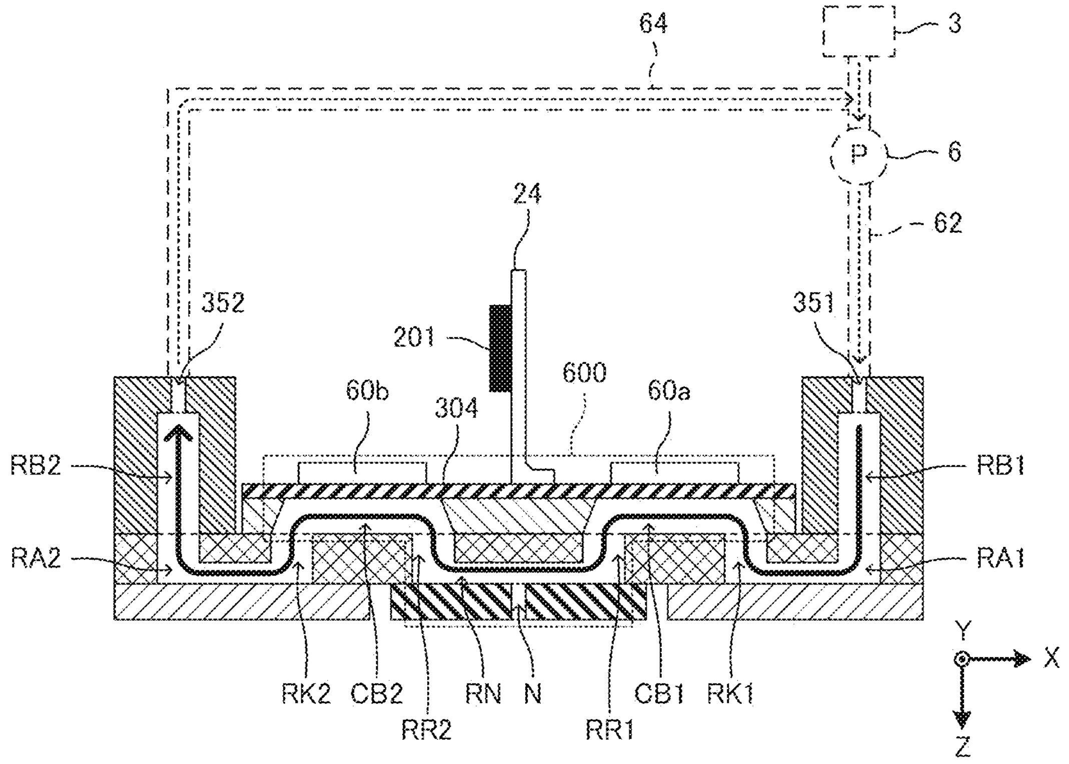
FIG. 12 is a diagram showing an example of ink flow during a period in which ink is not ejected from the print head.

A specific example of the flow of the ink in the print head 21 configured as described above will be described. FIG. 12 is a diagram showing an example of the flow of the ink during a period in which the piezoelectric elements 60*a*, 60*b* are not driven and which is a period in which the ink is not ejected from the print head 21. Here, in FIG. 12, the flow of the ink inside the print head 21 is shown using arrows.

As shown in FIG. 12, the ink retained in the liquid container 3 flows through a tube 62 by the operation of the circulation unit 6 and is supplied to the print head 21 through the supply port 351. The ink supplied to the print head 21 flows through the ink flow path formed inside and is ejected to the outside of the print head 21 through the discharge port 352.

The ink supplied to the print head 21 through the supply port 351 flows into the supply flow path RA1 via the supply flow path RB1. The ink flowing into the supply flow path RA1 branches for each of the M nozzles N and flows into the pressure chambers CB1 via the coupling flow paths RK1 corresponding to the pressure chambers CB1. This supplies the ink to the pressure chambers CB1. Further, the ink flowing into the pressure chamber CB1 flows into the pressure chamber CB2 via the communication flow path RR1, the nozzle flow path RN, and the communication flow path RR2. This supplies the ink to the pressure chamber CB2. Then, the ink flowing into the pressure chamber CB2 flows out from the coupling flow path RK2. On this occasion, the ink flowing out from the M coupling flow paths RK2 corresponding respectively to the M nozzles N merges in the discharge flow path RA2. The ink having merged in the discharge flow path RA2 is discharged from the print head 21 through the discharge flow path RB2 and through the discharge port 352.

The ink discharged from the print head 21 through the discharge port 352 flows through a tube 64 and flows back to the circulation unit 6. Subsequently, the circulation unit 6 supplies the ink returned from the print head 21 and the ink retained in the liquid container 3 to the print head 21. That is, the print head 21 of the present embodiment includes the supply port 351 and the discharge port 352, and the ink supplied from the supply port 351 is discharged from the discharge port 352 through the pressure chamber CB1 and the pressure chamber CB2, and at least a part of the ink discharged from the discharge port 352 is returned to the supply port 351. Thus, the possibility that the ink is retained inside the print head 21 is reduced, and as a result, the possibility that physical properties such as viscosity of the ink retained inside the print head 21 are changed is reduced.

Figure 13:
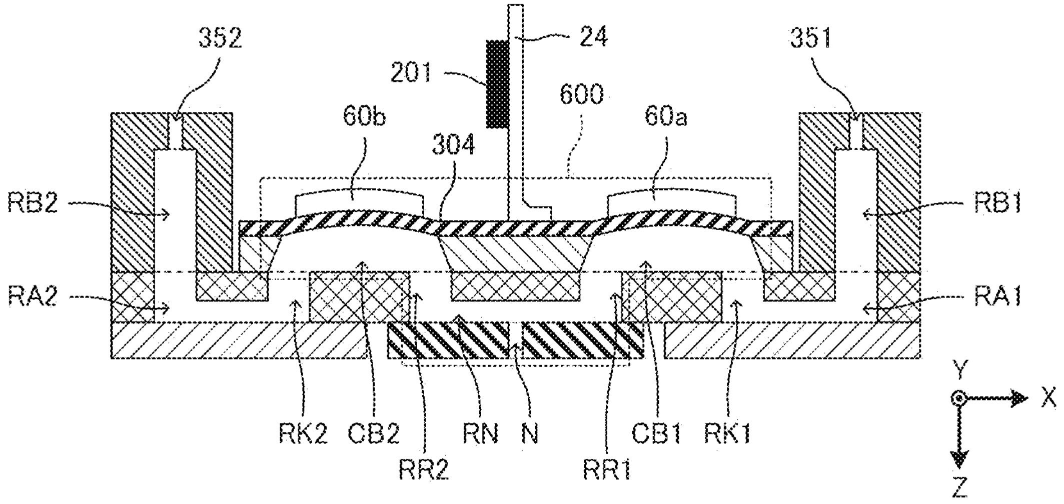
FIG. 13 is a diagram showing an example of an operation of drawing the ink into pressure chambers CB1, CB2.

As described above, the pressure chambers CB1, CB2 are filled with the ink retained in the liquid container 3 and the ink returned by the circulation unit 6. Then, the ink filling the pressure chambers CB1, CB2 is ejected from the nozzle N in accordance with the volume change of the pressure chambers CB1, CB2 due to the respective drive of each of the M piezoelectric elements 60*a*, 60*b*. A specific example of such an ink ejection operation in the print head 21 will be described. FIG. 13 is a diagram showing an example of the operation of drawing the ink into the pressure chambers CB1, CB2, and FIG. 14 is a diagram showing an example of the operation of ejecting the ink filling the pressure chambers CB1, CB2.

When drawing the ink into the pressure chambers CB1, CB2 as shown in FIG. 13, center portions of the piezoelectric elements 60*a*, 60*b* are displaced along the Z axis toward the −Z side in accordance with the voltage value of the drive voltage signals Vin supplied to the piezoelectric elements 60*a*, 60*b*. Specifically, when drawing the ink into the pressure chambers CB1, CB2, the center portion of the piezoelectric element 60*a* is displaced along the Z axis toward the −Z side in accordance with the voltage value of the drive voltage signal Vin1 supplied thereto, and the center portion of the piezoelectric element 60*b* is displaced along the Z axis toward the −Z side in accordance with the voltage value of the drive voltage signal Vin2 supplied thereto. Then, due to the displacement of the piezoelectric element 60*a* toward the −Z side, the area in which the piezoelectric element 60*a* is provided of the vibration plate 304 is displaced along the Z axis toward the −Z side, and due to the displacement of the piezoelectric element 60*b* toward the −Z side, the area in which the piezoelectric element 60*b* is provided of the vibration plate 304 is displaced along the Z axis toward the −Z side. This displacement of the vibration plate 304 increases the volume of the pressure chambers CB1, CB2 and decreases the pressure in the pressure chambers CB1, CB2. As a result, the ink is drawn into the pressure chambers CB1, CB2.

Figure 14:
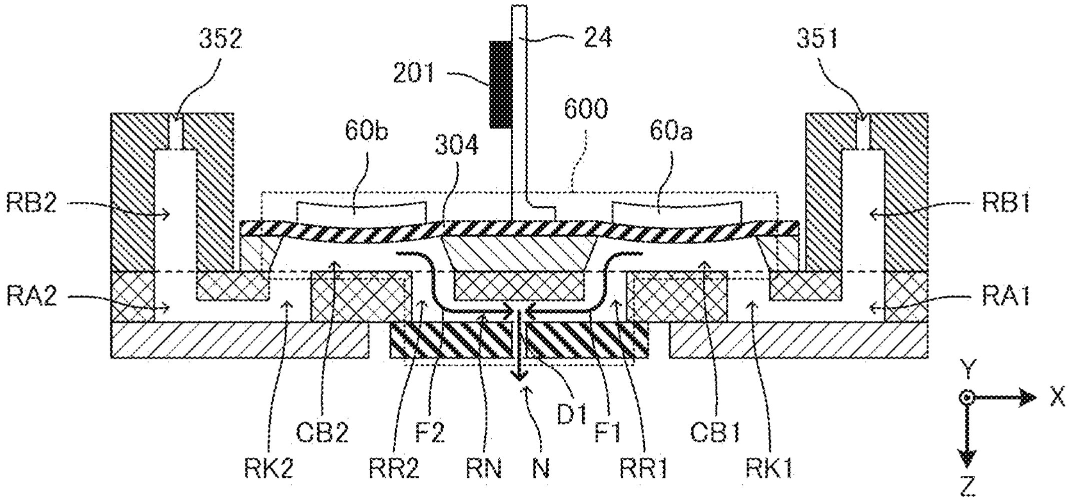
FIG. 14 is a diagram showing an example of an operation of ejecting the ink with which the pressure chambers CB1, CB2 are filled.

Further, when ejecting the ink filling the pressure chambers CB1, CB2 as shown in FIG. 14, the center portions of the piezoelectric elements 60*a*, 60*b* are displaced along the Z axis toward the +Z side in accordance with the voltage values of the drive voltage signals Vin supplied thereto. Specifically, when ejecting the ink filling the pressure chambers CB1, CB2, the center portion of the piezoelectric element 60*a* is displaced along the Z axis toward the +Z side in accordance with the voltage value of the drive voltage signal Vin1 supplied thereto, and the center portion of the piezoelectric element 60*b* is displaced along the Z axis toward the +Z side in accordance with the voltage value of the drive voltage signal Vin2 supplied thereto. Then, due to the displacement of the piezoelectric element 60*a* toward the +Z side, the area in which the piezoelectric element 60*a* is provided of the vibration plate 304 is displaced along the Z axis toward the +Z side, and due to the displacement of the piezoelectric element 60*b* toward the +Z side, the area in which the piezoelectric element 60*b* is provided of the vibration plate 304 is displaced along the Z axis toward the +Z side. This displacement of the vibration plate 304 decreases the volume of the pressure chambers CB1, CB2 and increases the pressure of the pressure chambers CB1, CB2. As a result, the ink retained in the pressure chambers CB1, CB2 is ejected from the nozzle N.

In the liquid ejection apparatus 1 according to the present embodiment, by repeatedly executing drawing of the ink into the pressure chambers CB1, CB2 as shown in FIG. 13 and ejection of the ink retained in the pressure chambers CB1, CB2 as shown in FIG. 14, the ink having a desired size is landed at a desired position in the medium P to form a desired image on the medium P.

Here, details of the operation of ejecting the ink from the print head 21 in the liquid ejection apparatus 1 according to the present embodiment will be described. In the liquid ejection apparatus 1 according to the present embodiment, the description will be presented assuming that when the voltage value of the drive voltage signal Vin input to the print head 21 decreases, the center portions of the piezoelectric elements 60*a*, 60*b* corresponding to the drive voltage value Vin are displaced along the Z axis toward the −Z side, and when the voltage value of the drive voltage signal Vin input to the print head 21 increases, the center portions of the piezoelectric elements 60*a*, 60*b* corresponding to the drive voltage signal Vin are displaced along the Z axis toward the +Z side. Incidentally, the relationship between the voltage value of the drive voltage signal Vin and the displacement of the piezoelectric elements 60*a*, 60*b* is not limited to the above, and there may be adopted a configuration in which when the voltage value of the drive voltage signal Vin input to the print head 21 decreases, the center portions of the piezoelectric elements 60*a*, 60*b* corresponding thereto are displaced along the Z axis toward the +Z side, and when the voltage value of the drive voltage signal Vin input to the print head 21 increases, the center portions of the piezoelectric elements 60*a*, 60*b* corresponding thereto are displaced along the Z axis toward the −Z side.

Further, the ink ejection operation in the print head 21 is caused by the voltage value of the drive voltage signal Vin input thereto. That is, the print head 21 performs substantially the same operation except only the amount of the ink to be ejected different between when the signal waveform of the drive voltage signal Vin input thereto is the drive waveform Adp1 and when the signal waveform of the drive voltage signal Vin input thereto is the drive waveform Adp2, Bdp1, Bdp2, or Bdp3. Therefore, in the following description, there is illustrated when the drive voltage signal Vin including the drive waveform Adp1 is input to the print head 21, and there is omitted when the drive voltage signal Vin including the drive waveform Adp2, Bdp1, Bdp2, or Bdp3 is input to the print head 21.

The voltage value of the drive voltage signal Vin including the drive waveform Adp1 input to the print head 21 is constant at the voltage Vc at the timing when the latch signal LAT rises. Therefore, at the rise of the latch signal LAT, the voltage Vc is supplied to the piezoelectric element 60*a* as the drive voltage signal Vin1, and the voltage Vc is supplied to the piezoelectric element 60*b* as the drive voltage signal Vin2. Subsequently, the voltage value of the drive voltage signal Vin input to the print head 21 decreases. Therefore, both the voltage value of the drive voltage signal Vin1 supplied to the piezoelectric element 60*a* and the voltage value of the drive voltage signal Vin2 supplied to the piezoelectric element 60*b* decrease. Then, due to the decrease in the voltage value of the drive voltage signal Vin1 supplied to the piezoelectric element 60*a*, the center portion of the piezoelectric element 60*a* is displaced along the Z axis toward the −Z side, and due to the decrease in the voltage value of the drive voltage signal Vin2 supplied to the piezoelectric element 60*b*, the center portion of the piezoelectric element 60*b* is displaced along the Z axis toward the −Z side. Therefore, the vibration plate 304 is displaced toward the −Z side, and the volume of the pressure chamber CB1 and the volume of the pressure chamber CB2 increase. As a result, a corresponding amount of the ink to the increment in volume is drawn into the pressure chambers CB1, CB2. Subsequently, the voltage value of the drive voltage signal Vin input to the print head 21 is held at a constant voltage value for a predetermined period.

When the predetermined period elapses, the voltage value of the drive voltage signal Vin input to the print head 21 increases to a voltage value equal to or higher than the voltage Vc. Therefore, both the voltage value of the drive voltage signal Vin1 supplied to the piezoelectric element 60*a* and the voltage value of the drive voltage signal Vin2 supplied to the piezoelectric element 60*b* increase. Then, due to the increase in the voltage value of the drive voltage signal Vin1 supplied to the piezoelectric element 60*a*, the center portion of the piezoelectric element 60*a* is displaced along the Z axis toward the +Z side, and due to the increase in the voltage value of the drive voltage signal Vin2 supplied to the piezoelectric element 60*b*, the center portion of the piezoelectric element 60*b* is displaced along the Z axis toward the +Z side. Therefore, the vibration plate 304 is displaced toward the +Z side, and the volume of the pressure chamber CB1 and the volume of the pressure chamber CB2 decrease. As a result, a corresponding amount of the ink to the decrease in the volume of the pressure chamber CB1 flows along the arrow F1 shown in FIG. 14 via the communication flow path RR1 and the nozzle flow path RN, and is ejected from the nozzle N, and a corresponding amount of the ink to the decrease in the volume of the pressure chamber CB2 flows along the arrow F2 shown in FIG. 14 via the communication flow path RR2 and the nozzle flow path RN, and is ejected from the nozzle N.

On this occasion, the voltage value of the drive voltage signal Vin1 supplied to the piezoelectric element 60*a* and the voltage value of the drive voltage signal Vin2 supplied to the piezoelectric element 60*b* are substantially equivalent since the drive voltage signals Vin1, Vin2 are branched from the drive voltage signal Vin output by the drive signal selection circuit 200. Therefore, the displacement amount of the piezoelectric element 60*a* according to the drive voltage signal Vin is substantially equal to the displacement amount of the piezoelectric element 60*b* according to the drive voltage signal Vin, and therefore, the change amount of the volume of the pressure chamber CB1 due to the displacement of the piezoelectric element 60*a* is substantially equal to the change amount of the volume of the pressure chamber CB2 due to the displacement of the piezoelectric element 60*b*.

Further, as described above, the pressure chamber CB1 and the pressure chamber CB2 have substantially equivalent structures formed so as to substantially be line symmetrical taking the Z axis passing through the nozzle N as the axis of symmetry, the communication flow path RR1 and the communication flow path RR2 have substantially equivalent structures formed so as to substantially be line symmetrical taking the Z axis passing through the nozzle N as the axis of symmetry, and further, the nozzle N is located at substantially the center of the nozzle flow path RN. In view of such a point, the flow path length of the flow path that communicates the pressure chamber CB1 and the nozzle N with each other, and through which the ink filling the pressure chamber CB1 flows to the nozzle N, and the flow path length of the flow path that communicates the pressure chamber CB2 and the nozzle N with each other, and through which the ink filling the pressure chamber CB2 flows to the nozzle N are substantially equal to each other.

Further, since the displacement amount of the piezoelectric element 60*a* in accordance with the drive voltage signal Vin and the displacement amount of the piezoelectric element 60*b* in accordance with the drive voltage signal Vin are substantially equal to each other, an amount of the ink flowing from the pressure chamber CB1 toward the nozzle N due to the displacement of the piezoelectric element 60*a* and an amount of the ink flowing from the pressure chamber CB2 toward the nozzle N due to the displacement of the piezoelectric element 60*b* are substantially equal to each other, and the speed of the ink that flows in the flow path communicating the pressure chamber CB1 and the nozzle N from the pressure chamber CB1 toward the nozzle N due to the displacement of the piezoelectric element 60*a* and the speed of the ink that flows in the flow path communicating the pressure chamber CB2 and the nozzle N from the pressure chamber CB2 toward the nozzle N due to the displacement of the piezoelectric element 60*b* are substantially equal to each other.

Further, in view of the point that the pressure chamber CB1 and the pressure chamber CB2 have substantially equivalent structures formed so as to substantially be line symmetrical taking the Z axis passing through the nozzle N as the axis of symmetry, the communication flow path RR1 and the communication flow path RR2 have substantially equivalent structures formed so as to substantially be line symmetrical taking the Z axis passing through the nozzle N as the axis of symmetry, and further, the nozzle N is located at substantially center of the nozzle flow path RN, the direction in which the ink that flows from the pressure chamber CB1 toward the nozzle N due to the displacement of the piezoelectric element 60*a* flows through the flow path communicating the pressure chamber CB1 and the nozzle N with each other and the direction in which the ink that flows from the pressure chamber CB2 toward the nozzle N due to the displacement of the piezoelectric element 60*b* flows through the flow path communicating the pressure chamber CB2 and the nozzle N with each other are reverse from each other.

Here, the phrase that the direction in which the ink flowing from the pressure chamber CB1 toward the nozzle N flows and the direction in which the ink flowing from the pressure chamber CB2 toward the nozzle N flows are reversed from each other is not limited to when these directions are opposite to each other, but includes, for example, when the direction in which the ink flowing from the pressure chamber CB1 toward the nozzle N flows and the direction in which the ink flowing from the pressure chamber CB2 toward the nozzle N flows are substantially symmetrical taking the Z axis passing through the nozzle N as the axis of symmetry. Further, in a broader sense, there may be provided a direction in which the ink that flows from the pressure chamber CB1 toward the nozzle N flows from the −X side of the Z axis passing through the nozzle N toward the Z axis passing through the nozzle N, and a direction in which the ink flows from the +X side of the Z axis passing through the nozzle N toward the Z axis passing through the nozzle N.

In the print head 21, which is configured and operates as described above, the ink that flows out in accordance with the decrement in the volume of the pressure chamber CB1 and the ink that flows in accordance with the decrement in the volume of the pressure chamber CB2 merge at the −Z side of the nozzle N. As a result, the ink merged at the −Z side of the nozzle N is accurately ejected from the nozzle N along the Z axis in the direction indicated by the arrow D1 shown in FIG. 14. Thus, the landing accuracy of the ejected ink on the medium P can be improved, and as a result, the quality of an image to be formed on the medium P can be enhanced.

After the ink is ejected from the print head 21, the voltage value of the drive voltage signal Vin is held at a constant voltage value for a predetermined period. Then, when the predetermined period elapses, the voltage value of the drive voltage signal Vin input to the print head 21 drops to the voltage Vc the same in voltage value as that at the timing of rise of the latch signal LAT. Therefore, both the voltage value of the drive voltage signal Vin1 supplied to the piezoelectric element 60*a* and the voltage value of the drive voltage signal Vin2 supplied to the piezoelectric element 60*b* decrease. Then, due to the decrease in the voltage value of the drive voltage signal Vin1 supplied to the piezoelectric element 60*a*, the center portion of the piezoelectric element 60*a* is displaced along the Z axis toward the +Z side, and due to the decrease in the voltage value of the drive voltage signal Vin2 supplied to the piezoelectric element 60*b*, the center portion of the piezoelectric element 60*b* is displaced along the Z axis toward the +Z side. Thus, the displacement amount of the piezoelectric element 60*a* and the displacement amount of the piezoelectric element 60*b* are displacement amounts before the drive voltage signal Vin of the drive waveform Adp1 is supplied, and are substantially equivalent to the displacement amount immediately before the latch signal LAT rises. Therefore, the volume of the pressure chamber CB1 and the volume of the pressure chamber CB2 are also substantially equivalent to the volume at the timing of the rise of the latch signal LAT. Subsequently, the voltage value of the drive voltage signal Vin is held at the voltage Vc.

The print head 21 of the present embodiment configured as described above ejects the ink filling the inside of the pressure chamber CB1 and the ink filling the inside of the pressure chamber CB2 from the nozzle N using the piezoelectric elements 60*a*, 60*b* which are commonly driven in accordance with the drive voltage signal Vin1. Therefore, the driving capacity can be increased compared to the configuration in which the ink filling the inside of one pressure chamber is ejected with one piezoelectric element. As a result, the print head 21 of the present embodiment can increase the amount of the ink ejected, and also achieve stable ejection characteristics even when ink high in viscosity is used.

Furthermore, the print head 21 of the present embodiment can eject the ink along the Z axis toward the +Z side with high accuracy even when the ink is ejected from one nozzle N based on the volume change of the pressure chamber CB1 and the volume change of the pressure chamber CB2. Thus, the landing accuracy of the ejected ink on the medium P can be improved, and as a result, the quality of an image to be formed on the medium P can be enhanced.

4. Residual Vibration Signal

Then, a specific example of the residual vibration signal Vout according to the residual vibration generated in the ejector 600 as the inspection target after the drive voltage signal Vin is supplied to the ejector 600 as the inspection target will be described. After the piezoelectric elements 60*a*, 60*b* provided to the ejector 600 as the inspection target are driven in accordance with the drive voltage signal Vin, the liquid ejection apparatus 1 according to the present embodiment acquires the residual vibration signal Vout corresponding to the residual vibration generated in the ejector 600 as the inspection target, and determines the state of the ejector 600 as the inspection target based on the residual vibration signal Vout thus acquired.

Specifically, the control circuit 100 outputs the print data SId[SIH, SIM, SIL]=[1, 1, 1] as the print data SId corresponding to the ejector 600 as the inspection target. Thus, the switching circuit 210 supplies the drive voltage signal Vin including the drive waveform Bdp1 to the ejector 600 as the inspection target in the period ts1.

The piezoelectric element 60*a* provided to the ejector 600 as the inspection target is driven by being supplied with the drive voltage signal Vin1 including the drive waveform Bdp1. Then, the vibration plate 304 is displaced by driving the piezoelectric element 60*a*, and the internal pressure of the pressure chamber CB1 changes due to the displacement of the vibration plate 304. Subsequently, by supplying the drive voltage signal Vin1 constant at the voltage Vd to the piezoelectric element 60*a*, a damped vibration due to a change in the internal pressure of the pressure chamber CB1 occurs in the vibration plate 304. This damped vibration generated in the vibration plate 304 displaces the piezoelectric element 60*a*, and the piezoelectric element 60*a* outputs counter-electromotive force corresponding to the displacement as the residual vibration signal Vout1.

Similarly, the piezoelectric element 60*b* provided to the ejector 600 as the inspection target is driven by being supplied with the drive voltage signal Vin2 including the drive waveform Bdp1. Then, the vibration plate 304 is displaced by driving the piezoelectric element 60*b*, and the internal pressure of the pressure chamber CB2 changes due to the displacement of the vibration plate 304. Subsequently, by supplying the drive voltage signal Vin2 constant at the voltage Vd to the piezoelectric element 60*b*, a damped vibration due to a change in the internal pressure of the pressure chamber CB2 occurs in the vibration plate 304. This damped vibration generated in the vibration plate 304 displaces the piezoelectric element 60*b*, and the piezoelectric element 60*b* outputs counter-electromotive force corresponding to the displacement as the residual vibration signal Vout2.

Figure 15:
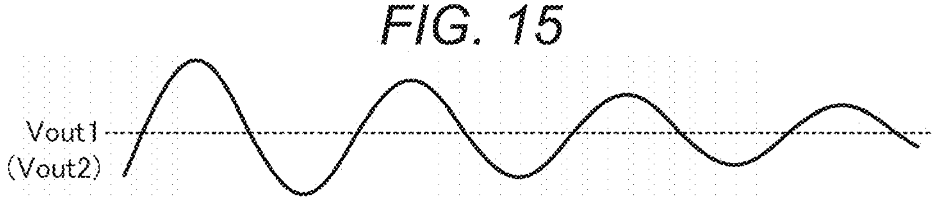
FIG. 15 is a diagram showing an example of a residual vibration signal Vout1, Vout2.

FIG. 15 is a diagram showing an example of the residual vibration signal Vout1, Vout2. As shown in FIG. 15, the signal waveform of the residual vibration signal Vout1, Vout2 is a damped vibration waveform in which the voltage amplitude decreases with time in accordance with the damped vibration generated in the vibration plate 304 due to the change in the internal pressure of the pressure chambers CB1, CB2. Waveform information such as an amplitude, an attenuation rate, and a frequency that the damped vibration waveform of the residual vibration signals Vout1, Vout2 includes varies depending on the state of the ink retained in the pressure chambers CB1, CB2 and the state of the ink flowing through the communication flow path RR1 and the nozzle flow path RN.

Figure 16:
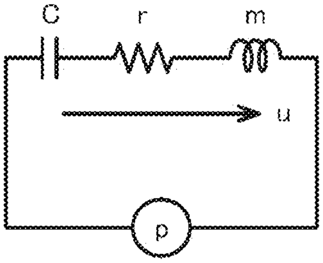
FIG. 16 is a diagram showing an example of a calculation model of a simple harmonic motion assuming a residual vibration generated in the pressure chamber CB1, the pressure chamber CB2, or a vibration plate.

Here, the relationship between the waveform information of the residual vibration signals Vout1, Vout2 and the state of the ink retained in the pressure chambers CB1, CB2, the state of the ink flowing through the communication flow paths RR1, RR2, and the nozzle flow paths RN will be described using a calculation model. FIG. 16 is a diagram showing an example of the calculation model of a simple harmonic motion assuming the residual vibration generated in the pressure chamber CB1, the pressure chamber CB2, or the vibration plate 304. As mentioned above, the piezoelectric elements 60*a*, 60*b* are displaced by supplying the drive voltage signals Vin1, Vin2 corresponding thereto, and the vibration plate 304 is also displaced due to the displacement of the piezoelectric elements 60*a*, 60*b*. Then, the volumes of the pressure chambers CB1, CB2 corresponding thereto change due to the displacement of the vibration plate 304. On this occasion, a part of the ink filling the pressure chambers CB1, CB2 is ejected from the nozzle N in accordance with the pressure generated inside the pressure chambers CB1, CB2.

In such a series of operations of ejecting the ink from the nozzle N, the vibration plate 304 freely vibrates with a natural vibration frequency determined by a flow path resistance r based on, for example, the shape of the flow path through which the ink flows or the viscosity of the ink, an inertance m due to the liquid weight in the flow path, and a compliance C of the vibration plate 304, and the piezoelectric elements 60*a*, 60*b* are displaced in accordance with the free vibration generated in the vibration plate 304. Then, the piezoelectric element 60*a* outputs the counter-electromotive force in accordance with the displacement as the residual vibration signal Vout1, and the piezoelectric element 60*b* outputs the counter-electromotive force in accordance with the displacement as the residual vibration signal Vout2.

Such a calculation model of the residual vibration generated in the vibration plate 304 can be expressed by a pressure p, the inertance m, the compliance C, and the flow path resistance r. Then, by calculating the step response when applying the pressure p to the circuit shown in FIG. 16 with respect to volume velocity u, Formulas (1) to (3) described below are obtained.

$$u = \frac{p}{\omega \cdot m} e^{-\alpha \cdot t} \cdot \sin\omega t \qquad (1)$$

$$\omega = \sqrt{\frac{1}{m \cdot C_m} - \alpha^2} \qquad (2)$$

$$\alpha = \frac{r}{2m} \qquad (3)$$

Figure 17:
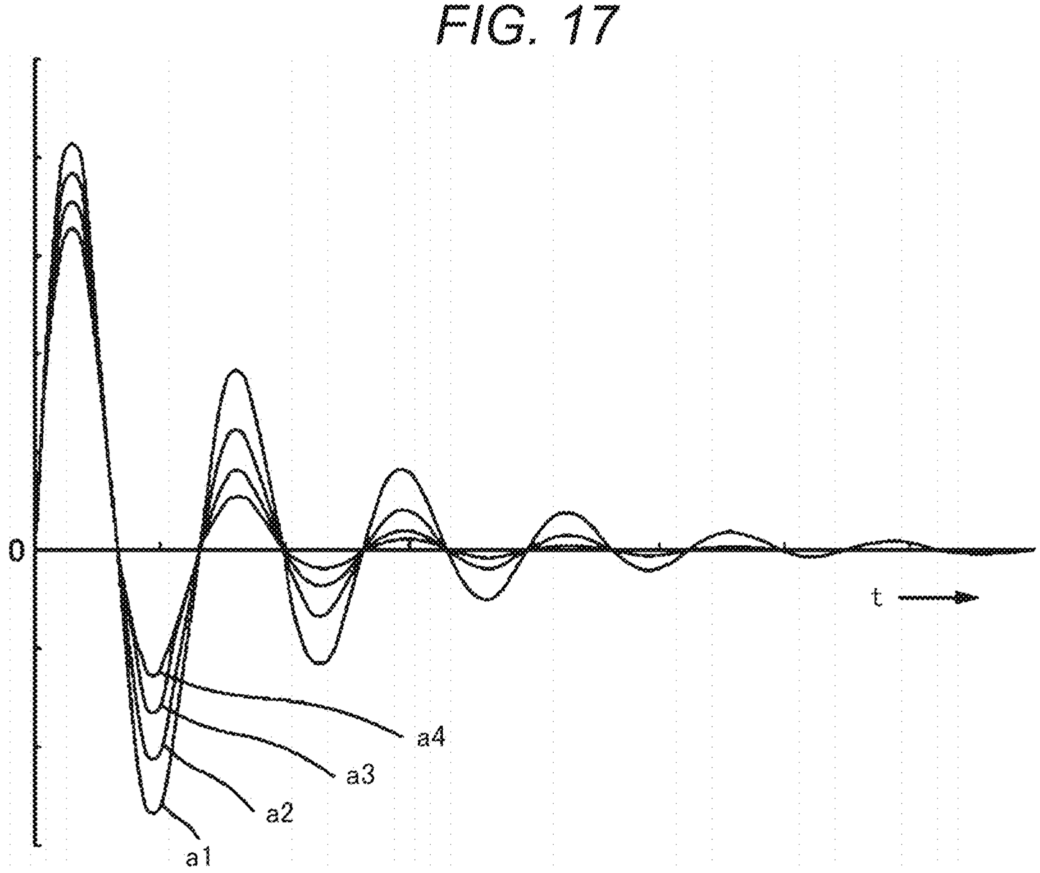
FIG. 17 is a diagram illustrating a relationship between the viscosity of the ink and a signal waveform of the residual vibration signal Vout1, Vout2.

FIG. 17 is a diagram illustrating a relationship between the viscosity of the ink and the signal waveform of the residual vibration signal Vout1, Vout2. In FIG. 17, the horizontal axis represents time, and the vertical axis represents the magnitude of the residual vibration. Further, in FIG. 17, the signal waveform when the thickening ratio in the viscosity of the ink is 1.0 is illustrated as a waveform a1, the signal waveform when the thickening ratio is 1.4 is illustrated as a waveform a2, the signal waveform when the thickening ratio is 1.8 is illustrated as waveform a3, and the signal waveform when the thickening ratio is 2.2 is illustrated as a waveform a4.

As shown in FIG. 17, when the viscosity of the ink retained therein increases and the thickening ratio increases, the amplitudes of the residual vibration signals Vout1, Vout2 and the attenuation rate change. Specifically, when the viscosity of the ink retained in the pressure chambers CB1, CB2, the ink flowing through the communication flow paths RR1, RR2 and the nozzle flow path RN, the ink in the vicinity of the nozzle N, and so on increases, the flow path resistance r increases. Therefore, the damping rate of the damped vibration generated in the vibration plate 304 becomes higher. As a result, when a thickening abnormality occurs in the ink retained therein, the attenuation rate of the amplitudes of the residual vibration signals Vout1, Vout2 corresponding thereto increases.

Figure 18:
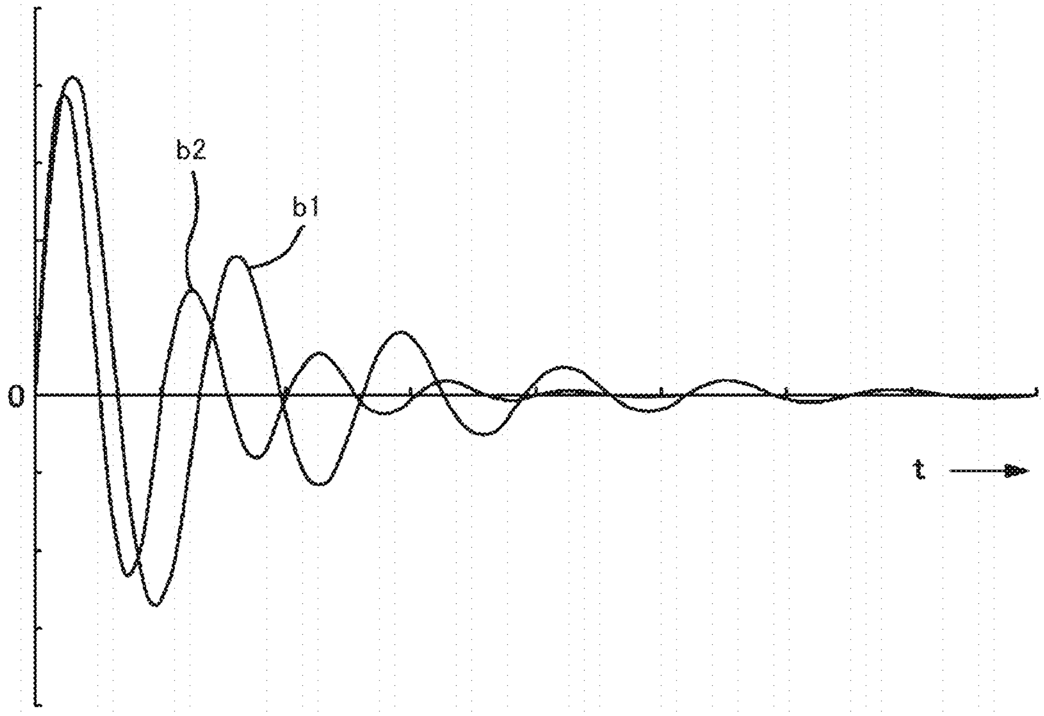
FIG. 18 is a diagram illustrating the signal waveforms of the residual vibration signal Vout1, Vout2 when bubbles infiltrate the pressure chambers CB1, CB2.

Further, FIG. 18 is a diagram illustrating the signal waveforms of the residual vibration signals Vout1, Vout2 when bubbles infiltrate the pressure chambers CB1, CB2. In FIG. 18, the horizontal axis represents time, and the vertical axis represents the magnitude of the residual vibration. Further, FIG. 18 shows a signal waveform in a normal state in which bubbles do not infiltrate the pressure chambers CB1, CB2, the communication flow paths RR1, RR2, and the nozzle flow paths RN as a waveform b1, and a signal waveform when bubbles infiltrate one of the pressure chambers CB1, CB2, the communication flow paths RR1, RR2, and the nozzle flow paths RN as a waveform b2.

As shown in FIG. 18, when bubbles infiltrate the pressure chambers CB1, CB2, the communication flow paths RR1, RR2, or the nozzle flow paths RN, the vibration frequencies of the residual vibration signals Vout1, Vout2 rise. Specifically, when bubbles infiltrate the inside of the pressure chambers CB1, CB2, the communication flow paths RR1, RR2, the nozzle flow paths RN, or the nozzle N, the inertance m corresponding to the weight of the ink retained therein decreases by the amount of the bubbles infiltrating therein. Further, when the inertance m decreases, an angular velocity ω increases as shown in Formula (2). Thus, the vibration period of the residual vibration generated in the vibration plate 304 is shortened, and as a result, the vibration frequencies of the residual vibration signals Vout1 and Vout2 rise.

As described above, when a thickening abnormality in which the viscosity of the ink increases, or a bubble infiltration abnormality in which bubbles infiltrate occurs in the pressure chamber CB1, the communication flow path RR1, the nozzle flow path RN, and so on, waveform information such as the amplitude and frequency of the residual vibration signal Vout1 changes, and similarly, when the thickening abnormality or the bubble infiltration abnormality occurs in the pressure chamber CB2, the communication flow path RR2, the nozzle flow path RN, and so on, the waveform information such as the amplitude and frequency of the residual vibration signal Vout2 changes. Therefore, the state of the ejector 600 including the piezoelectric elements 60*a*, 60*b* which output the residual vibration signals Vout1, Vout2 can be determined based on the waveform information such as the amplitude and frequency of the residual vibration signals Vout1, Vout2.

Here, when the drive signal selection circuit 200 supposedly acquires both the residual vibration signal Vout1 and the residual vibration signal Vout2 individually, and the control circuit 100 supposedly calculates the waveform information such as the amplitude and frequency of the residual vibration signal Vout1 and the waveform information such as the amplitude and frequency of the residual vibration signal Vout2 separately, it may be possible to determine the state of the ejector 600 even in the configuration in which the ejector 600 as the inspection target has the pressure chamber CB1 and the pressure chamber CB2.

However, in the configuration in which the ejector 600 as the inspection target has the pressure chamber CB1 and the pressure chamber CB2, when both the residual vibration signal Vout1 and the residual vibration signal Vout2 are individually acquired, and the state of the ejector 600 is determined, the drive signal selection circuit 200 needs to have a configuration for switching whether to acquire the residual vibration signal Vout1 or to acquire the residual vibration signal Vout2, and as a result, there is a concern that the integrated circuit 201 in which the drive signal selection circuit 200 is implemented grows in size. The growth in size of the integrated circuit 201 makes it difficult to COF-mount the integrated circuit 201 on the flexible board 24, and the growth in size of the print head 21 is concerned, and when the integrated circuit 201 is provided to the head circuit board 23 or the like different from the flexible board 24, there is a possibility that the waveform accuracy of the drive voltage signal Vin output by the drive signal selection circuit 200 is deteriorated.

Further, in the configuration in which the ejector 600 as the inspection target has the pressure chamber CB1 and the pressure chamber CB2, when both the residual vibration signal Vout1 and the residual vibration signal Vout2 are individually acquired and the state of the ejector 600 is determined, it is necessary to sequentially acquire both the residual vibration signal Vout1 and the residual vibration signal Vout2 and to individually determine the waveform information of the residual vibration signal Vout1 and the waveform information of the residual vibration signal Vout2, and as a result, a significant increase in state determination time of the ejector 600 is also concerned.

With respect to such a problem, in the liquid ejection apparatus 1 according to the present embodiment, the drive signal selection circuit 200 acquires the residual vibration signal Vout obtained by combining the residual vibration signal Vout1 and the residual vibration signal Vout2 with each other, to output the residual vibration signal NVT according to the residual vibration signal Vout. Then, the AD conversion circuit 300 converts the residual vibration signal NVT into the residual vibration signal dNVT as a digital signal, and the control circuit 100 determines the state of the ejector 600 as the inspection target based on the residual vibration signal dNVT. Thus, the configuration for switching whether to acquire the residual vibration signal Vout1 corresponding to the pressure chamber CB1 or to acquire the residual vibration signal Vout2 corresponding to the pressure chamber CB2 is not required, and the reduction in size of the integrated circuit 201 in which the drive signal selection circuit 200 is implemented is realized, and since the integrated circuit 201 is small in size, it is easy to COF-mount the integrated circuit 201 on the flexible board 24, and as a result, the reduction in size of the print head 21 can be realized, and the possibility that the accuracy of the drive voltage signal Vin is deteriorated is reduced.

Here, the method of determining the state of the ejector 600 based on the residual vibration signal Vout obtained by combining the residual vibration signal Vout1 and the residual vibration signal Vout2 with each other will be described. In describing the method of determining the state of the ejector 600 based on the residual vibration signal Vout, first, an example of the signal waveform of the residual vibration signal Vout obtained by combining the residual vibration signal Vout1 and the residual vibration signal Vout2 with each other will be described.

Figure 19:
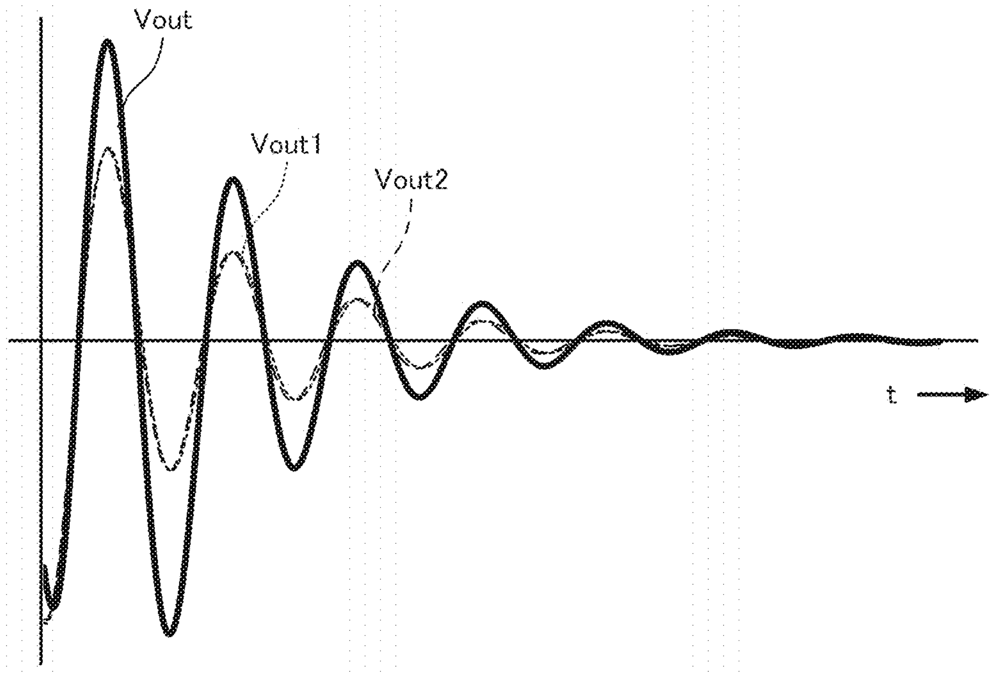
FIG. 19 is a diagram showing an example of the signal waveform of a residual vibration signal Vout when the ejector is normal.

FIG. 19 is a diagram showing an example of the signal waveform of the residual vibration signal Vout when the ejector 600 is normal. In FIG. 19, the horizontal axis represents time, and the vertical axis represents the magnitude of the residual vibration. The residual vibration signal Vout shown in FIG. 19 is an example of the signal waveform of the residual vibration signal Vout input to the drive signal selection circuit 200 when the pressure chamber CB1 corresponding to the piezoelectric element 60*a* is normal and the pressure chamber CB2 corresponding to the piezoelectric element 60*b* is normal. Incidentally, in FIG. 19, the residual vibration signal Vout1 and the residual vibration signal Vout2 are also illustrated.

As shown in FIG. 19, when the pressure chamber CB1 corresponding to the piezoelectric element 60*a* is normal and the pressure chamber CB2 corresponding to the piezoelectric element 60*b* is normal, the residual vibration signal Vout1 output by the piezoelectric element 60*a* and the residual vibration signal Vout2 output by the piezoelectric element 60*b* are substantially equivalent in signal waveform. Specifically, the drive voltage signal Vin is input to the piezoelectric element 60*a* as the drive voltage signal Vin1, and the drive voltage signal Vin is input to the piezoelectric element 60*b* as the drive voltage signal Vin2. That is, the drive voltage signals Vin the same in signal waveform are supplied respectively to the piezoelectric element 60*a* and the piezoelectric element 60*b* at the same timing. On this occasion, substantially the same residual vibrations are generated in the region of the vibration plate 304 corresponding to the piezoelectric element 60*a* and the region of the vibration plate 304 corresponding to the piezoelectric element 60*b*. Therefore, when the pressure chamber CB1 corresponding to the piezoelectric element 60*a* is normal and the pressure chamber CB2 corresponding to the piezoelectric element 60*b* is normal, the residual vibration signal Vout1 and the residual vibration signal Vout2 become substantially equivalent in signal waveform. Therefore, the residual vibration signal Vout that has a frequency substantially equivalent to the frequency of the residual vibration signal Vout1 and the frequency of the residual vibration signal Vout2, and an amplitude larger than the amplitude of the residual vibration signal Vout1 and the amplitude of the residual vibration signal Vout2 is input to the drive signal selection circuit 200 as a composite wave of the residual vibration signal Vout1 and the residual vibration signal Vout2.

Figure 20:
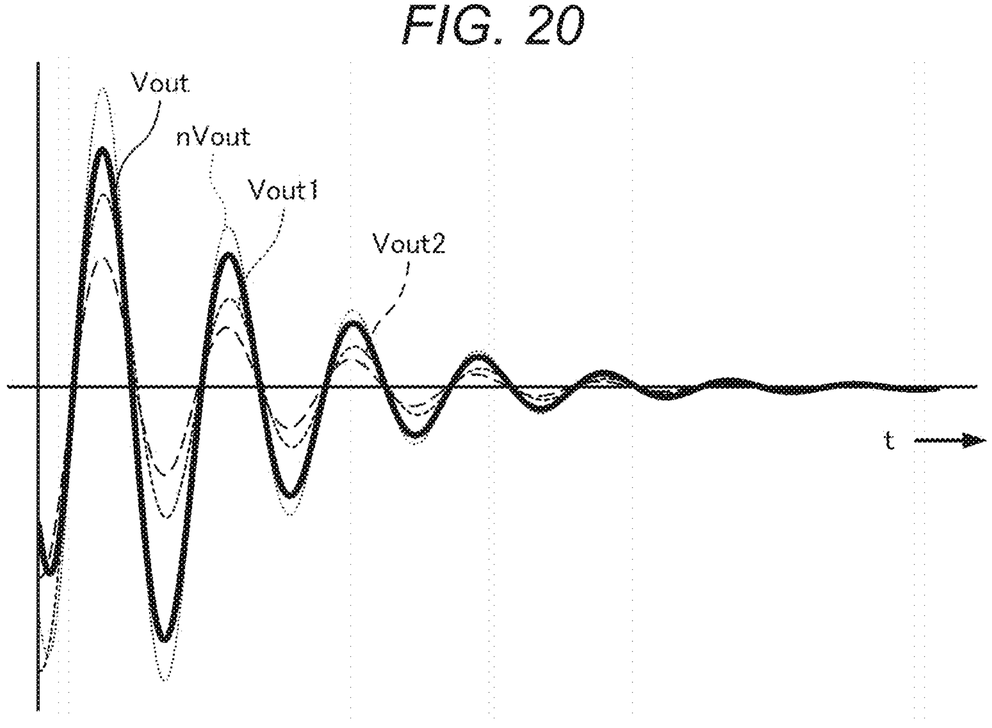
FIG. 20 is a diagram showing an example of the signal waveform of the residual vibration signal Vout when a thickening abnormality occurs in the ejector.

FIG. 20 is a diagram showing an example of the signal waveform of the residual vibration signal Vout when the thickening abnormality occurs in the ejector 600. In FIG. 20, the horizontal axis represents time, and the vertical axis represents the magnitude of the residual vibration. The residual vibration signal Vout shown in FIG. 20 is an example of the signal waveform of the residual vibration signal Vout input to the drive signal selection circuit 200 when the pressure chamber CB1 corresponding to the piezoelectric element 60*a* is normal, and the thickening abnormality occurs in the ink retained in the pressure chamber CB2 corresponding to the piezoelectric element 60*b*. Note that in FIG. 20, in addition to the residual vibration signal Vout1 and the residual vibration signal Vout2, a residual vibration signal nVout corresponding to the residual vibration signal Vout when the ejector 600 is normal shown in FIG. 19 is additionally illustrated.

As shown in FIG. 20, when the pressure chamber CB1 corresponding to the piezoelectric element 60*a* is normal and the thickening abnormality has occurred in the pressure chamber CB2 corresponding to the piezoelectric element 60b, the attenuation rate of the residual vibration signal Vout2 output by the piezoelectric element 60b with respect to the residual vibration signal Vout1 output by the piezoelectric element 60a increases and the amplitude decreases. Specifically, the drive voltage signal Vin is input to the piezoelectric element 60a as the drive voltage signal Vin1, and the drive voltage signal Vin is input to the piezoelectric element 60b as the drive voltage signal Vin2. That is, the drive voltage signals Vin the same in signal waveform are supplied respectively to the piezoelectric element 60a and the piezoelectric element 60b at the same timing. On this occasion, the residual vibration smaller in amplitude than the residual vibration generated in the region of the vibration plate 304 corresponding to the piezoelectric element 60a occurs in the region of the vibration plate 304 corresponding to the piezoelectric element 60b. Therefore, when the pressure chamber CB1 corresponding to the piezoelectric element 60a is normal and the thickening abnormality occurs in the pressure chamber CB2 corresponding to the piezoelectric element 60b, the amplitude of the residual vibration signal Vout2 becomes smaller than the amplitude of the residual vibration signal Vout1. Therefore, the residual vibration signal Vout that has a frequency substantially equivalent to the frequency of the residual vibration signal Vout1 and the frequency of the residual vibration signal Vout2, and an amplitude smaller than the amplitude of the residual vibration signal nVout is input to the drive signal selection circuit 200 as the composite wave of the residual vibration signal Vout1 and the residual vibration signal Vout2.

Figure 21:
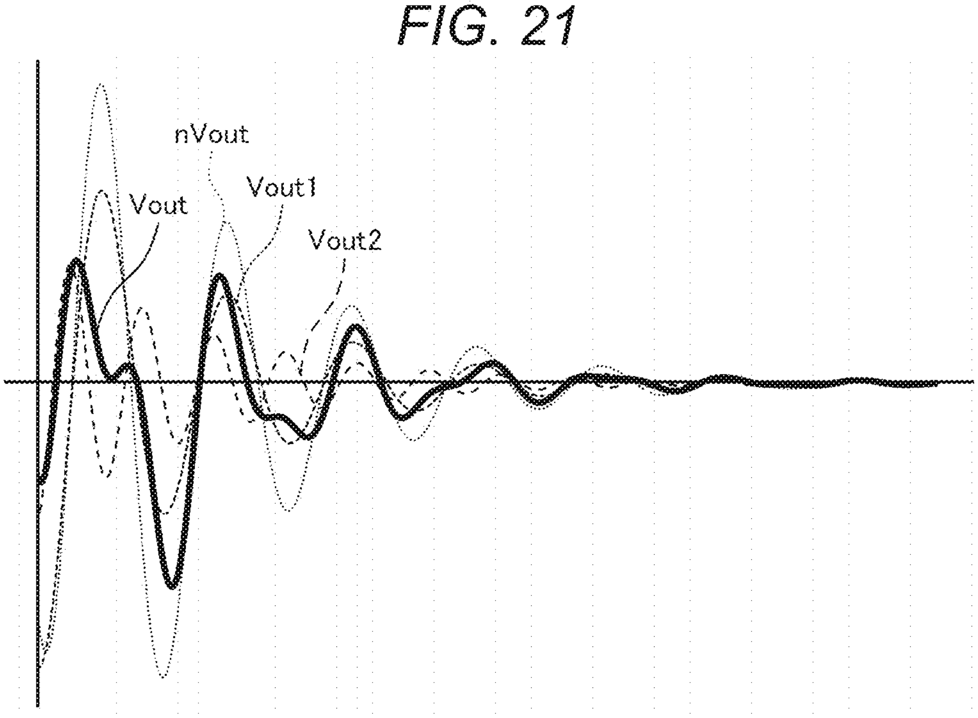
FIG. 21 is a diagram showing an example of the signal waveform of the residual vibration signal Vout when a bubble infiltration abnormality occurs in the ejector.

FIG. 21 is a diagram showing an example of the signal waveform of the residual vibration signal Vout when a bubble infiltration abnormality occurs in the ejector 600. In FIG. 21, the horizontal axis represents time, and the vertical axis represents the magnitude of the residual vibration. The residual vibration signal Vout shown in FIG. 21 is an example of the signal waveform of the residual vibration signal Vout input to the drive signal selection circuit 200 when the pressure chamber CB1 corresponding to the piezoelectric element 60a is normal, and the bubble infiltration abnormality occurs in the pressure chamber CB2 corresponding to the piezoelectric element 60b. Note that in FIG. 21, in addition to the residual vibration signal Vout1 and the residual vibration signal Vout2, the residual vibration signal nVout corresponding to the residual vibration signal Vout when the ejector 600 is normal shown in FIG. 19 is additionally illustrated.

As shown in FIG. 21, when the pressure chamber CB1 corresponding to the piezoelectric element 60a is normal, and the bubble infiltration abnormality has occurred in the pressure chamber CB2 corresponding to the piezoelectric element 60b, the residual vibration signal Vout2 output by the piezoelectric element 60b becomes higher in frequency than the residual vibration signal Vout1 output by the piezoelectric element 60a. Specifically, the drive voltage signal Vin is input to the piezoelectric element 60a as the drive voltage signal Vin1, and the drive voltage signal Vin is input to the piezoelectric element 60b as the drive voltage signal Vin2. That is, the drive voltage signals Vin the same in signal waveform are supplied respectively to the piezoelectric element 60a and the piezoelectric element 60b at the same timing. On this occasion, the residual vibration higher in frequency than the residual vibration generated in the region of the vibration plate 304 corresponding to the piezoelectric element 60a occurs in the region of the vibration plate 304 corresponding to the piezoelectric element 60b. Therefore, when the pressure chamber CB1 corresponding to the piezoelectric element 60a is normal and the bubble infiltration abnormality occurs in the pressure chamber CB2 corresponding to the piezoelectric element 60b, the frequency of the residual vibration signal Vout2 becomes higher than the frequency of the residual vibration signal Vout1. Therefore, the residual vibration signal Vout different in period and frequency from the residual vibration signal nVout is input to the drive signal selection circuit 200 as the composite wave of the residual vibration signal Vout1 and the residual vibration signal Vout2.

As described above, when the pressure chamber CB1 corresponding to the residual vibration signal Vout1 and the pressure chamber CB2 corresponding to the residual vibration signal Vout2 are both normal, both the frequency and the amplitude of the residual vibration signal Vout as the composite wave of the residual vibration signal Vout1 and the residual vibration signal Vout2 are in predetermined ranges. On the other hand, when the viscosity of the ink retained in at least one of the pressure chamber CB1 corresponding to the residual vibration signal Vout1 and the pressure chamber CB2 corresponding to the residual vibration signal Vout2 increases, the amplitude of the residual vibration signal Vout becomes smaller compared to when the pressure chamber CB1 corresponding to the residual vibration signal Vout1 and the pressure chamber CB2 corresponding to the residual vibration signal Vout2 are both normal, and further, when bubbles infiltrate at least one of the pressure chamber CB1 corresponding to the residual vibration signal Vout1 and the pressure chamber CB2 corresponding to the residual vibration signal Vout2, at least one of the phase and the frequency of the residual vibration signal Vout becomes out of the predetermined range when both the pressure chamber CB1 corresponding to the residual vibration signal Vout1 and the pressure chamber CB2 corresponding to the residual vibration signal Vout2 are normal. That is, when an abnormality occurs in at least one of the pressure chamber CB1 corresponding to the residual vibration signal Vout1 and the pressure chamber CB2 corresponding to the residual vibration signal Vout2, the amplitude and the period of the residual vibration signal Vout change.

In the liquid ejection apparatus 1 according to the present embodiment, it is possible to determine whether the ejector 600 as the inspection target is normal based on at least one of the amplitude and the frequency of the residual vibration signal Vout. Note that the liquid ejection apparatus 1 may determine whether the ejector 600 as the inspection target is normal based on various waveform information in addition to amplitude and frequency. Further, of course, the amplitude of the residual vibration signal Vout includes the waveform information that can be calculated from the amplitude such as an attenuation rate, and the frequency of the residual vibration signal Vout includes the waveform information that can be calculated based on the frequency such as the period or the phase.

Here, a specific example of a method of determining the state of the print head 21 based on the residual vibration signal Vout, that is a method of determining the state of the ejector 600 as the inspection target provided to the print head 21 will be described.

Figure 22:
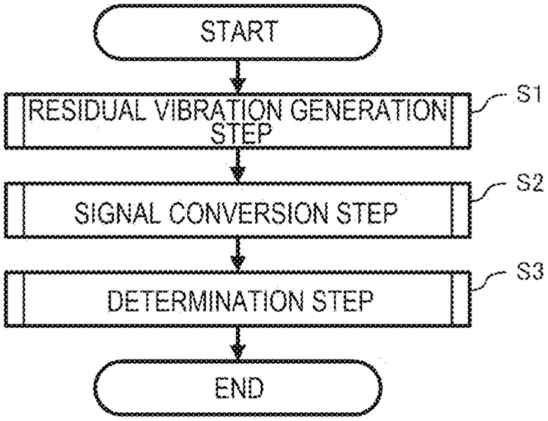
FIG. 22 is a diagram showing an example of a method of determining a state of the ejector based on the residual vibration signal Vout.

FIG. 22 is a diagram showing an example of the method of determining the state of the ejector 600 based on the residual vibration signal Vout. As shown in FIG. 22, the method of determining the state of the ejector 600 as the inspection target based on the residual vibration signal Vout includes a residual vibration generation step (step S1) of driving the piezoelectric elements 60a, 60b provided to the ejector 600 as the inspection target to change the volumes of the pressure chamber CB1 corresponding to the piezoelectric element 60*a* and the pressure chamber CB2 corresponding to the piezoelectric element 60*b* to thereby generate the residual vibration in the pressure chamber CB1 and the pressure chamber CB2, a signal conversion step (step S2) of converting the residual vibration signal NVT corresponding to the residual vibration signal Vout obtained by combining the signal waveform of the residual vibration signal Vout1 according to the residual vibration generated in the pressure chamber CB1 and the signal waveform of the residual vibration signal Vout2 according to the residual vibration generated in the pressure chamber CB2 with each other into the residual vibration signal dNVT as a digital signal, and a determination step (step 3) of determining the state of the print head 21, namely presence or absence of the abnormality in the ejector 600 as the inspection target, based on the residual vibration signal dNVT.

Figure 23:
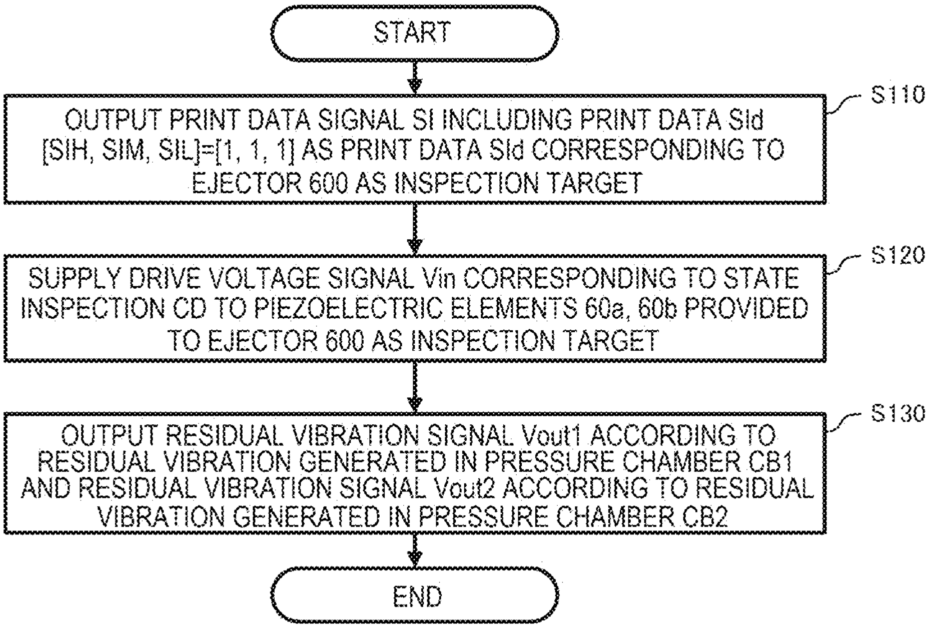
FIG. 23 is a diagram showing a specific example of a residual vibration generation step.

First, a specific example of the residual vibration generation step (step S1) will be described. FIG. 23 is a diagram illustrating a specific example of the residual vibration generation step. As shown in FIG. 23, in the residual vibration generation step (step S1), the control circuit 100 generates and outputs (step S110) the print data signal SI including the print data SId[SIH, SIM, SIL]=[1, 1, 1] as the print data SId corresponding to the ejector 600 as the inspection target.

The print data signal SI including the print data SId[SIH, SIM, SIL]=[1, 1, 1] output by the control circuit 100 is input to the drive signal selection circuit 200 provided to the print head 21. The drive signal selection circuit 200 supplies (step S120) the piezoelectric elements 60*a*, 60*b* corresponding to the ejector 600 as the inspection target with the drive voltage signal Vin corresponding to the state inspection CD by controlling the conduction state of the selection circuit 230 corresponding to the ejector 600 as the inspection target in accordance with the print data SId[SIH, SIM, SIL]=[1, 1, 1] input thereto. Thus, the piezoelectric elements 60*a*, 60*b* provided to the ejector 600 as the inspection target are driven, and the volumes of the pressure chamber CB1 corresponding to the piezoelectric element 60*a* and the pressure chamber CB2 corresponding to the piezoelectric element 60*b* are changed. As a result, the residual vibration is generated in the pressure chamber CB1 and the residual vibration is generated in the pressure chamber CB2. Then, the piezoelectric element 60*a* provided to the ejector 600 as the inspection target provided to the print head 21 outputs the residual vibration signal Vout of the counter-electromotive force corresponding to the residual vibration generated in the pressure chamber CB1, and the piezoelectric element 60*b* provided to the ejector 600 as the inspection target outputs the residual vibration signal Vout2 of the counter-electromotive force corresponding to the residual vibration generated in the pressure chamber CB2 (step S130). This ends the residual vibration generation step (step S1).

That is, in the residual vibration generation step (step S1) of the present embodiment, the volume of the pressure chamber CB1 is changed by driving the piezoelectric element 60*a* in accordance with the drive voltage signal Vin based on the drive signal COM, and the volume of the pressure chamber CB2 is changed by driving the piezoelectric element 60*b* in accordance with the drive voltage signal Vin based on the drive signal COM. Then, the piezoelectric element 60*a* outputs the residual vibration signal Vout1 according to the residual vibration generated in the pressure chamber CB1, and the piezoelectric element 60*b* outputs the residual vibration signal Vout2 according to the residual vibration generated in the pressure chamber CB2.

Figure 24:
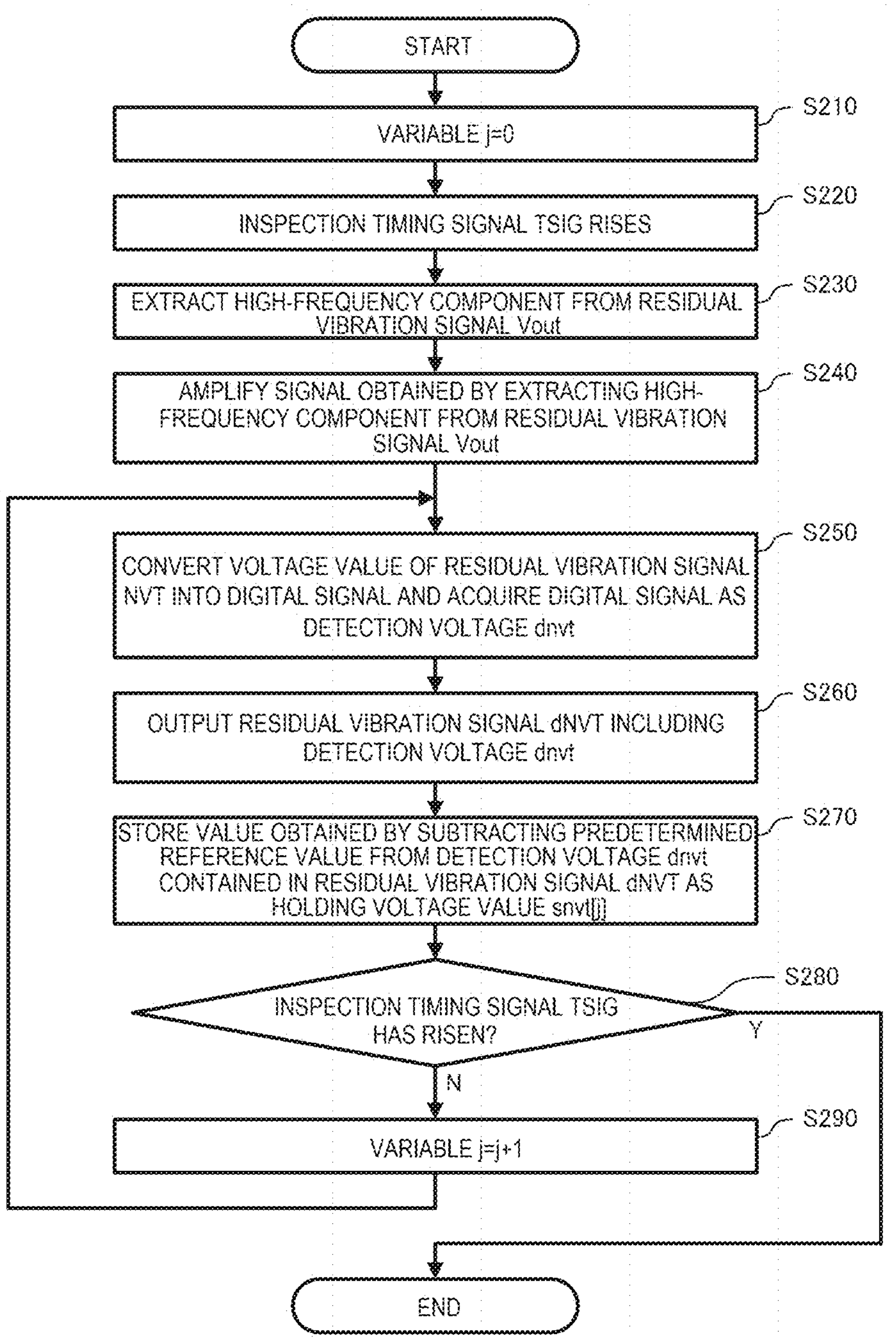
FIG. 24 is a diagram showing a specific example of a signal conversion step.

Then, a specific example of the signal conversion step (step S2) will be described. FIG. 24 is a diagram showing a specific example of the signal conversion step (step S2). As shown in FIG. 24, in executing the signal conversion step (step S2), the control circuit 100 sets (step S210) a variable j to "0" as initialization processing. Subsequently, by raising the inspection timing signal TSIG (step S220), the drive signal selection circuit 200 controls the transfer gate 234*c* provided to the selection circuit 230 corresponding to the ejector 600 as the inspection target to turn on. Thus, the drive signal selection circuit 200 acquires the residual vibration signal Vout, which is a composite wave of the residual vibration signal Vout1 output by the piezoelectric element 60*a* and the residual vibration signal Vout2 output by the piezoelectric element 60*b* in the residual vibration generation step (step S1). Then, the filter circuit 241 provided to the waveform shaping circuit 240 provided to the drive signal selection circuit 200 extracts (step S230) the high frequency component from the residual vibration signal Vout thus acquired, and the amplifier circuit 242 provided to the waveform shaping circuit 240 provided to the drive signal selection circuit 200 amplifies (step S240) the signal obtained by extracting the high frequency component from the residual vibration signal Vout. Then, the drive signal selection circuit 200 outputs the signal amplified by the amplifier circuit 242 as the residual vibration signal NVT.

That is, the signal conversion step (step S2) includes the step of extracting the signal of the AC component contained in the residual vibration signal Vout and the step of amplifying the signal of the AC component extracted from the residual vibration signal Vout.

The residual vibration signal NVT output by the drive signal selection circuit 200 is input to the AD conversion circuit 300. The AD conversion circuit 300 converts the voltage value of the residual vibration signal NVT input thereto into a digital signal, and acquires the digital signal as a detection voltage dnvt (step S250). Then, the AD conversion circuit 300 outputs (step S260) the residual vibration signal dNVT including the detection voltage dnvt input thereto.

The residual vibration signal dNVT including the detection voltage dnvt output by the AD conversion circuit 300 is input to the control circuit 100. The control circuit 100 stores the value obtained by subtracting a predetermined reference value from the detection voltage dnvt contained in the residual vibration signal dNVT as a holding voltage value snvt[j] (step S270). Subsequently, the drive signal selection circuit 200 determines (step S280) whether the inspection timing signal TSIG has risen. When the drive signal selection circuit 200 determines that the inspection timing signal TSIG has not risen (N in step S280), the control circuit 100 adds 1 to the variable j (step S290) and repeats the processing in steps S250 to S280 described above. Here, the predetermined reference value is a value of the DC component to be superimposed on the residual vibration signal NVT, and is ideally "0" in the present embodiment.

That is, the AD conversion circuit 300 sequentially converts the voltage value of the residual vibration signal NVT input during the period ts2 that is a period from when the inspection timing signal TSIG rises to when the inspection timing signal TSIG subsequently rises into a digital signal at timings based on a sampling period to convert the result into the detection voltage dnvt as the digital signal thus converted. Then, the control circuit 100 sequentially stores the detection voltage dnvt input from the AD conversion circuit 300 as the holding voltage value snvt[j] at a timing based on the sampling period.

Subsequently, by the drive signal selection circuit 200 determining that the inspection timing signal TSIG has risen (Y in step S280), the drive signal selection circuit 200 determines that the acquisition of the detection voltage dvnt, that is the voltage value of the residual vibration signal NVT in the period ts2, is completed. This ends the signal conversion step (step S2).

Figure 25:
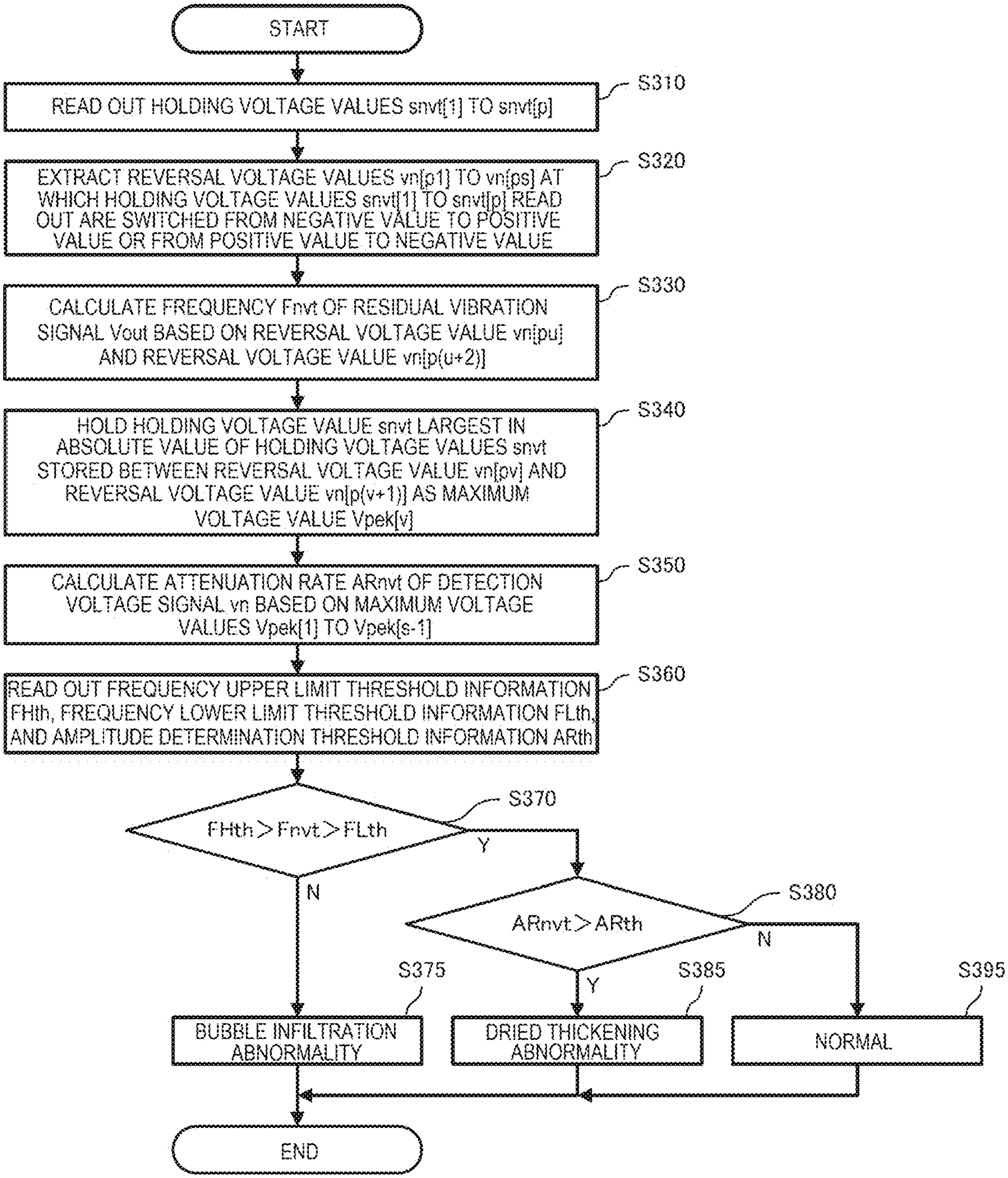
FIG. 25 is a diagram showing a specific example of a determination step.

Then, a specific example of the determination step (step S3) will be described. FIG. 25 is a diagram illustrating a specific example of the determination step. Here, in the following description, it is assumed that the control circuit 100 has stored p detection voltages dnvt during the period ts2. That is, the description will be presented assuming that the control circuit 100 stores holding voltage values snvt[1] to snvt[p] as the detection voltage dnvt.

When the determination step (step S3) starts, the control circuit 100 reads out (step S310) the holding voltage values snvt[1] to snvt[p] stored therein. Then, the control circuit 100 extracts a holding voltage value snvt at the timing when the voltage value switches from a positive value to a negative value or from a negative value to a positive value from the holding voltage values snvt[1] to snvt[p] thus read out. Here, in the following description, the holding voltage value snvt at the timing at which the voltage value is changed from a positive value to a negative value or from a negative value to a positive value for the first time after the inspection timing signal TSIG rises is referred to as a reversal voltage value vn[p1], and the holding voltage value snvt at the timing at which the voltage value is changed from a positive value to a negative value or from a negative value to a positive value for the last time after the inspection timing signal TSIG rises, that is the holding voltage value snvt at the timing at which the voltage value is changed from a positive value to a negative value or from a negative value to a positive value for the s-th time, is referred to as a reversal voltage value vn[ps]. That is, the control circuit 100 extracts (step S320) the reversal voltage values vn[p1] to vn[ps] at the timings when the voltage value switches from a positive value to a negative value or from a negative value to a positive value from the holding voltage values svnt[1] to svnt[p] thus read out.

Then, the control circuit 100 calculates (step S330) a frequency Fnvt of the residual vibration signal Vout based on a reversal voltage value vn[pu] (u is any one of 1 to s−2) and a reversal voltage value vn[p(u+2)] out of the reversal voltage values vn[p1] to vn[ps] thus extracted.

Specifically, the control circuit 100 calculates the number of the holding voltage values snvt obtained between the reversal voltage value vn[pu] and the reversal voltage value vn[p(u+2)]. Then, the control circuit 100 calculates the time from the reversal voltage value vn[pu] to the reversal voltage value vn[p(u+2)] from the number of the holding voltage values snvt thus calculated and the sampling period of the AD conversion circuit 300. The control circuit 100 calculates the frequency Fnvt of the residual vibration signal Vout based on the thus calculated time from the reversal voltage value vn[pu] to the reversal voltage value vn[p(u+2)].

Further, the control circuit 100 holds (step S340) the holding voltage value snvt the largest in absolute value among the holding voltage values snvt stored between a reversal voltage value vn[pv] (v is one of 1 to s−1) and a reversal voltage value vn[p(v+1)] as a maximum voltage value Vpec[v]. Specifically, the control circuit 100 stores the holding voltage value snvt the largest in absolute value out of the holding voltage values snvt stored between the reversal voltage value vn[p1] and a reversal voltage value vn[p2] as a maximum voltage value Vpek[1], and similarly holds the holding voltage value snvt the largest in absolute value out of the holding voltage values snvt held between the reversal voltage value vn[pv] and the reversal voltage value vn[p(v+1)] as the maximum voltage value Vpek[v], and holds the holding voltage value snvt the largest in absolute value out of the holding voltage values snvt stored between a reversal voltage value vn[p(s−1)] and the reversal voltage value vn[ps] as a maximum voltage value Vpek[s−1]. The maximum voltage value Vpek[v] held by the control circuit 100 corresponds to the amplitude generated in the residual vibration signal Vout. Then, the control circuit 100 calculates (step S350) an attenuation rate ARnvt of the amplitude of the residual vibration signal Vout based on the maximum voltage values Vpek[1] to Vpek[s−1] corresponding to the amplitude generated in the residual vibration signal Vout.

Subsequently, the control circuit 100 reads out (step S360) frequency upper limit threshold information FHth, frequency lower limit threshold information FLth, and amplitude determination threshold information ARth stored in advance. Here, the frequency upper limit threshold information FHth, the frequency lower limit threshold information FLth, and the amplitude determination threshold information ARth can be set based on the frequency, the amplitude, and the attenuation rate of the residual vibration signal Vout, which is the composite wave of the residual vibration signals Vout1, Vout2 output by the piezoelectric elements 60*a*, 60*b* when the pressure chambers CB1, CB2 are normal.

Then, the control circuit 100 determines whether the frequency Fnvt of the residual vibration signal Vout thus calculated is in between the frequency upper limit threshold information FHth and the frequency lower limit threshold information FLth. That is, the control circuit 100 determines (step S370) whether the frequency Fnvt is lower than the frequency upper limit threshold information FHth and whether the frequency Fnvt is higher than the frequency lower limit threshold information FLth. Then, when the frequency Fnvt is higher than or equal to the frequency upper limit threshold information FHth, or when the frequency Fnvt is lower than or equal to the frequency lower limit threshold information FLth (N in step S370), in other words, when the frequency Fnvt of the residual vibration signal Vout thus calculated is not in between the frequency upper limit threshold information FHth and the frequency lower limit threshold information FLth, the control circuit 100 determines (step S375) that the bubble infiltration abnormality has occurred in the ejector 600 as the inspection target, and ends the determination step.

Further, when the frequency Fnvt is lower than the frequency upper limit threshold information FHth and the frequency Fnvt is higher than the frequency lower limit threshold information FLth (Y in step S370), the control circuit 100 determines (step S380) whether the attenuation rate ARnvt of the amplitude of the residual vibration signal Vout is higher than the amplitude determination threshold information ARth. Then, when the attenuation rate ARnvt of the amplitude of the residual vibration signal Vnvt is higher than the amplitude determination threshold information ARth (Y in step S380), the control circuit 100 determines (step S385) that the thickening abnormality has occurred in the ejector 600 as the inspection target, and ends the determination step.

Further, when the attenuation rate ARnvt of the amplitude of the residual vibration signal Vnvt is lower than or equal to the amplitude determination threshold information ARth (N in step S380), the control circuit 100 determines (step S395) that the ejector 600 as the inspection target is normal and ends the determination step.

As described above, in the liquid ejection apparatus 1 according to the present embodiment, it is possible to determine whether the ejector 600 as the inspection target is normal based on the amplitude and the frequency of the residual vibration signal Vout. That is, in the determination step (step S3), at least one of the amplitude and the frequency of the residual vibration signal Vout and the residual vibration signal NVT is calculated based on the residual vibration signal dNVT to determine the state of the print head 21, that is the state of the ejector 600 as the inspection target provided to the print head 21, based on the calculation result. In other words, the control circuit 100 calculates at least one of the amplitude and the frequency of the residual vibration signal Vout and the residual vibration signal NVT based on the residual vibration signal dNVT to determine the state of the print head 21, that is the state of the ejector 600 as the inspection target provided to the print head 21, based on the calculation result.

Here, the conveyance unit 4 is an example of a conveyance mechanism, the control circuit 100 is an example of a processor, the ejection unit 5 is an example of a head unit, and the drive signal ComB as the drive signal COM is an example of a drive signal.

Further, the selection control circuit 220 provided to the drive signal selection circuit 200 of the print head 21 is an example of a switching control circuit, the transfer gate 234*c* corresponding to one of the plurality of ejectors 600 provided to the print head 21 is an example of a first switching circuit, the selection signal Sc for controlling the transfer gate 234*c* that is an example of the first switching circuit is an example of a switching signal, at least one of the waveform shaping circuit 240 and the AD conversion circuit 300 is an example of an inspection signal output circuit, one of the residual vibration signal NVT output by the waveform shaping circuit 240 that is an example of the inspection signal output circuit and the residual vibration signal dNVT output by the AD conversion circuit 300 is an example of an inspection signal, the piezoelectric element 60*a*, the piezoelectric element 60*b*, the pressure chamber CB1, the pressure chamber CB2, and the nozzle N provided to the ejector 600 are examples of a first piezoelectric element, a second piezoelectric element, a first pressure chamber, a second pressure chamber, and a first nozzle, the node 315 to which the piezoelectric element 60*a* as an example of the first piezoelectric element and the piezoelectric element 60*b* as an example of the second piezoelectric element are electrically coupled is an example of a first node, the residual vibration generated in the pressure chamber CB1 as an example of the first pressure chamber is an example of a first residual vibration, the residual vibration generated in the pressure chamber CB2 as an example of the second pressure chamber is an example of a residual vibration, the residual vibration signal Vout1 output by the piezoelectric element 60*a* as an example of the first piezoelectric element is an example of a first residual vibration signal, and the residual vibration signal Vout2 output by the piezoelectric element 60*b* as an example of the second piezoelectric element is an example of a second residual vibration signal.

Further, the transfer gate 234*c* corresponding to another ejector 600 out of the plurality of ejectors 600 provided to the print head 21 is an example of a second switching circuit, the piezoelectric element 60*a*, the piezoelectric element 60*b*, the pressure chamber CB1, the pressure chamber CB2, and the nozzle N provided to that ejector 600 are examples of a third piezoelectric element, a fourth piezoelectric element, a third pressure chamber, a fourth pressure chamber, and a second nozzle, respectively, the node 315 to which the piezoelectric element 60*a* as an example of the third piezoelectric element and the piezoelectric element 60*b* as an example of the fourth piezoelectric element are electrically coupled is an example of the second node, the residual vibration generated in the pressure chamber CB1 as an example of the third pressure chamber is an example of a third residual vibration, the residual vibration generated in the pressure chamber CB2 as an example of the fourth pressure chamber is an example of a fourth residual vibration, the residual vibration signal Vout1 output by the piezoelectric element 60*a* as an example of the third piezoelectric element is an example of a third residual vibration signal, and the residual vibration signal Vout2 output by the piezoelectric element 60*b* as an example of the fourth piezoelectric element is an example of a fourth residual vibration signal.

Further, the plurality of transfer gates 234*c* provided to the drive signal selection circuit 200 including the transfer gate 234*c* as an example of the first switching circuit and the transfer gate 234*c* as an example of the second switching circuit is an example of a plurality of switching circuits, and a coupling point to which the plurality of transfer gates 234*c* as an example of the plurality of switching circuits is commonly coupled is an example of a third node.

5. Functions and Advantages

The liquid ejection apparatus 1 and the print head 21 according to the present embodiment configured as described above include the selection circuit 230 to which the drive signal ComA as the drive signal COM is input, and which switches whether to output the drive voltage signal Vin according to the drive signal ComA, the piezoelectric element 60*a* that is displaced in accordance with the drive voltage signal Vin, the pressure chamber CB1 the volume of which changes due to the displacement of the piezoelectric element 60*a*, the piezoelectric element 60*b* that is displaced in accordance with the drive voltage signal Vin, the pressure chamber CB2 the volume of which changes due to the displacement of the piezoelectric element 60*b*, and the nozzle N that ejects the ink in accordance with the change in volume of the pressure chamber CB1 and the change in volume of the pressure chamber CB2, wherein the selection circuit 230 includes the single transfer gate 234*a* that switches whether to supply the drive signal ComA commonly to the piezoelectric element 60*a* and the piezoelectric element 60*b* as the drive voltage signal Vin in accordance with the selection signal Sa.

That is, the single nozzle N that ejects the ink in accordance with the volume change of the pressure chamber CB1 and the volume change of the pressure chamber CB2 is provided, wherein the volume of the pressure chamber CB1 changes due to the displacement of the piezoelectric element 60*a*, and the volume of the pressure chamber CB2 changes due to the displacement of the piezoelectric element 60*b*. On this occasion, the drive voltage signal Vin for driving the piezoelectric element 60*a* and the drive voltage signal Vin for driving the piezoelectric element 60*b* are output by the single transfer gate 234*a*. In other words, the same drive voltage signal Vin is branched and input as the drive voltage signal Vin for driving the piezoelectric element 60*a* and the drive voltage signal Vin for driving the piezoelectric element 60*b*. As a result, the possibility that a difference occurs between the signal waveform of the drive voltage signal Vin supplied to the piezoelectric element 60*a* and the signal waveform of the drive voltage signal Vin supplied to the piezoelectric element 60*b* is reduced. Therefore, the possibility that a difference occurs between the displacement amount of the piezoelectric element 60*a* and the displacement amount of the piezoelectric element 60*b* is reduced, and the possibility that a variation occurs between the amount of the ink supplied from the pressure chamber CB1 to the nozzle N and the amount of the ink supplied from the pressure chamber CB2 to the nozzle N is reduced. As a result, the ejection accuracy of the ink ejected from the nozzle N is improved.

Furthermore, in the liquid ejection apparatus 1 and the print head 21 according to the present embodiment, the displacement amount of the piezoelectric element 60*a* according to the drive voltage signal Vin and the displacement amount of the piezoelectric element 60*b* according to the drive voltage signal Vin are substantially equal to each other, the change amount of the volume of the pressure chamber CB1 due to the displacement of the piezoelectric element 60*a* and the change amount of the volume of the pressure chamber CB2 due to the displacement of the piezoelectric element 60*b* are substantially equal to each other, and the flow path length of the flow path communicating the pressure chamber CB1 and the nozzle N with each other and the flow path length of the flow path communicating the pressure chamber CB2 and the nozzle N with each other are substantially equal to each other. That is, the amount of the ink flowing from the pressure chamber CB1 toward the nozzle N due to the displacement of the piezoelectric element 60*a* and the amount of the ink flowing from the pressure chamber CB2 toward the nozzle N due to the displacement of the piezoelectric element 60*b* are substantially equal to each other, the speed in the flow path communicating the pressure chamber CB1 and the nozzle N with each other of the ink flowing from the pressure chamber CB1 toward the nozzle N due to the displacement of the piezoelectric element 60*a* and the speed in the flow path communicating the pressure chamber CB2 and the nozzle N with each other of the ink flowing from the pressure chamber CB2 toward the nozzle N due to the displacement of the piezoelectric element 60*b* are substantially equal to each other, and the direction of the ink that flows in the flow path communicating the pressure chamber CB1 and the nozzle N from the pressure chamber CB1 toward the nozzle N due to the displacement of the piezoelectric element 60*a* and the direction of the ink that flows in the flow path communicating the pressure chamber CB2 and the nozzle N from the pressure chamber CB2 toward the nozzle N due to the displacement of the piezoelectric element 60*b* are opposite to each other.

Thus, the ink flowing from the pressure chamber CB1 toward the nozzle N due to the displacement of the piezoelectric element 60*a* and the ink flowing from the pressure chamber CB2 toward the nozzle N due to the displacement of the piezoelectric element 60*b* merge at the −Z side of the nozzle N and flow toward the +Z side. As a result, in the print head 21, the possibility that the flow of the ink to be ejected from the nozzle N is hindered by the member constituting the flow path through which the ink flows is reduced, and the possibility that unintended convection is generated in the ink to be ejected from the nozzle N is reduced. Therefore, the ejection accuracy of the ink to be ejected from the nozzle N is further improved.

Further, the liquid ejection apparatus 1 and the ejection unit 5 according to the present embodiment include the drive circuit 50 for outputting the drive signal ComB as the drive signal COM, the pressure chamber CB1 the volume of which varies in accordance with the drive signal ComB, the pressure chamber CB2 the volume of which varies in accordance with the drive signal ComB, the nozzle N that communicates with the pressure chamber CB1 and the pressure chamber CB2 to eject the ink, the piezoelectric element 60*a* for outputting the residual vibration signal Vout1 according to the residual vibration generated in accordance with the volume change of the pressure chamber CB1, the piezoelectric element 60*b* for outputting the residual vibration signal Vout2 according to the residual vibration generated in accordance with the volume change of the pressure chamber CB2, the waveform shaping circuit 240 to which the residual vibration signal Vout1 and the residual vibration signal Vout2 are input, and which outputs the residual vibration signal NVT, the AD conversion circuit 300 to which the residual vibration signal NVT is input, and which outputs the residual vibration signal dNVT, the control circuit 100 for determining the ejection state of the liquid from the nozzle N based on the residual vibration signal dNVT, and the transfer gate 234*c* for switching whether to output the residual vibration signal Vout1 and the residual vibration signal Vout2 to the waveform shaping circuit 240, wherein the piezoelectric element 60*a* and the piezoelectric element 60*b* are electrically coupled at the node 315, and the transfer gate 234*c* switches the conduction state between the node 315 and the waveform shaping circuit 240.

That is, the residual vibration signal Vout, which is a composite wave of the residual vibration signal Vout1 and the residual vibration signal Vout2, is input to the waveform shaping circuit 240, and the control circuit 100 determines the state of the print head 21, that is the ejection state of the ink from the nozzle N, based on the residual vibration signal dNVT corresponding to the residual vibration signal Vout, which is the composite wave of the residual vibration signal Vout1 and the residual vibration signal Vout2. As a result, it is possible to accurately determine the ejection state of the ink from the nozzle N even in the configuration in which the ink is ejected from a single nozzle N in accordance with the volume change of the pressure chamber CB1 due to the drive of the piezoelectric element 60*a* and the volume change of the pressure chamber CB2 due to the drive of the piezoelectric element 60*b*. Further, on this occasion, by the control circuit 100 determining the ejection state of ink from the nozzle N based on the residual vibration signal Vout, which is the composite wave of the residual vibration signal Vout1 and the residual vibration signal Vout2, it is unnecessary to increase the number of the transfer gates 234*c* provided to the ejection unit 5 and the print head 21 when determining the ejection state of the ink from the nozzle N, and the possibility that the print head 21 and the ejection unit 5 grow in size is also reduced.

Further, in the liquid ejection apparatus 1, the ejection unit 5, and the print head 21 according to the present embodiment, the state determination of the print head 21 having the pressure chamber CB1 the volume of which changes in accordance with the drive signal ComB as the drive signal COM, the pressure chamber CB2 the volume of which changes in accordance with the drive signal ComB as the drive signal COM, the nozzle N that communicates with the pressure chamber CB1 and the pressure chamber CB2, and that ejects the liquid, the piezoelectric element 60*a* that outputs the residual vibration signal Vout1 according to the residual vibration generated in accordance with the volume change of the pressure chamber CB1, and the piezoelectric element 60*b* that outputs the residual vibration signal Vout2 according to the residual vibration generated in accordance with the volume change of the pressure chamber CB2 is achieved by the method including the residual vibration generation step (step S1) of changing the volumes of the pressure chamber CB1 and the pressure chamber CB2 to thereby generate the residual vibration in the pressure chamber CB1 and generate the residual vibration in the pressure chamber CB2, the signal conversion step (step S2) of converting the residual vibration signal NVT corresponding to the residual vibration signal Vout obtained by combining the signal waveform of the residual vibration signal Vout1 and the signal waveform of the residual vibration signal Vout2 with each other into the residual vibration signal dNVT as a digital signal, and the determination step (step S3) of determining the state of the print head 21, that is the ejection state of the ink from the nozzle N based on the residual vibration signal dNVT.

That is, in the liquid ejection apparatus 1, the ejection unit 5, and the print head 21 according to the present embodiment, the state of the print head 21, that is the ejection state of the ink from the nozzle N, is determined based on the residual vibration signal dNVT as the digital value of the residual vibration signal Vout, which is the composite wave of the residual vibration signal Vout1 and the residual vibration signal Vout2. Thus, even in the configuration in which the ink is ejected from a single nozzle N in accordance with the volume change of the pressure chamber CB1 due to the drive of the piezoelectric element 60*a* and the volume change of the pressure chamber CB2 due to the drive of the piezoelectric element 60*b*, it is possible to accurately obtain the details of the signal waveform of the residual vibration signal Vout which is the composite wave of the residual vibration signal Vout1 and the residual vibration signal Vout2, and as a result, it is possible to accurately determine the ejection state of the ink from the nozzle N.

Although the embodiment and the modified examples are described hereinabove, the present disclosure is not limited to the embodiment and can be implemented in various aspects without departing from the gist thereof. For example, the embodiments described above can appropriately be combined.

The present disclosure includes substantially the same configurations (e.g., configurations having the same functions, methods, and results, and configurations having the same purposes and advantages) as the configurations described in the embodiment. Further, the present disclosure includes configurations obtained by replacing non-essential portions of the configurations described in the embodiment. Furthermore, the present disclosure includes configurations that may exert the same functions and advantages or configurations that may achieve the same objects as those of the configurations described in the embodiment. Further, the present disclosure includes configurations obtained by adding a known technique to the configurations described in the embodiment.

The following configurations are derived from the embodiment described above.

One aspect of the head unit includes a drive circuit configured to output a drive signal, a first pressure chamber a volume of which varies in accordance with the drive signal, a second pressure chamber a volume of which varies in accordance with the drive signal, a first nozzle that communicates with the first pressure chamber and the second pressure chamber, and that is configured to eject a liquid, a first piezoelectric element configured to output a first residual vibration signal according to a first residual vibration generated in accordance with a volume change of the first pressure chamber, a second piezoelectric element configured to output a second residual vibration signal according to a second residual vibration in accordance with a volume change of the second pressure chamber, an inspection signal output circuit to which the first residual vibration signal and the second residual vibration signal are input, and which is configured to output an inspection signal, a processor configured to determine an ejection state of the liquid from the first nozzle based on the inspection signal, and a first switching circuit configured to switch whether to output the first residual vibration signal and the second residual vibration signal to the inspection signal output circuit, wherein the first piezoelectric element and the second piezoelectric element are electrically coupled at a first node, and the first switching circuit is configured to switch a conduction state between the first node and the inspection signal output circuit.

According to this head unit, in determining the ejection state of the liquid from the first nozzle, even in the configuration having a single nozzle N communicating with the first pressure chamber and the second pressure chamber, by the single first switching circuit switching whether to output the first residual vibration signal according to the volume change of the first pressure chamber and the second residual vibration signal according to the volume change of the second pressure chamber to the inspection signal output circuit for outputting the inspection signal, the determination of the ejection state of the ink from the head unit, that is the determination of the ejection state of the ink from the nozzle N, can be achieved with a small number of switching circuits. That is, even in the configuration having a single nozzle N communicating with the first pressure chamber and the second pressure chamber, it is possible to determine the ejection state of the ink from the nozzle N while reducing the possibility that the head unit grows in size.

In one aspect of the head unit described above, the first piezoelectric element may be driven in accordance with the drive signal, and a volume of the first pressure chamber may be changed by driving the first piezoelectric element, and the second piezoelectric element may be driven in accordance with the drive signal, and a volume of the second pressure chamber may be changed by driving the second piezoelectric element.

According to this head unit, by the first piezoelectric element executing the volume change of the first pressure chamber and the detection of the residual vibration caused by the volume change of the first pressure chamber in common, and the second piezoelectric element executing the volume change of the second pressure chamber and the detection of the residual vibration caused by the volume change of the second pressure chamber in common, the number of the piezoelectric elements provided to the head unit decreases, and a further reduction in size of the head unit can be realized.

In one aspect of the head unit described above, there may further be provided a supply port and a discharge port, wherein the liquid supplied from the supply port may be discharged from the discharge port via the first pressure chamber and the second pressure chamber, and at least a part of the liquid discharged from the discharge port may be returned to the supply port.

According to this head unit, a possibility that a characteristic of the liquid changes due to the retention of the liquid in the first pressure chamber and the second pressure chamber is reduced.

In one aspect of the head unit described above, the inspection signal output circuit may include a filter circuit and an amplifier circuit.

In one aspect of the head unit described above, an electrical distance between the first piezoelectric element and the first node may be shorter than an electrical distance between the first node and the first switching circuit, and an electrical distance between the second piezoelectric element and the first node may be shorter than an electrical distance between the first node and the first switching circuit.

According to this head unit, by making the wiring length of a wiring line propagated only by the first residual vibration signal and the wiring length of a wiring line propagated only by the second residual vibration signal shorter than the wiring length of a wiring line propagated by both the first residual vibration signal and the second residual vibration signal, a degree of contribution of the wiring line propagated only by the first residual vibration signal in the wiring path of the first residual vibration decreases, and a degree of contribution of the wiring line propagated only by the second residual vibration signal in the wiring path of the second residual vibration decreases. As a result, the influence of the wiring lines on the first residual vibration signal and the second residual vibration signal input to the first switching circuit is reduced.

In one aspect of the head unit described above, there may further be provided a switching control circuit configured to output a switching signal for controlling switching of a conduction state of the first switching circuit.

According to this head unit, since it is possible to achieve the determination of the ejection state of the ink from the head unit, that is the determination of the ejection state of the ink from the nozzle N, with a small number of switching circuits, the number of the switching signals can also be reduced.

In one aspect of the head unit described above, there may further be provided a third pressure chamber a volume of which varies in accordance with the drive signal, a fourth pressure chamber a volume of which varies in accordance with the drive signal, a second nozzle that communicates with the third pressure chamber and the fourth pressure chamber, and that is configured to eject the liquid, a third piezoelectric element configured to output a third residual vibration signal according to a third residual vibration generated in accordance with a volume change of the third pressure chamber, a fourth piezoelectric element configured to output a fourth residual vibration signal according to a fourth residual vibration in accordance with a volume change of the fourth pressure chamber, and a second switching circuit configured to switch whether to output the third residual vibration signal and the fourth residual vibration signal to the inspection signal output circuit, wherein the third piezoelectric element and the fourth piezoelectric element may electrically be coupled at a second node, the second switching circuit may be configured to switch a conduction state between the second node and the inspection signal output circuit, the first switching circuit and the second switching circuit may electrically be coupled at a third node, and the inspection signal output circuit may output the inspection signal according to a signal at the third node.

In one aspect of the head unit described above, a plurality of switching circuits including the first switching circuit and the second switching circuit may be provided to a single integrated circuit, the integrated circuit may include a pair of long sides located to be opposed to each other, and a pair of short sides which are shorter than the long sides, and are located to be opposed to each other, and a length of the long sides of the integrated circuit may be shorter than a length of a nozzle column in which a plurality of nozzles including the first nozzle and the second nozzle is arranged side by side to form a column.

According to this head unit, since the influence of the integrated circuit on the size of the head unit is reduced, it is possible to realize the reduction in size of the head unit to the extent that the specification is satisfied.

One aspect of the liquid ejection apparatus includes a drive circuit configured to output a drive signal, a first pressure chamber a volume of which varies in accordance with the drive signal, a second pressure chamber a volume of which varies in accordance with the drive signal, a first nozzle that communicates with the first pressure chamber and the second pressure chamber, and that is configured to eject a liquid, a first piezoelectric element configured to output a first residual vibration signal according to a first residual vibration generated in accordance with a volume change of the first pressure chamber, a second piezoelectric element configured to output a second residual vibration signal according to a second residual vibration in accordance with a volume change of the second pressure chamber, an inspection signal output circuit to which the first residual vibration signal and the second residual vibration signal are input, and which is configured to output an inspection signal, a processor configured to determine an ejection state of the liquid from the first nozzle based on the inspection signal, a first switching circuit configured to switch whether to output the first residual vibration signal and the second residual vibration signal to the inspection signal output circuit, and a conveyance mechanism configured to convey a medium on which the liquid ejected from the first nozzle lands, wherein the first piezoelectric element and the second piezoelectric element are electrically coupled at a first node, and the first switching circuit is configured to switch a conduction state between the first node and the inspection signal output circuit.

According to this liquid ejection apparatus, in determining the ejection state of the liquid from the first nozzle, even in the configuration having a single nozzle N communicating with the first pressure chamber and the second pressure chamber, by the single first switching circuit switching whether to output the first residual vibration signal according to the volume change of the first pressure chamber and the second residual vibration signal according to the volume change of the second pressure chamber to the inspection signal output circuit for outputting the inspection signal, the determination of the ejection state of the ink from the head unit, that is the determination of the ejection state of the ink from the nozzle N, can be achieved with a small number of switching circuits. That is, even in the configuration having a single nozzle N communicating with the first pressure chamber and the second pressure chamber, it is possible to determine the ejection state of the ink from the nozzle N while reducing the possibility that the head unit grows in size.

In one aspect of the liquid ejection apparatus described above, the first piezoelectric element may be driven in accordance with the drive signal, and a volume of the first pressure chamber may be changed by driving the first piezoelectric element, and the second piezoelectric element may be driven in accordance with the drive signal, and a volume of the second pressure chamber may be changed by driving the second piezoelectric element.

According to this liquid ejection apparatus, by the first piezoelectric element executing the volume change of the first pressure chamber and the detection of the residual vibration caused by the volume change of the first pressure chamber in common, and the second piezoelectric element executing the volume change of the second pressure chamber and the detection of the residual vibration caused by the volume change of the second pressure chamber in common, the number of the piezoelectric elements provided to the head unit decreases, and a further reduction in size of the head unit can be realized.

In one aspect of the liquid ejection apparatus described above, there may further be provided a supply port and a discharge port, wherein the liquid supplied from the supply port may be discharged from the discharge port via the first pressure chamber and the second pressure chamber, and at least a part of the liquid discharged from the discharge port may be returned to the supply port.

According to this liquid ejection apparatus, a possibility that a characteristic of the liquid changes due to the retention of the liquid in the first pressure chamber and the second pressure chamber is reduced.

In one aspect of the liquid ejection apparatus described above, the inspection signal output circuit may include a filter circuit and an amplifier circuit.

In one aspect of the liquid ejection apparatus described above, an electrical distance between the first piezoelectric element and the first node may be shorter than an electrical distance between the first node and the first switching circuit, and an electrical distance between the second piezoelectric element and the first node may be shorter than an electrical distance between the first node and the first switching circuit.

According to this liquid ejection apparatus, by making the wiring length of a wiring line propagated only by the first residual vibration signal and the wiring length of a wiring line propagated only by the second residual vibration signal shorter than the wiring length of a wiring line propagated by both the first residual vibration signal and the second residual vibration signal, a degree of contribution of the wiring line propagated only by the first residual vibration signal in the wiring path of the first residual vibration decreases, and a degree of contribution of the wiring line propagated only by the second residual vibration signal in the wiring path of the second residual vibration decreases. As a result, the influence of the wiring lines on the first residual vibration signal and the second residual vibration signal input to the first switching circuit is reduced.

In one aspect of the liquid ejection apparatus described above, there may further be provided a switching control circuit configured to output a switching signal for controlling switching of a conduction state of the first switching circuit.

According to this liquid ejection apparatus, since it is possible to achieve the determination of the ejection state of the ink from the head unit, that is the determination of the ejection state of the ink from the nozzle N, with a small number of switching circuits, the number of the switching signals can also be reduced.

In one aspect of the liquid ejection apparatus described above, there may further be provided a third pressure chamber a volume of which varies in accordance with the drive signal, a fourth pressure chamber a volume of which varies in accordance with the drive signal, a second nozzle that communicates with the third pressure chamber and the fourth pressure chamber, and that is configured to eject the liquid, a third piezoelectric element configured to output a third residual vibration signal according to a third residual vibration generated in accordance with a volume change of the third pressure chamber, a fourth piezoelectric element configured to output a fourth residual vibration signal according to a fourth residual vibration in accordance with a volume change of the fourth pressure chamber, and a second switching circuit configured to switch whether to output the third residual vibration signal and the fourth residual vibration signal to the inspection signal output circuit, wherein the third piezoelectric element and the fourth piezoelectric element may electrically be coupled at a second node, the second switching circuit may be configured to switch a conduction state between the second node and the inspection signal output circuit, the first switching circuit and the second switching circuit may electrically be coupled at a third node, and the inspection signal output circuit may output the inspection signal according to a signal at the third node.

In one aspect of the liquid ejection apparatus described above, a plurality of switching circuits including the first switching circuit and the second switching circuit may be provided to a single integrated circuit, the integrated circuit may include a pair of long sides located to be opposed to each other, and a pair of short sides which are shorter than the long sides, and are located to be opposed to each other, and a length of the long sides of the integrated circuit may be shorter than a length of a nozzle column in which a plurality of nozzles including the first nozzle and the second nozzle is arranged side by side to form a column.

According to this liquid ejection apparatus, since the influence of the integrated circuit on the size of the head unit is reduced, it is possible to realize the reduction in size of the head unit to the extent that the specification is satisfied.

What is claimed is:

1. A head unit comprising:

a drive circuit configured to output a drive signal;

a first pressure chamber a volume of which varies in accordance with the drive signal;

a second pressure chamber a volume of which varies in accordance with the drive signal;

a first nozzle that communicates with the first pressure chamber and the second pressure chamber, and that is configured to eject a liquid;

a first piezoelectric element configured to output a first residual vibration signal according to a first residual vibration generated in accordance with a volume change of the first pressure chamber;

a second piezoelectric element configured to output a second residual vibration signal according to a second residual vibration generated in accordance with a volume change of the second pressure chamber;

an inspection signal output circuit to which the first residual vibration signal and the second residual vibration signal are input, and which is configured to output an inspection signal;

a processor configured to determine an ejection state of the liquid from the first nozzle based on the inspection signal; and a first switching circuit configured to switch whether to output the first residual vibration signal and the second residual vibration signal to the inspection signal output circuit, wherein the first piezoelectric element and the second piezoelectric element are electrically coupled at a first node, and the first switching circuit is configured to switch a conduction state between the first node and the inspection signal output circuit.

2. The head unit according to claim 1, wherein the first piezoelectric element is driven in accordance with the drive signal, and a volume of the first pressure chamber may be changed by driving the first piezoelectric element, and the second piezoelectric element is driven in accordance with the drive signal, and a volume of the second pressure chamber may be changed by driving the second piezoelectric element.

3. The head unit according to claim 1, further comprising:

a supply port and a discharge port, wherein the liquid supplied from the supply port is discharged from the discharge port via the first pressure chamber and the second pressure chamber, and at least a part of the liquid discharged from the discharge port is returned to the supply port.

4. The head unit according to claim 1, wherein the inspection signal output circuit includes a filter circuit and an amplifier circuit.

5. The head unit according to claim 1, wherein an electrical distance between the first piezoelectric element and the first node is shorter than an electrical distance between the first node and the first switching circuit, and an electrical distance between the second piezoelectric element and the first node is shorter than an electrical distance between the first node and the first switching circuit.

6. The head unit according to claim 1, further comprising:

a switching control circuit configured to output a switching signal for controlling switching of a conduction state of the first switching circuit.

7. The head unit according to claim 1, further comprising:

a third pressure chamber a volume of which varies in accordance with the drive signal;

a fourth pressure chamber a volume of which varies in accordance with the drive signal;

a second nozzle that communicates with the third pressure chamber and the fourth pressure chamber, and that is configured to eject the liquid;

a third piezoelectric element configured to output a third residual vibration signal according to a third residual vibration generated in accordance with a volume change of the third pressure chamber;

a fourth piezoelectric element configured to output a fourth residual vibration signal according to a fourth residual vibration generated in accordance with a volume change of the fourth pressure chamber; and a second switching circuit configured to switch whether to output the third residual vibration signal and the fourth residual vibration signal to the inspection signal output circuit, wherein the third piezoelectric element and the fourth piezoelectric element are electrically coupled at a second node, the second switching circuit is configured to switch a conduction state between the second node and the inspection signal output circuit, the first switching circuit and the second switching circuit are electrically coupled at a third node, and the inspection signal output circuit outputs the inspection signal according to a signal at the third node.

8. The head unit according to claim 7, wherein a plurality of switching circuits including the first switching circuit and the second switching circuit is provided to a single integrated circuit, the integrated circuit includes a pair of long sides located to be opposed to each other, and a pair of short sides which are shorter than the long sides, and are located to be opposed to each other, and a length of the long sides of the integrated circuit is shorter than a length of a nozzle column in which a plurality of nozzles including the first nozzle and the second nozzle is arranged side by side to form a column.

9. A liquid ejection apparatus comprising:

a drive circuit configured to output a drive signal;

a first pressure chamber a volume of which varies in accordance with the drive signal;

a second pressure chamber a volume of which varies in accordance with the drive signal;

a first nozzle that communicates with the first pressure chamber and the second pressure chamber, and that is configured to eject a liquid;

a first piezoelectric element configured to output a first residual vibration signal according to a first residual vibration generated in accordance with a volume change of the first pressure chamber;

a second piezoelectric element configured to output a second residual vibration signal according to a second residual vibration generated in accordance with a volume change of the second pressure chamber;

an inspection signal output circuit to which the first residual vibration signal and the second residual vibration signal are input, and which is configured to output an inspection signal;

a processor configured to determine an ejection state of the liquid from the first nozzle based on the inspection signal;

a first switching circuit configured to switch whether to output the first residual vibration signal and the second residual vibration signal to the inspection signal output circuit; and a conveyance mechanism configured to convey a medium on which the liquid ejected from the first nozzle lands, wherein the first piezoelectric element and the second piezoelectric element are electrically coupled at a first node, and the first switching circuit is configured to switch a conduction state between the first node and the inspection signal output circuit.

10. The liquid ejection apparatus according to claim 9, wherein the first piezoelectric element is driven in accordance with the drive signal, and a volume of the first pressure chamber is changed by driving the first piezoelectric element, and the second piezoelectric element is driven in accordance with the drive signal, and a volume of the second pressure chamber is changed by driving the second piezoelectric element.

11. The liquid ejection apparatus according to claim 9, further comprising:

a supply port and a discharge port, wherein the liquid supplied from the supply port is discharged from the discharge port via the first pressure chamber and the second pressure chamber, and at least a part of the liquid discharged from the discharge port is returned to the supply port.

12. The liquid ejection apparatus according to claim 9, wherein the inspection signal output circuit includes a filter circuit and an amplifier circuit.

13. The liquid ejection apparatus according to claim 9, wherein an electrical distance between the first piezoelectric element and the first node is shorter than an electrical distance between the first node and the first switching circuit, and an electrical distance between the second piezoelectric element and the first node is shorter than an electrical distance between the first node and the first switching circuit.

14. The liquid ejection apparatus according to claim 9, further comprising:

a switching control circuit configured to output a switching signal for controlling switching of a conduction state of the first switching circuit.

15. The liquid ejection apparatus according to claim 9, further comprising:

a third pressure chamber a volume of which varies in accordance with the drive signal;

a fourth pressure chamber a volume of which varies in accordance with the drive signal;

a second nozzle that communicates with the third pressure chamber and the fourth pressure chamber, and that is configured to eject the liquid;

a third piezoelectric element configured to output a third residual vibration signal according to a third residual vibration generated in accordance with a volume change of the third pressure chamber;

a fourth piezoelectric element configured to output a fourth residual vibration signal according to a fourth residual vibration generated in accordance with a volume change of the fourth pressure chamber; and a second switching circuit configured to switch whether to output the third residual vibration signal and the fourth residual vibration signal to the inspection signal output circuit, wherein the third piezoelectric element and the fourth piezoelectric element are electrically coupled at a second node, the second switching circuit is configured to switch a conduction state between the second node and the inspection signal output circuit, the first switching circuit and the second switching circuit are electrically coupled at a third node, and the inspection signal output circuit outputs the inspection signal according to a signal at the third node.

16. The liquid ejection apparatus according to claim 15, wherein a plurality of switching circuits including the first switching circuit and the second switching circuit is provided to a single integrated circuit, the integrated circuit includes a pair of long sides located to be opposed to each other, and a pair of short sides which are shorter than the long sides, and are located to be opposed to each other, and a length of the long sides of the integrated circuit is shorter than a length of a nozzle column in which a plurality of nozzles including the first nozzle and the second nozzle is arranged side by side to form a column.

* * * * *